(12) United States Patent
Tobisch

(10) Patent No.: US 12,720,174 B2
(45) Date of Patent: Aug. 25, 2026

(54) DIGITAL REMOTE OPTICAL DEVICE, METHOD OF OPERATING A DIGITAL REMOTE OPTICAL DEVICE AND CAMERA SYSTEM

(71) Applicant: Carl Zeiss AG, Oberkochen (DE)

(72) Inventor: Alexander Tobisch, Ellwangen (DE)

(73) Assignee: Carl Zeiss AG, Oberkochen (DE)

( * ) Notice: Subject to any disclaimer, the term of this patent is extended or adjusted under 35 U.S.C. 154(b) by 54 days.

(21) Appl. No.: 18/208,156

(22) Filed: Jun. 9, 2023

(65) Prior Publication Data

US 2024/0056656 A1 Feb. 15, 2024

(30) Foreign Application Priority Data

Jun. 10, 2022 (DE) ..................... 10 2022 114 615.4

(51) Int. Cl.
*H04N 23/16* (2023.01)
*G02B 23/04* (2006.01)
(Continued)

(52) U.S. Cl.
CPC ............. *H04N 23/16* (2023.01); *G02B 23/04* (2013.01); *H04N 23/80* (2023.01); *H04N 23/53* (2023.01)

(58) Field of Classification Search
CPC ........ H04N 23/16; H04N 23/80; H04N 23/53; G02B 23/04; G02B 27/149; G02B 23/12; G02B 27/1013; G03B 17/17; G03B 33/12
See application file for complete search history.

(56) References Cited

U.S. PATENT DOCUMENTS 4,414,575 A * 11/1983 Yamamoto ........... H04N 23/673 348/335
7,570,299 B2 * 8/2009 Kuwakino ............... G02B 7/38 396/119

(Continued)

FOREIGN PATENT DOCUMENTS

DE 102010010030 A1 9/2011

OTHER PUBLICATIONS

Office Action issued in German Patent Application No. DE 10 2022 114 615.4, dated Feb. 6, 2023 (from which this application claims priority) and English language translation thereof.

(Continued)

*Primary Examiner* — Hung H Lam
(74) *Attorney, Agent, or Firm* — Ewers IP Law PLLC; Falk Ewers

(57) ABSTRACT

The invention relates to a digital long-range optical apparatus (1) for imaging an object (2), having an optical axis (OA), having a lens (3) for imaging the object (2), the lens (3) being arranged along the optical axis (OA), having a processor unit (4), and having a display unit (5) for displaying an image of the object (2), the processor unit (4) being line-connected to the display unit (5). The digital long-range optical apparatus (1) comprises a beam splitter unit (7), with the lens (3) being arranged first along the optical axis (OA) in a direction of light incidence (LE), followed by the beam splitter unit (7). Further, a first detector (8A) and a second detector (8B) are provided. The first detector (8A) is designed to detect first light (L1) generated by the beam splitter unit (7) and the second detector (8B) is designed to detect second light (L2) generated by the beam splitter unit (7).

16 Claims, 29 Drawing Sheets

(51) Int. Cl.
*H04N 23/80* (2023.01)
*H04N 23/53* (2023.01)

(56) References Cited

U.S. PATENT DOCUMENTS

| | | | | |
|---|---|---|---|---|
| 7,646,420 | B2 * | 1/2010 | Misawa | H04N 23/667<br>348/335 |
| 8,988,564 | B2 | 3/2015 | Webster et al. | |
| 10,313,642 | B2 | 6/2019 | Fan | |
| 2002/0140841 | A1 * | 10/2002 | Sasaki | H04N 23/673<br>348/E5.045 |
| 2002/0175268 | A1 | 11/2002 | Smith | |
| 2003/0053181 | A1 | 3/2003 | Nizani | |
| 2007/0182840 | A1 | 8/2007 | Monroe | |
| 2007/0236597 | A1 * | 10/2007 | Kurokawa | H04N 23/673<br>348/E5.045 |
| 2008/0303927 | A1 * | 12/2008 | Khanh | H04N 23/741<br>348/262 |
| 2017/0237879 | A1 | 8/2017 | Kiser et al. | |
| 2018/0262725 | A1 | 9/2018 | Fan | |
| 2021/0026149 | A1 * | 1/2021 | Pau | G02B 27/126 |

OTHER PUBLICATIONS

Office Action issued in German Patent Application No. DE 10 2022 114 615.4, dated Jul. 25, 2025 (from which this application claims priority) and English language translation thereof.

* cited by examiner 6
5
4
12B
8B
9B
L2
8A
12A
L1
7
9A
1
OA
3
LE
2

20
2
LE
OA1
OA2
21A
21B
22A
22B
23A
24A
24B
25A
26A
27A
28A
29A
30
31A
31B
32A
32B
33A
34A
35A
36A
37A
38A
L1A
L2A
L3A
L4A

20
LE
2
OA1
OA2
21A
21B
22A
22B
23A
23B
24A
24B
25A
25B
26A
26B
27A
27B
28A
28B
29A
29B
30
31A
31B
32A
32B
33A
33B
34A
34B
35A
35B
L1A
L1B
L2A
L2B
L3A
L3B 40B
40A 40B
41
7
40A 8B
9B
9A
7
8A

DIGITAL REMOTE OPTICAL DEVICE, METHOD OF OPERATING A DIGITAL REMOTE OPTICAL DEVICE AND CAMERA SYSTEM

CROSS REFERENCE TO RELATED APPLICATIONS

This application claims priority to German patent application No. 10 2022 114 615.4, filed Jun. 10, 2022, the entire content of which is incorporated herein by reference.

TECHNICAL FIELD

The disclosure relates to a digital long-range optical apparatus for imaging an object. A digital long-range optical apparatus is understood to mean an optical system which finds use in terrestrial or astronomical context in order to strongly magnify objects such that these are perceivable in detail by a human eye. In this case, the objects can be situated very far away in particular, for example more than twice as far as the external dimensions of the long-range optical apparatus. The digital long-range optical apparatus includes an image sensor in the form of a detector and a display unit for displaying an image of an object. By way of example, the digital long-range optical apparatus is in the form of a binocular apparatus, a pair of field glasses, a refractor, in particular a telescopic sight, a telescope, a spotting scope, or a night vision apparatus. In this patent application, a cellular telephone and/or a tablet computer are/is not considered to be a digital long-range optical apparatus. Moreover, the disclosure relates to a method for operating a digital long-range optical apparatus, and to a camera system for imaging an object. For example, the camera system according to an aspect of the disclosure is arranged in or at a cellular telephone and/or in or at a tablet computer.

BACKGROUND

A digital long-range optical apparatus known from the prior art is designed so that a user of the digital long-range optical apparatus can observe an object by placing an eye against the digital long-range optical apparatus. The digital long-range optical apparatus includes a lens and a detector. The detector detects light rays which are incident on the lens from the object and which pass through the lens, and generates detection signals. These detection signals are electronically converted by a processor unit in such a way that they are presented as an image on a display unit. Accordingly, the light rays originating from the object enter the digital long-range optical apparatus in a direction of light incidence. Therefore, the light rays initially pass through the lens and are subsequently detected by the detector. Further, the digital long-range optical apparatus known from the prior art includes an eyepiece, with which the user of the digital long-range optical apparatus can observe the image presented on the display unit. By way of example, the detector can be in the form of a charge-coupled device (CCD) detector or complementary metal-oxide-semiconductor (CMOS) detector. By way of example, the arrangement of the just-mentioned units of the known digital long-range optical apparatus along an optical axis of the known long-range optical apparatus can also be described as follows: As seen counter to the direction of light incidence, which is to say as seen from the eye in the direction of the object, the eyepiece is arranged first along the optical axis of the known digital long-range optical apparatus, followed by the display unit, then the detector, and then the lens. The arrangement of the aforementioned units along the optical axis is not mandatory. Instead, for example, the eyepiece and the display unit on the one hand form a first device and the detector and the lens on the other hand form a second device. The formation of a common axis between the display unit and the detector is not mandatory but typical.

The detector used in the known digital long-range optical apparatus is provided with surface elements in the form of pixels. For example, the detector includes 1024×1024 pixels. A filter in the form of a Bayer filter which covers the pixels of the detector is arranged on the detector. The Bayer filter includes color filters for the colors of red, green, and blue. One color filter is assigned to an individual pixel in each case. Expressed in other words, a respective color filter is arranged at a respective pixel. A color filter serves to transmit a single color of the light incident on the color filter. Light of this individual color reaches the pixel assigned to the color filter of the detector. By contrast, further colors of the light are filtered out with the color filter. Light of these further colors consequently does not reach the pixel.

A disadvantage of the detector provided with the Bayer filter is that each pixel of the detector does not detect different colors of the light incident on the detector but only a single color of the light. Accordingly, in respect of this pixel, there is a lack of color information of the light incident on the pixel. To obtain this missing color information, the color information is determined by a mathematical method with an interpolation. The color information determined thus is used together with the color information of the light reaching the pixel for the purpose of generating an image of the object. However, the aforementioned method leads to a loss of actual color information and consequently leads to errors in the color resolution of the image of the object to be imaged.

A further disadvantage of the detector provided with the Bayer filter is that the filter characteristic of a Bayer filter allows errors when generating the image of the object. FIG. 1 shows a typical spectral profile of a Bayer filter. Reference sign 1000 denotes the profile of a curve in respect of the relative sensitivity of the Bayer filter for the blue light. Reference sign 2000 denotes the profile of a curve in respect of the relative sensitivity of the Bayer filter for the green light. Further, reference sign 3000 denotes the profile of a curve in respect of the relative sensitivity of the Bayer filter for the red light. On account of the intersection regions I, II, and III of the curves for blue light, green light, and red light depicted in FIG. 1, ambiguities may arise when determining and distinguishing the various colors with the detector. This possibly leads to errors when generating an image of the object.

The use of the Bayer filter has further disadvantages. The Bayer filter may exhibit a poor transmission of the light rays incident on the Bayer filter, a production-related variation in the filter characteristic, and a poor long-term stability.

The use of a Bayer filter in the case of a digital long-range optical apparatus, especially in the case of a pair of field glasses, a spotting scope or a telescopic sight, may therefore be disadvantageous. For example, hunting often requires an observation of animals in twilight and poor light conditions, with the result that a good light efficiency (thus a usage of the largest possible proportion of the light incident into the digital long-range optical apparatus) is desirable. A good color resolution is often desirable when observing animals and/or fauna in nature, since animals and fauna can be distinguished on the basis of very small color nuances. Further, a good light efficiency is also desirable when observing nature.

From U.S. Pat. No. 8,988,564 B2 a digital camera component including a light splitter cube with an entrance face configured to receive incident light is known. The light splitter cube splits the incident light into three color components, specifically into a first color component, into a second color component, and into a third color component. The first color component emerges from a first face of the light splitter cube. Further, the second color component emerges from a second face of the light splitter cube. The third color component emerges from a third face of the light splitter cube. A first detector for detecting the first color component is arranged at the first face. Further, a second detector for detecting the second color component is arranged at the second phase. A third detector for detecting the third color component is arranged at the third face.

From U.S. Pat. No. 10,313,642 B2 an imaging system for capturing an image of an object is known. The known imaging system includes a first lens element and a dichroic beam splitter which transmits light from a specific wavelength range, and which reflects light at wavelengths outside of the specific wavelength range. Further, the known imaging system includes a first detector for detecting transmitted light from the specific wavelength range and a second detector for detecting reflected light at wavelengths outside of the specific wavelength range. The first detector is a monochrome detector, and the second detector is a color image sensor with a color filter arrangement arranged on the pixels of the second detector. The image generated by the first detector and the image generated by the second detector are combined in order to generate a single-color image.

SUMMARY

It is an object of the disclosure to provide a digital long-range optical apparatus having a good light efficiency and a good color resolution for the purpose of generating a good image of an object. It is a further object of the disclosure to provide a method for operating a digital long-range optical apparatus, with the method enabling a good light efficiency and a good color resolution to generate a good image of an object. Moreover, it is a further object of the disclosure to provide a camera system enabling a good generation of an image of an object.

The objects are achieved by a digital long-range optical apparatus, a method for operating a digital long-range optical apparatus, and a camera system for imaging an object as described herein.

The digital long-range optical apparatus according to an aspect of the disclosure is configured to image an object. In this context, both hereinbefore and hereinafter, a digital long-range optical apparatus is understood to mean an optical system which finds use in terrestrial or astronomical context in order to strongly magnify objects such that these are perceivable in detail by a human eye. Reference is made to the explanations given hereinbefore, which also apply here. By way of example, the digital long-range optical apparatus is in the form of a binocular apparatus, a pair of field glasses, a refractor, in particular a telescopic sight, a telescope, a spotting scope, or a night vision apparatus. In this disclosure, a cellular telephone and/or a tablet computer are/is not considered to be a digital long-range optical apparatus.

The digital long-range optical apparatus according to an aspect of the disclosure includes at least one optical axis and at least one lens for imaging the object, with the lens for example being arranged along the optical axis. For example, the lens includes at least one lens element. In particular, provision is made for the lens to include a plurality of lens elements and/or a plurality of optical units, for example lens element groups. In this case, a lens element group is understood to mean an optical unit including at least one lens element or a plurality of lens elements. Additionally, the digital long-range optical apparatus according to an aspect of the disclosure is provided with at least one processor unit and at least one display unit for displaying an image of the object, with the processor unit being line-connected to the display unit. Accordingly, signals are transmittable from the processor unit to the display unit and/or from the display unit to the processor unit. The display unit is in the form of a digital display unit. In particular, the display unit can be in the form of a field emission visual display unit, a liquid crystal visual display unit, a thin film transistor visual display unit, a plasma visual display unit, a surface conduction electron emitter display (SED), or a visual display unit containing organic light-emitting diodes. The above enumeration is not exhaustive. Rather, any display unit suitable for the disclosure can be used.

Further, the digital long-range optical apparatus according to an aspect of the disclosure includes at least one beam splitter unit. The lens is arranged first along the optical axis in a direction of light incidence, followed by the beam splitter unit. The digital long-range optical apparatus according to an aspect of the disclosure moreover includes at least one first detector and at least one second detector. The processor unit is line-connected to both the first detector and the second detector. Accordingly, signals are transmittable from the processor unit to the first detector and/or from the first detector to the processor unit. Additionally, signals are transmittable from the processor unit to the second detector and/or from the second detector to the processor unit. The first detector is configured to detect first light generated by the beam splitter unit. Expressed in other words, the first detector detects first light which is generated by the beam splitter unit by the incidence of light incident on the beam splitter unit. The second detector is configured to detect second light generated by the beam splitter unit. Expressed in other words, the second detector detects second light which is generated by the beam splitter unit by the incidence of light incident on the beam splitter unit. By way of example, the first detector and/or the second detector are/is in the form of a monochrome detector.

By way of example, the first detector and/or the second detector are/is in the form of a CCD detector or CMOS detector. However, the disclosure is not restricted to the aforementioned exemplary embodiments. Rather, the first detector and/or the second detector can be any detector suitable for the disclosure.

The processor unit is additionally in the form of for example a control unit and/or supply unit, which controls the display unit, the first detector, and/or the second detector and/or which supplies these/this with voltage.

It was recognized that, on account of the beam splitter unit, the digital long-range optical apparatus has a good light efficiency and a good color resolution for the purpose of generating a good image of an object. With the beam splitter unit, it is possible to split light into different color components (wavelengths) and/or wavelength ranges, with the result that information with different color components and/or wavelength ranges is generated. The split color components and/or wavelength ranges are detected by different detectors. The different detection signals provided by the detectors are used for generating a single image and/or a plurality of images of the object. The single generated image or the plurality of generated images have a good light efficiency and a good color resolution. In comparison with the prior art, in which a single detector provided with a Bayer filter and having a single detector area is used, the disclosure first of all provides a plurality of detectors with a plurality of detector areas, with the result that, in comparison with the prior art, more information can be used for the generation of the image of the object. Secondly, the plurality of detectors can be controlled on an individual basis. Both effects lead to images with a good light efficiency and a good color resolution.

In an exemplary embodiment of the digital long-range optical apparatus according to the disclosure, provision is additionally or alternatively made for a first optical device to be arranged between the beam splitter unit and the first detector. The first optical device guides the first light from the beam splitter unit to the first detector. Additionally or as an alternative thereto, provision is made for a second optical device to be arranged between the beam splitter unit and the second detector. The second optical device guides the second light from the beam splitter unit to the second detector. In a further exemplary embodiment of the digital long-range optical apparatus according to the disclosure, provision is additionally or alternatively made for the first detector and/or the second detector to be arranged at the beam splitter unit. By way of example, the beam splitter unit includes a first beam splitter face, at which the first detector is arranged. In particular, provision is made for the beam splitter unit to include a second beam splitter face, at which the second detector is arranged. For example, the first beam splitter face and the second beam splitter face are arranged with respect to one another at an angle of between 0° and 180°, with the interval boundaries being included. Additionally or as an alternative thereto, the first beam splitter face and the second beam splitter face are arranged at a distance from one another. In particular, provision is made for the first beam splitter face and the second beam splitter face to be arranged parallel to one another. For example, provision is made for the aforementioned beam splitter faces to be arranged relative to one another in the style of a cube. Expressed in other words, the aforementioned faces are for example arranged with respect to one another at an angle of 90° or substantially 90°.

In a further exemplary embodiment of the digital long-range optical apparatus according to the disclosure, provision is additionally or alternatively made for the first light to include one of the following features: (i) light at only a single first wavelength, (ii) light from a first wavelength range, or (iii) a specifiable first intensity.

In this case, both hereinbefore and hereinafter, a single wavelength is understood to mean either light at a single wavelength or light from merely a narrow wavelength range, with a spectral profile in this wavelength range having a bell-shaped or substantially bell-shaped profile. By way of example, the profile corresponds to a Lorenz curve, a Gaussian curve, or a Voigt curve. The bell-shaped profile is distinguished by a maximum value, given by a peak wavelength, and a centroid wavelength (thus a weighted mean over the bell-shaped profile). The peak wavelength or the centroid wavelength are exemplary variables, which can be referred to as a single wavelength and which correspond to the latter. The width of the profile (given by what is known as the full width at half maximum (FWHM) is less than 5 nm or less than 3 nm, for example.

Further, hereinbefore and also hereinafter, the wavelength range specified in (ii) is understood to mean a spectral range which need not necessarily have a bell-shaped profile. The latter is distinguished in that all wavelengths within the aforementioned wavelength range have more than 10%, more than 20%, more than 30%, more than 40%, or more than 50% of the intensity of a maximum intensity within the aforementioned wavelength range. All wavelengths accordingly have a lower intensity outside of the specified wavelength range. Explicit reference is made to the fact that the wavelength range explained in this paragraph differs from the narrow wavelength range explained in relation to the single wavelength.

The single first wavelength may for example be a wavelength from the visible or invisible wavelength range. In particular, provision is made for the light at the first wavelength to be a red light, a green light, or a blue light. For example, the first wavelength range can be the wavelength range of the visible light, of the infrared range, of the near-infrared range, or of the short-wavelength infrared light. The exemplary embodiment of the first wavelength range in the form of the near-infrared range or the short-wavelength infrared light is advantageous, especially when observing an object in twilight or low-light weather conditions. The first intensity of the first light can be any selectable intensity, for example a percentage of the light incident in the beam splitter unit from the lens. For example, the first intensity of the first light, and hence the percentage, is 10%, 20%, 30%, 40%, 50%, 60%, 70%, 80%, or 90% of the light incident in the beam splitter unit from the lens.

In yet a further exemplary embodiment of the digital long-range optical apparatus according to the disclosure, provision is additionally or alternatively made for the second light to include one of the following features: (i) light at only a single second wavelength, (ii) light from a second wavelength range, or (iii) light of a specifiable second intensity.

Reference is made to the explanations provided hereinbefore in respect of the definition of the terms of single wavelength and wavelength range. These also apply here.

The single second wavelength may for example be a wavelength from the visible or invisible wavelength range. In particular, provision is made for the light at the second wavelength to be a red light, a green light, or a blue light. For example, the second wavelength range can be the wavelength range of the visible light, of the infrared range, of the near-infrared range, or of the short-wavelength infrared light. The exemplary embodiment of the second wavelength range in the form of the near-infrared range or the short-wavelength infrared light is advantageous, especially when observing an object in twilight or low-light weather conditions. The second intensity of the second light can be any selectable intensity, for example, depending on the percentage of the first intensity of the first light, a percentage of the light incident in the beam splitter unit from the lens. For example, the second intensity of the second light, and hence the percentage, is 10%, 20%, 30%, 40%, 50%, 60%, 70%, 80%, or 90% of the light incident in the beam splitter unit from the lens, depending on the percentage of the first intensity of the first light. For example, the percentage of the first intensity of the first light is 20% and the percentage of the second intensity of the second light is 80%.

In a further exemplary embodiment of the digital long-range optical apparatus according to the disclosure, provision is additionally or alternatively made for the first detector to include a sensitive first detector area. The pixels of the first detector which detect the first light are arranged at the first detector area. The first detector area is not necessarily the entire detector area where pixels of the first detector which detect the first light are arranged. Rather, an exemplary embodiment of the digital long-range optical apparatus according to the disclosure provides for the first detector area to be a partial area of the entire detector area of the first detector. By way of example, provision is made for the processor unit to be used to control the first detector in such a way that a selectable first detector area is switched to be sensitive for the detection of first light. Further, additional provision is made for the second detector to include a sensitive second detector area. The pixels of the second detector which detect the second light are arranged at the second detector area. The second detector area is not necessarily the entire detector area where pixels of the second detector which detect the second light are arranged. Rather, an exemplary embodiment of the digital long-range optical apparatus according to the disclosure provides for the second detector area to be a partial area of the entire detector area of the second detector. By way of example, provision is made for the processor unit to be used to control the second detector in such a way that a selectable second detector area is switched to be sensitive for the detection of second light. The first detector area differs in size from the second detector area. This exemplary embodiment of the digital long-range optical apparatus according to the disclosure is advantageous in that a first image generated by the first detector and a second image generated by the second detector are based on differently sized fields of view. As a result, it is possible to provide digital zooming within the scope of the digital long-range optical apparatus according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. It is advantageous that the resolution of the images remains the same for all zoom levels if the detectors have the same resolution. By contrast, in the case of a digital zoom known from the prior art, the resolution reduces as the zooming increases.

In an exemplary embodiment of the digital long-range optical apparatus according to the disclosure, provision is additionally or alternatively made for the beam splitter unit to include a first beam splitter face, at which the first detector is arranged. The first beam splitter face includes a first face center. Moreover, the first beam splitter unit includes a second beam splitter face, at which the second detector is arranged. The second beam splitter face includes a second face center. The first detector includes a first detector area center. By contrast, the second detector includes a second detector area center. In this exemplary embodiment of the digital long-range optical apparatus according to the disclosure, provision is made for the first detector area center of the first detector to be at a first distance from the first face center of the first beam splitter face and for the second detector area center of the second detector to be at a second distance from the second face center of the second beam splitter face. The first distance differs from the second distance. In principle, the two detector areas are arranged offset to each other with regard to the beam splitter face assigned to them. This exemplary embodiment ensures that the first detector area and the second detector area do not record exactly the same image of the object but instead record different image portions of the object. As a result, it is possible to calculate and present a super-resolution image of the object using known super-resolution algorithms (which are used for super-resolution imaging).

In this case, both hereinbefore and hereinafter, the term distance is understood to mean the shortest spatial distance between the relevant points.

In a further exemplary embodiment of the digital long-range optical apparatus according to the disclosure, provision is additionally or alternatively made for the digital long-range optical apparatus to include at least one third detector. The digital long-range optical apparatus according to the disclosure consequently includes not only two detectors in the form of the first detector and the second detector, but more than two detectors. The processor unit is line-connected to the third detector. Accordingly, signals are transmittable from the processor unit to the third detector and/or signals are transmittable from the third detector to the processor unit. The third detector is configured to detect third light generated by the beam splitter unit. The third light includes one of the following features: (i) light at only a single third wavelength, (ii) light from a third wavelength range, or (iii) a specifiable third intensity.

Reference is made to the explanations provided hereinbefore in respect of the definition of the terms of single wavelength and wavelength range. These also apply here.

The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing an object in twilight or low-light weather conditions. The third intensity of the third light can be any selectable intensity, for example, depending on the percentage of the first intensity of the first light and/or the second intensity of the second light, a percentage of the light incident in the beam splitter unit from the lens. For example, the third intensity of the third light, and hence the percentage, is 10%, 20%, 30%, 40%, 50%, 60%, 70%, 80%, or 90% of the light incident in the beam splitter unit from the lens, depending on the percentage of the first intensity of the first light and/or second intensity of the second light. For example, the percentage of the first intensity of the first light is 20%, the percentage of the second intensity of the second light is 50%, and the percentage of the third intensity of the third light is 30%.

In yet a further exemplary embodiment of the digital long-range optical apparatus according to the disclosure, provision is additionally or alternatively made for the third detector to include a sensitive third detector area. The pixels of the third detector which detect the third light are arranged at the third detector area. The third detector area is not necessarily the entire detector area where pixels of the third detector which detect the third light are arranged. Rather, an exemplary embodiment of the digital long-range optical apparatus according to the disclosure provides for the third detector area to be a partial area of the entire detector area of the third detector. By way of example, provision is made for the processor unit to be used to control the third detector in such a way that a selectable third detector area is switched to be sensitive for the detection of third light. The third detector area differs in size from the first detector area and/or the second detector area. This exemplary embodiment of the digital long-range optical apparatus according to the disclosure is advantageous in that a first image generated by the first detector, a second image generated by the second detector, and a third image generated by the third detector are based on differently sized fields of view. As a result, it is possible to provide digital zooming within the scope of the digital long-range optical apparatus according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based on a third field of view and shows a third image portion of the object, which corresponds to an image at a third zoom level. It is advantageous that the resolution of the images remains the same for all zoom levels if the resolution of the detectors is the same. By contrast, in the case of a digital zoom known from the prior art, the resolution reduces as the zooming increases.

In a further exemplary embodiment of the digital long-range optical apparatus according to the disclosure, provision is additionally or alternatively made for the beam splitter unit to include a third beam splitter face, at which the third detector is arranged. The third beam splitter face includes a third face center. As already explained hereinbefore, the first detector area center of the first detector is at a first distance from the first face center of the first beam splitter face. The second detector area center of the second detector is at a second distance from the second face center of the second beam splitter face. Further, the third detector area center of the third detector is at a third distance from the third face center of the third beam splitter face. The first distance differs from the second distance and/or from the third distance. In principle, the three detector areas are arranged offset to each other with regard to the beam splitter face assigned to them. This exemplary embodiment ensures that the first detector area, the second detector area, and the third detector area do not record exactly the same image of the object but instead record different image portions of the object. As a result, it is possible to calculate and present a super-resolution image of the object using known super-resolution algorithms (which are used for super-resolution imaging).

For example, at least two of the faces or each of the faces of the first beam splitter face, the second beam splitter face, and the third beam splitter face are arranged with respect to one another at an angle of between 0° and 180°, with the interval boundaries being included. Additionally or as an alternative thereto, at least two faces of the first beam splitter face, the second beam splitter face, and the third beam splitter face are arranged at a distance from one another. In particular, provision is made for at least two of the aforementioned faces to be arranged parallel to one another. For example, provision is made for the aforementioned beam splitter faces to be arranged relative to one another in the style of a cube. Expressed in other words, respectively two of the aforementioned faces are for example arranged with respect to one another at an angle of 90° or substantially 90°.

In an exemplary embodiment of the digital long-range optical apparatus according to the disclosure, provision is additionally or alternatively made for the digital long-range optical apparatus to include at least one fourth detector. The digital long-range optical apparatus according to an aspect of the disclosure consequently includes not only three detectors in the form of the first detector, the second detector, and the third detector, but more than three detectors. The processor unit is line-connected to the fourth detector. Accordingly, signals are transmittable from the processor unit to the fourth detector and/or signals are transmittable from the fourth detector to the processor unit. The fourth detector is configured to detect fourth light generated by the beam splitter unit. The fourth light includes one of the following features: (i) light at only a single fourth wavelength, (ii) light from a fourth wavelength range, or (iii) a specifiable fourth intensity.

Reference is made to the explanations provided hereinbefore in respect of the definition of the terms of single wavelength and wavelength range. These also apply here.

The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing an object in twilight or low-light weather conditions. The fourth intensity of the fourth light can be any selectable intensity, for example, depending on the percentage of the first intensity of the first light and/or the second intensity of the second light and/or the third intensity of the third light, a percentage of the light incident in the beam splitter unit from the lens. For example, the fourth intensity of the fourth light, and hence the percentage, is 10%, 20%, 30%, 40%, 50%, 60%, 70%, 80%, or 90% of the light incident in the beam splitter unit from the lens, depending on the percentage of the first intensity of the first light and/or the second intensity of the second light and/or the third intensity of the third light. For example, the percentage of the first intensity of the first light is 20%, the percentage of the second intensity of the second light is 50%, the percentage of the third intensity of the third light is 10%, and the percentage of the fourth intensity of the fourth light is 20%.

In a further exemplary embodiment of the digital long-range optical apparatus according to the disclosure, provision is additionally or alternatively made for the fourth detector to include a sensitive fourth detector area. The pixels of the fourth detector which detect the fourth light are arranged at the fourth detector area. The fourth detector area is not necessarily the entire detector area where pixels of the fourth detector which detect the fourth light are arranged. Rather, an exemplary embodiment of the digital long-range optical apparatus according to the disclosure provides for the fourth detector area to be a partial area of the entire detector area of the fourth detector. By way of example, provision is made for the processor unit to be used to control the fourth detector in such a way that a selectable fourth detector area is switched to be sensitive for the detection of fourth light. The fourth detector area differs in size from the first detector area and/or the second detector area and/or the third detector area. This exemplary embodiment of the digital long-range optical apparatus according to the disclosure is advantageous in that a first image generated by the first detector, a second image generated by the second detector, a third image generated by the third detector, and a fourth image generated by the fourth detector are based on differently sized fields of view. As a result, it is possible to provide digital zooming within the scope of the digital long-range optical apparatus according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based on a third field of view and shows a third image portion of the object, which corresponds to an image at a third zoom level. The fourth image is based on a fourth field of view and shows a fourth image portion of the object, which corresponds to an image at a fourth zoom level. It is advantageous that the resolution of the images remains the same for all zoom levels if the resolution of the detectors is the same. By contrast, in the case of a digital zoom known from the prior art, the resolution reduces as the zooming increases.

In yet a further exemplary embodiment of the digital long-range optical apparatus according to the disclosure, provision is additionally or alternatively made for the beam splitter unit to include a fourth beam splitter face, at which the fourth detector is arranged. The fourth beam splitter face includes a fourth face center. As already explained hereinbefore, the first detector area center of the first detector is at a first distance from the first face center of the first beam splitter face. The second detector area center of the second detector is at a second distance from the second face center of the second beam splitter face. Further, the third detector area center of the third detector is at a third distance from the third face center of the third beam splitter face. The fourth detector area center of the fourth detector is at a fourth distance from the fourth face center of the fourth beam splitter face. The first distance differs from the second distance and/or from the third distance and/or from the fourth distance. In principle, the four detector areas are arranged offset to each other with regard to the beam splitter face assigned to them. This exemplary embodiment ensures that the first detector area, the second detector area, the third detector area, and the fourth detector area do not record exactly the same image of the object but instead record different image portions of the object. As a result, it is possible to calculate and present a super-resolution image of the object using known super-resolution algorithms (which are used for super-resolution imaging).

For example, at least two of the faces or each of the faces of the first beam splitter face, the second beam splitter face, the third beam splitter face, and the fourth beam splitter face are arranged with respect to one another at an angle of between 0° and 180°, with the interval boundaries being included. Additionally or as an alternative thereto, at least two faces of the first beam splitter face, the second beam splitter face, the third beam splitter face, and the fourth beam splitter face are arranged at a distance from one another. In particular, provision is made for at least two of the aforementioned faces to be arranged parallel to one another. For example, provision is made for the aforementioned beam splitter faces to be arranged relative to one another in the style of a cube. Expressed in other words, respectively two of the aforementioned faces are for example arranged with respect to one another at an angle of 90° or substantially 90°.

In a further exemplary embodiment of the digital long-range optical apparatus according to the disclosure, provision is additionally or alternatively made for the beam splitter unit to include one of the following features:

- at least one first optical unit in the form of a polyhedron and at least one second optical unit in the form of a polyhedron;
- at least one first optical unit in the form of a polyhedron, at least one second optical unit in the form of a polyhedron, at least one third optical unit in the form of a polyhedron, and at least one fourth optical unit in the form of a polyhedron;
- at least one first optical unit in the form of a polyhedron, at least one second optical unit in the form of a polyhedron, at least one third optical unit in the form of a polyhedron, at least one fourth optical unit in the form of a polyhedron, at least one fifth optical unit in the form of a polyhedron, at least one sixth optical unit in the form of a polyhedron, at least one seventh optical unit in the form of a polyhedron, and at least one eighth optical unit in the form of a polyhedron.

By way of example, provision is made for a dichroic interface to be arranged between at least two of the aforementioned optical units. In particular, provision is made for the dichroic interface to be arranged as a coating at at least one of the two optical units or as a coating at both of the two optical units. A specific wavelength or a specific wavelength range of the light incident on the dichroic interface is transmitted through the dichroic interface. All further wavelengths or wavelength ranges which do not correspond to the specific wavelength or which do not belong to the specific wavelength range are reflected.

In the case of the exemplary embodiment of the beam splitter unit including a first optical unit in the form of a polyhedron and a second optical unit in the form of a polyhedron, the first optical unit and the second optical unit are arranged relative to one another in such a way that the beam splitter unit includes a single dichroic interface. The dichroic interface serves to split the light incident on the dichroic interface into (i) light at a first specific wavelength or from a first specific wavelength range and (ii) light at a second specific wavelength or from a second specific wavelength range.

In the case of the exemplary embodiment of the beam splitter unit including a first optical unit in the form of a polyhedron, a second optical unit in the form of a polyhedron, a third optical unit in the form of a polyhedron, and a fourth optical unit in the form of a polyhedron, the first optical unit, the second optical unit, the third optical unit, and the fourth optical unit are arranged relative to one another in such a way that the beam splitter unit includes two dichroic interfaces. The two dichroic interfaces serve to split the light incident on the two dichroic interfaces into (i) light at a first specific wavelength or from a first specific wavelength range, (ii) light at a second specific wavelength or from a second specific wavelength range, and (iii) light at a third specific wavelength or from a third specific wavelength range.

In the exemplary embodiment of the beam splitter unit including a first optical unit in the form of a polyhedron, a second optical unit in the form of a polyhedron, a third optical unit in the form of a polyhedron, a fourth optical unit in the form of a polyhedron, a fifth optical unit in the form of a polyhedron, a sixth optical unit in the form of a polyhedron, a seventh optical unit in the form of a polyhedron, and an eighth optical unit in the form of a polyhedron, the first optical unit, the second optical unit, the third optical unit, the fourth optical unit, the fifth optical unit, the sixth optical unit, the seventh optical unit, and the eighth optical unit are arranged relative to one another in such a way that the beam splitter unit includes three dichroic interfaces. The three dichroic interfaces serve to split the light incident on the three dichroic interfaces into (i) light at a first specific wavelength or from a first specific wavelength range, (ii) light at a second specific wavelength or from a second specific wavelength range, (iii) light at a third specific wavelength or from a third specific wavelength range, and (iv) light at a fourth specific wavelength or from a fourth specific wavelength range.

Explicit reference is made to the fact that the disclosure is not restricted to the splitting of light incident on the beam splitter unit into four specific wavelengths or specific wavelength ranges. Rather, the beam splitter unit can be configured such that the splitting of the light incident on the beam splitter unit into any desired number of wavelengths or wavelength ranges is achievable.

As already mentioned hereinbefore, a further exemplary embodiment of the optical apparatus according to the disclosure additionally or alternatively provides for the digital long-range optical apparatus to be in the form of a binocular apparatus, a pair of field glasses, a refractor, in particular a telescopic sight, a telescope, a spotting scope, or a night vision apparatus. Explicit reference is made to the fact that the disclosure is not restricted to the aforementioned exemplary embodiments. Rather, any digital long-range optical apparatus suitable for the disclosure can be used as the digital long-range optical apparatus.

In a further exemplary embodiment of the digital optical apparatus according to the disclosure, provision is additionally or alternatively made for the digital optical apparatus according to the disclosure to include at least one transmitter unit for illuminating the object with light. By way of example, the transmitter unit is arranged at the beam splitter unit. In particular, provision is made for the transmitter unit to be in the form of a light source for illuminating the object, a laser beam of a rangefinder, and/or a laser beam of an illumination device. The light reflected by the object is detected and evaluated with at least one of the aforementioned detectors.

The disclosure also relates to a method for operating a digital long-range optical apparatus including at least one of the features specified hereinbefore or yet to be specified hereinafter or a combination of at least two of the features specified hereinbefore or yet to be specified hereinafter. The method according to the disclosure includes the following steps:

- controlling the first detector with the processor unit with at least one control parameter which has a first value; and
- controlling the second detector with the processor unit with the control parameter which has a second value, with the first value and the second value differing from one another.

The method according to an exemplary embodiment of the disclosure is based on the idea that the first detector and the second detector are each controlled with different values of the control parameter in order thus to generate a first image of the object with the first detector and a second image of the object with the second detector. The first detector and the second detector are each controlled in such a way that the light detected by the first detector and the second detector is detectable in optimal fashion or as desired. The first image and the second image are combined to form an overall image of the object, with the overall image having a good light efficiency and/or a good and/or desired color resolution.

In an exemplary embodiment of the method according to the disclosure, provision is additionally or alternatively made for a plurality of control parameters rather than only a single control parameter to be used to control the first detector and the second detector. Thus, in this exemplary embodiment of the method according to the disclosure, provision is made for the aforementioned control parameter to be a first control parameter, for the aforementioned first value to be a value of the first control parameter, and for the aforementioned second value to be a value of the first control parameter. The exemplary embodiment of the method according to the disclosure includes the following steps:

- controlling the first detector with the processor unit with at least one second control parameter which has a first value; and
- controlling the second detector with the processor unit with the second control parameter which has a second value, with the first value of the second control parameter and the second value of the second control parameter differing from one another.

In a further exemplary embodiment of the method according to the disclosure, provision is additionally or alternatively made for one of the following parameters to be used as the first control parameter: (i) the detection time of the first detector and/or of the second detector, (ii) a detection duration of the first detector and/or of the second detector, (iii) a sensitivity of the first detector and/or of the second detector, (iv) a gain of the first detector and/or of the second detector, or (v) a number of images to be recorded within a specifiable unit of time with the first detector and/or with the second detector.

In yet a further exemplary embodiment of the method according to the disclosure, provision is additionally or alternatively made for one of the following parameters to be used as the second control parameter: (i) a detection time of the first detector and/or of the second detector, (ii) a detection duration of the first detector and/or of the second detector, (iii) a sensitivity of the first detector and/or of the second detector, (iv) a gain of the first detector and/or of the second detector, or (v) a number of images to be recorded within a specifiable unit of time with the first detector and/or using the second detector.

The detection time of the first detector and/or of the second detector is the time at which a detection of the light split by the beam splitter unit is started with the first detector and/or the second detector.

The detection duration of the first detector and/or of the second detector is the period of time during which the first detector and/or the second detector are/is switched such that they generate detection signals on the basis of light incident on the first detector and/or the second detector and transmit the said detection signals to the processor unit.

The option to choose the detection time and detection duration is particularly advantageous since, firstly, for the first light incident on the first detector and, secondly, for the second light incident on the second detector, it is possible to select optimal values for, firstly, the detection time and/or detection duration of the first detector and, secondly, the detection time and/or the detection duration of the second detector. As a result, it is possible to obtain an optimal signal-to-noise ratio between the light incident on the individual detector and the generated detection signals. In this way, it is possible to detect colors better in the case of a non-uniform illumination of the object to be imaged. The first image generated with the first detector and the second image generated with the second detector are combined to form an overall image of the object, with the overall image having a good light efficiency and/or good and/or desired color resolution.

In principle, the sensitivity of the first detector and/or of the second detector is a threshold value which needs to be exceeded in order to generate detection signals on the basis of the light incident on the first detector and/or the second detector and transmit the said detection signals to the processor unit.

The gain of the first detector and/or of the second detector is one option for the amplification of the detection signals from the first detector and the second detector such that these detection signals can be processed better.

The choice of the detection time and an accompanying choice of the number of images to be recorded within a specifiable unit of time with the first detector and/or with the second detector can also be particularly advantageous. As mentioned hereinbefore, the detection time of the first detector and/or of the second detector is the time at which a detection of the light split by the beam splitter unit is started with the first detector and/or the second detector. In an exemplary embodiment of the method according to the disclosure, provision is made for the detectors to record images of the object not simultaneously but at different times. Expressed in other words, the first detector records a first image at a first time. The second detector records a second image at a second time. The first time differs from the second time. Additionally, provision is for example made for the first detector and the second detector to record images alternately. Expressed in other words, the first detector, for example, records a respective image, followed by the second detector, then the first detector again, and, following this, the second detector again. In this way, the provision of a large number of images is possible. These images are combined in such a way that an overall image of the object with a good light efficiency and color resolution is generated.

The method according to the disclosure is not restricted to the use of two detectors, specifically the first detector and the second detector. Rather, a beam splitter unit including three detectors, four detectors, or else more than four detectors can be used for the method according to the disclosure. When the first detector, the second detector, and the third detector are used, the first detector for example can be used to detect red light. The second detector is used to detect green light. The third detector is used to detect blue light. The aforementioned three detectors record images at different times, with the result that, in comparison with a single detector, three times the number of images are generated within a specified period of time. However, since only the image of a single color is available at any one time, the missing images for each individual detector between the detection times are interpolated for example for an image which is intended to be based on all three colors (red, green, blue). Some or all of the generated images are used to generate an overall image of the object.

The disclosure also relates to a camera system for imaging an object. For example, the camera system is arranged in a binocular apparatus, in a pair of field glasses, in a refractor, in particular a telescopic sight, in a telescope, in a spotting scope, in a night vision apparatus, in a cellular telephone and/or in a tablet computer.

The camera system according to an aspect of the disclosure includes at least one optical axis and at least one lens for imaging the object, with the lens being arranged along the optical axis. For example, the lens includes at least one lens element. In particular, provision is made for the lens to include a plurality of lens elements and/or a plurality of optical units, for example lens element groups. In this case, a lens element group is understood to mean an optical unit including at least one lens element or a plurality of lens elements. Additionally, the camera system according to the disclosure is provided with at least one processor unit and at least one display unit for displaying an image of the object, with the processor unit being line-connected to the display unit. Accordingly, signals are transmittable from the processor unit to the display unit and/or from the display unit to the processor unit. The display unit is in the form of a digital display unit. In particular, the display unit can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

Further, the camera system according to the disclosure includes at least one first beam splitter unit. The lens is arranged first along the optical axis in a direction of light incidence, followed by the first beam splitter unit. Moreover, the camera system according to the disclosure includes at least one first detector for the first beam splitter unit and at least one second detector for the first beam splitter unit. The first detector and the second detector are assigned to the first beam splitter unit. The first detector and the second detector serve to detect light generated by the first beam splitter unit. The processor unit is line-connected to the first detector for the first beam splitter unit and also to the second detector for the first beam splitter unit. Accordingly, signals are transmittable from the processor unit to the first detector for the first beam splitter unit and/or from the first detector for the first beam splitter unit to the processor unit. Further, signals are transmittable from the processor unit to the second detector for the first beam splitter unit and/or from the second detector for the first beam splitter unit to the processor unit. The first detector for the first beam splitter unit is configured to detect first light generated by the first beam splitter unit. Expressed in other words, the first detector for the first beam splitter unit detects first light which is generated by the first beam splitter unit by the incidence of light incident on the first beam splitter unit. The second detector for the first beam splitter unit is configured to detect second light generated by the first beam splitter unit. Expressed in other words, the second detector detects second light which is generated by the first beam splitter unit by the incidence of light incident on the first beam splitter unit.

By way of example, the first detector for the first beam splitter unit and/or the second detector for the first beam splitter unit are/is in the form of a CCD detector or CMOS detector. However, the disclosure is not restricted to the aforementioned exemplary embodiments. Rather, the first detector for the first beam splitter unit and/or the second detector for the first beam splitter unit can be any detector suitable for the disclosure.

Further, the camera system according to an aspect of the disclosure includes at least one second beam splitter unit. The lens is arranged first along the optical axis in a direction of light incidence, followed by the second beam splitter unit, and then the first beam splitter unit. Moreover, the camera system according to the disclosure includes at least one first detector for the second beam splitter unit and for example at least one second detector for the second beam splitter unit. Expressed differently, the first detector and for example the second detector are assigned to the second beam splitter unit. The first detector for the second beam splitter unit serves to detect first light generated by the second beam splitter unit. By way of example, the second detector for the second beam splitter unit serves to detect second light generated by the second beam splitter unit. The processor unit is line-connected to the first detector for the second beam splitter unit and also for example to the second detector for the second beam splitter unit. Accordingly, signals are transmittable from the processor unit to the first detector for the second beam splitter unit and/or from the first detector for the second beam splitter unit to the processor unit. Further, signals for example are transmittable from the processor unit to the second detector for the second beam splitter unit and/or from the second detector for the second beam splitter unit to the processor unit. The first detector for the second beam splitter unit is configured to detect first light generated by the second beam splitter unit. Expressed in other words, the first detector for the second beam splitter unit detects first light which is generated by the second beam splitter unit by the incidence of light incident on the second beam splitter unit. If the second detector is provided, then the second detector for the second beam splitter unit is configured to detect second light generated by the second beam splitter unit. Expressed in other words, the second detector detects second light which is generated by the second beam splitter unit by the incidence of light incident on the second beam splitter unit.

By way of example, the first detector for the second beam splitter unit and/or the second detector for the second beam splitter unit are/is in the form of a CCD detector or CMOS detector. However, the disclosure is not restricted to the aforementioned embodiments. Rather, the first detector for the second beam splitter unit and/or the second detector for the second beam splitter unit can be any detector suitable for the disclosure.

The processor unit is additionally in the form of for example a control unit and/or supply unit, which controls the display unit, the first detector for the first beam splitter unit, the second detector for the first beam splitter unit, the first detector for the second beam splitter unit, and/or the second detector for the second beam splitter unit, and/or which supplies these/this with voltage.

It was recognized that, on account of the two beam splitter units, the camera system according to an aspect of the disclosure likewise has a good light efficiency and a good color resolution for the purpose of generating a good image of an object. With the two beam splitter units, it is possible to split light into different color components (wavelengths) and/or wavelength ranges, with the result that information with different color components and/or wavelength ranges is generated. The split color components and/or wavelength ranges are detected by different detectors. The different detection signals provided by the detectors are used for generating a single image and/or a plurality of images of the object. The single generated image or the plurality of generated images have a good light efficiency and a good color resolution. In comparison with the prior art, in which a single detector provided with a Bayer filter and having a single detector area is used, the disclosure first of all provides a plurality of detectors with a plurality of detector areas, with the result that, in comparison with the prior art, more information can be used for the generation of the image of the object. Secondly, the plurality of detectors can be controlled on an individual basis. Both effects lead to images with a good light efficiency and a good color resolution.

In an exemplary embodiment of the camera system according to the disclosure, provision is additionally or alternatively made for a first optical device for the first beam splitter unit to be arranged between the first beam splitter unit and the first detector for the first beam splitter unit. The first optical device for the first beam splitter unit guides the first light from the first beam splitter unit to the first detector for the first beam splitter unit. Additionally or in an alternative thereto, provision is made for a second optical device for the first beam splitter unit to be arranged between the first beam splitter unit and the second detector for the first beam splitter unit. The second optical device for the first beam splitter unit guides the second light from the first beam splitter unit to the second detector for the first beam splitter unit. In a further exemplary embodiment of the camera system according to the disclosure, provision is additionally or alternatively made for the first detector for the first beam splitter unit and/or the second detector for the first beam splitter unit to be arranged at the first beam splitter unit. For example, the first beam splitter unit includes a first beam splitter face, at which the first detector for the first beam splitter unit is arranged. In particular, provision is made for the first beam splitter unit to include a second beam splitter face, at which the second detector for the first beam splitter unit is arranged.

For example, the first beam splitter face of the first beam splitter unit and the second beam splitter face of the first beam splitter unit are arranged with respect to one another at an angle of between 0° and 180°, with the interval boundaries being included. Additionally or as an alternative thereto, the first beam splitter face of the first beam splitter unit and the second beam splitter face of the first beam splitter unit are arranged at a distance from one another. In particular, provision is made for the first beam splitter face of the first beam splitter unit and the second beam splitter face of the first beam splitter unit to be arranged parallel to one another. For example, provision is made for the aforementioned beam splitter faces of the first beam splitter unit to be arranged relative to one another in the style of a cube. Expressed in other words, the aforementioned faces are for example arranged with respect to one another at an angle of 90° or substantially 90°.

In a further exemplary embodiment of the camera system according to the disclosure, provision is additionally or alternatively made for a first optical device for the second beam splitter unit to be arranged between the second beam splitter unit and the first detector for the second beam splitter unit. The first optical device for the second beam splitter unit guides the first light from the second beam splitter unit to the first detector for the second beam splitter unit. Additionally or in an alternative thereto, provision is made for a second optical device for the second beam splitter unit to be arranged between the second beam splitter unit and the second detector for the second beam splitter unit. The second optical device for the second beam splitter unit guides the second light from the second beam splitter unit to the second detector for the second beam splitter unit. In a further exemplary embodiment of the camera system according to the disclosure, provision is additionally or alternatively made for the first detector for the second beam splitter unit and/or the second detector for the second beam splitter unit to be arranged at the second beam splitter unit. For example, the second beam splitter unit includes a first beam splitter face, at which the first detector for the second beam splitter unit is arranged. In particular, provision is made for the second beam splitter unit to include a second beam splitter face, at which the second detector for the second beam splitter unit is arranged.

In yet a further exemplary embodiment of the camera system according to the disclosure, provision is additionally or alternatively made for the first light generated by the first beam splitter unit to include one of the following features: (i) light at only a single first wavelength, (ii) light from a first wavelength range, or (iii) a specifiable first intensity.

Reference is made to the explanations provided hereinbefore in respect of the definition of the terms of single wavelength and wavelength range. These also apply here.

The single first wavelength may for example be a wavelength from the visible or invisible wavelength range. In particular, provision is made for the light at the first wavelength to be a red light, a green light, or a blue light. For example, the first wavelength range can be the wavelength range of the visible light, of the infrared range, of the near-infrared range, or of the short-wavelength infrared light. The exemplary embodiment of the first wavelength range in the form of the near-infrared range or the short-wavelength infrared light is advantageous, especially when observing an object in twilight or low-light weather conditions. The first intensity of the first light generated by the first beam splitter unit can be any selectable intensity, for example a percentage of the light incident in the first beam splitter unit from the lens. For example, the first intensity of the first light generated by the first beam splitter unit, and hence the percentage, is 10%, 20%, 30%, 40%, 50%, 60%, 70%, 80%, or 90% of the light incident in the first beam splitter unit from the lens.

In a further exemplary embodiment of the camera system according to the disclosure, provision is additionally or alternatively made for the second light generated by the first beam splitter unit to include at least one of the following features: (i) light at only a single second wavelength, (ii) light from a second wavelength range, or (iii) a specifiable second intensity.

Reference is made to the explanations provided hereinbefore in respect of the definition of the terms of single wavelength and wavelength range. These also apply here.

The single second wavelength may for example be a wavelength from the visible or invisible wavelength range. In particular, provision is made for the light at the second wavelength to be a red light, a green light, or a blue light. For example, the second wavelength range can be the wavelength range of the visible light, of the infrared range, of the near-infrared range, or of the short-wavelength infrared light. The exemplary embodiment of the second wavelength range in the form of the near-infrared range or the short-wavelength infrared light is advantageous, especially when observing an object in twilight or low-light weather conditions. The second intensity of the second light generated by the first beam splitter unit can be any selectable intensity, for example, depending on the percentage of the first intensity of the first light generated by the first beam splitter unit, a percentage of the light incident in the first beam splitter unit from the lens. For example, the second intensity of the second light generated by the first beam splitter unit, and hence the percentage, is 10%, 20%, 30%, 40%, 50%, 60%, 70%, 80%, or 90% of the light incident in the first beam splitter unit from the lens, depending on the percentage of the first intensity of the first light generated by the first beam splitter unit. For example, the percentage of the first intensity of the first light generated by the first beam splitter unit is 20% and the percentage of the second intensity of the second light generated by the first beam splitter unit is 80%.

In an exemplary embodiment of the camera system according to the disclosure, provision is additionally or alternatively made for the first light generated by the second beam splitter unit to include at least one of the following features: (i) light at only a single third wavelength, (ii) light from a third wavelength range, or (iii) a specifiable third intensity.

Reference is made to the explanations provided hereinbefore in respect of the definition of the terms of single wavelength and wavelength range. These also apply here.

The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing an object in twilight or low-light weather conditions. The third intensity of the first light generated by the second beam splitter unit can be any selectable intensity, for example a percentage of the light incident in the second beam splitter unit from the lens. For example, the third intensity of the first light generated by the second beam splitter unit, and hence the percentage, is 10%, 20%, 30%, 40%, 50%, 60%, 70%, 80%, or 90% of the light incident in the second beam splitter unit from the lens.

In a further exemplary embodiment of the camera system according to the disclosure, provision is additionally or alternatively made for the second light generated by the second beam splitter unit to include one of the following features: (i) light at only a single fourth wavelength, (ii) light from a fourth wavelength range, or (iii) a specifiable fourth intensity.

Reference is made to the explanations provided hereinbefore in respect of the definition of the terms of single wavelength and wavelength range. These also apply here.

The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing an object in twilight or low-light weather conditions. The fourth intensity of the second light generated by the second beam splitter unit can be any selectable intensity, for example, depending on the percentage of the third intensity of the first light generated by the second beam splitter unit, a percentage of the light incident in the second beam splitter unit from the lens. For example, the fourth intensity of the second light generated by the second beam splitter unit, and hence the percentage, is 10%, 20%, 30%, 40%, 50%, 60%, 70%, 80%, or 90% of the light incident in the second beam splitter unit from the lens, depending on the percentage of the third intensity of the first light generated by the second beam splitter unit. For example, the percentage of the third intensity of the first light generated by the second beam splitter unit is 20% and the percentage of the fourth intensity of the second light generated by the second beam splitter unit is 80%.

In yet a further exemplary embodiment of the camera system according to the disclosure, provision is additionally or alternatively made for the first detector for the first beam splitter unit to include a sensitive first detector area. The pixels of the first detector for the first beam splitter unit which detect the first light generated by the first beam splitter unit are arranged at the first detector area. The first detector area is not necessarily the entire detector area where pixels of the first detector for the first beam splitter unit which detect the first light are arranged. Rather, an exemplary embodiment of the camera system according to the disclosure provides for the first detector area to be a partial area of the entire detector area of the first detector for the first beam splitter unit. By way of example, provision is made for the processor unit to be used to control the first detector for the first beam splitter unit in such a way that a selectable first detector area is switched to be sensitive for the detection of first light. Further, additional provision is made for the second detector for the first beam splitter unit to include a sensitive second detector area. The pixels of the second detector for the first beam splitter unit which detect the second light are arranged at the second detector area. The second detector area is not necessarily the entire detector area where pixels of the second detector for the first beam splitter unit which detect the second light are arranged. Rather, an exemplary embodiment of the camera system according to the disclosure provides for the second detector area to be a partial area of the entire detector area of the second detector for the first beam splitter unit. By way of example, provision is made for the processor unit to be used to control the second detector for the first beam splitter unit in such a way that a selectable second detector area is switched to be sensitive for the detection of second light. The first detector area differs in size from the second detector area. This exemplary embodiment of the camera system according to the disclosure is advantageous in that a first image generated by the first detector for the first beam splitter unit and a second image generated by the second detector for the first beam splitter unit are based on differently sized fields of view. As a result, it is possible to provide digital zooming within the scope of the camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. It is advantageous that the resolution of the images remains the same for all zoom levels if the resolution of the detectors is the same. By contrast, in the case of a digital zoom known from the prior art, the resolution reduces as the zooming increases.

In a further exemplary embodiment of the camera system according to the disclosure, provision is additionally or alternatively made for the first detector for the second beam splitter unit to include a sensitive first detector area. The pixels of the first detector for the second beam splitter unit which detect the first light generated by the second beam splitter unit are arranged at the first detector area. The first detector area is not necessarily the entire detector area where pixels of the first detector for the second beam splitter unit which detect the first light are arranged. Rather, an exemplary embodiment of the camera system according to the disclosure provides for the first detector area to be a partial area of the entire detector area of the first detector for the second beam splitter unit. By way of example, provision is made for the processor unit to be used to control the first detector for the second beam splitter unit in such a way that a selectable first detector area is switched to be sensitive for the detection of first light. Further, additional provision is made for the second detector for the second beam splitter unit to include a sensitive second detector area. The pixels of the second detector for the second beam splitter unit which detect the second light are arranged at the second detector area. The second detector area is not necessarily the entire detector area where pixels of the second detector for the second beam splitter unit which detect the second light are arranged. Rather, an exemplary embodiment of the camera system according to the disclosure provides for the second detector area to be a partial area of the entire detector area of the second detector for the second beam splitter unit. By way of example, provision is made for the processor unit to be used to control the second detector for the second beam splitter unit in such a way that a selectable second detector area is switched to be sensitive for the detection of second light. The first detector area differs in size from the second detector area. This exemplary embodiment of the camera system according to the disclosure is advantageous in that a first image generated by the first detector for the second beam splitter unit and a second image generated by the second detector for the second beam splitter unit are based on differently sized fields of view. As a result, it is possible to provide digital zooming within the scope of the camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. It is advantageous that the resolution of the images remains the same for all zoom levels if the resolution of the detectors is the same. By contrast, in the case of a digital zoom known from the prior art, the resolution reduces as the zooming increases.

In an exemplary embodiment of the camera system according to the disclosure, provision is additionally or alternatively made for the first beam splitter unit to include a first beam splitter face, at which the first detector for the first beam splitter unit is arranged. The first beam splitter face includes a first face center. Moreover, the first beam splitter unit includes a second beam splitter face, at which the second detector for the first beam splitter unit is arranged. The second beam splitter face includes a second face center. The first detector for the first beam splitter unit includes a first detector area center. By contrast, the second detector for the first beam splitter unit includes a second detector area center. In this exemplary embodiment of the camera system according to the disclosure, provision is made for the first detector area center of the first detector for the first beam splitter unit to be at a first distance from the first face center of the first beam splitter face of the first beam splitter unit and for the second detector area center of the second detector for the first beam splitter unit to be at a second distance from the second face center of the second beam splitter face of the first beam splitter unit. The first distance differs from the second distance. In principle, the two detector areas are arranged offset to each other with regard to the beam splitter face assigned to them. This exemplary embodiment ensures that the aforementioned first detector area and the aforementioned second detector area do not record exactly the same image of the object but instead record different image portions of the object. As a result, it is possible to calculate and present a super-resolution image of the object using known super-resolution algorithms (which are used for super-resolution imaging).

In a further exemplary embodiment of the camera system according to the disclosure, provision is additionally or alternatively made for the second beam splitter unit to include a first beam splitter face, at which the first detector for the second beam splitter unit is arranged. The first beam splitter face includes a first face center. Moreover, the second beam splitter unit includes a second beam splitter face, at which the second detector for the second beam splitter unit is arranged. The second beam splitter face includes a second face center. The first detector for the second beam splitter unit includes a first detector area center. By contrast, the second detector for the second beam splitter unit includes a second detector area center. In this exemplary embodiment of the camera system according to the disclosure, provision is made for the first detector area center of the first detector for the second beam splitter unit to be at a first distance from the first face center of the first beam splitter face of the second beam splitter unit and for the second detector area center of the second detector for the second beam splitter unit to be at a second distance from the second face center of the second beam splitter face of the second beam splitter unit. The first distance differs from the second distance. In principle, the two detector areas are arranged offset to each other with regard to the beam splitter face assigned to them. This exemplary embodiment ensures that the aforementioned first detector area and the aforementioned second detector area do not record exactly the same image of the object but instead record different image portions of the object. As a result, it is possible to calculate and present a super-resolution image of the object using known super-resolution algorithms (which are used for super-resolution imaging).

In yet a further exemplary embodiment of the camera system according to the disclosure, provision is additionally or alternatively made for the camera system according to the disclosure to include at least one third detector for the first beam splitter unit. The camera system according to the disclosure consequently does not include only two detectors in the form of the first detector for the first beam splitter unit and the second detector for the first beam splitter unit, but instead includes more than two detectors for the first beam splitter unit. The processor unit is line-connected to the third detector for the first beam splitter unit. Accordingly, signals are transmittable from the processor unit to the third detector for the first beam splitter unit and/or signals are transmittable from the third detector for the first beam splitter unit to the processor unit. The third detector for the first beam splitter unit is configured to detect third light generated by the first beam splitter unit. The third light includes one of the following features: (i) light at only a single fifth wavelength, (ii) light from a fifth wavelength range, or (iii) a specifiable fifth intensity.

Reference is made to the explanations provided hereinbefore in respect of the definition of the terms of single wavelength and wavelength range. These also apply here.

The single fifth wavelength may for example be a wavelength from the visible or invisible wavelength range. In particular, provision is made for the light at the fifth wavelength to be a red light, a green light, or a blue light. For example, the fifth wavelength range can be the wavelength range of the visible light, of the infrared range, of the near-infrared range, or of the short-wavelength infrared light. The exemplary embodiment of the fifth wavelength range in the form of the near-infrared range or the short-wavelength infrared light is advantageous, especially when observing an object in twilight or low-light weather conditions. The fifth intensity of the third light generated by the first beam splitter unit can be any selectable intensity, for example, depending on the percentage of the first intensity of the first light generated by the first beam splitter unit and/or the second intensity of the second light generated by the first beam splitter unit, a percentage of the light incident in the first beam splitter unit from the lens. For example, the fifth intensity of the third light generated by the first beam splitter unit, and hence the percentage, is 10%, 20%, 30%, 40%, 50%, 60%, 70%, 80%, or 90% of the light incident in the first beam splitter unit from the lens, depending on the percentage of the first intensity of the first light generated by the first beam splitter unit and/or the second intensity of the second light generated by the first beam splitter unit. For example, the percentage of the first intensity of the first light generated by the first beam splitter unit is 20%, the percentage of the second intensity of the second light generated by the first beam splitter unit is 50%, and the percentage of the fifth intensity of the third light generated by the first beam splitter unit is 30%.

In a further exemplary embodiment of the camera system according to the disclosure, provision is additionally or alternatively made for the camera system according to the disclosure to include at least one third detector for the second beam splitter unit. The camera system according to the disclosure consequently does not include only two detectors in the form of the first detector for the second beam splitter unit and the second detector for the second beam splitter unit, but instead includes more than two detectors for the second beam splitter unit. The processor unit is line-connected to the third detector for the second beam splitter unit. Accordingly, signals are transmittable from the processor unit to the third detector for the second beam splitter unit and/or signals are transmittable from the third detector for the second beam splitter unit to the processor unit. The third detector for the second beam splitter unit is configured to detect third light generated by the second beam splitter unit. The third light includes one of the following features: (i) light at only a single sixth wavelength, (ii) light from a sixth wavelength range, or (iii) a specifiable sixth intensity.

Reference is made to the explanations provided hereinbefore in respect of the definition of the terms of single wavelength and wavelength range. These also apply here.

The single sixth wavelength may for example be a wavelength from the visible or invisible wavelength range. In particular, provision is made for the light at the sixth wavelength to be a red light, a green light, or a blue light. For example, the sixth wavelength range can be the wavelength range of the visible light, of the infrared range, of the near-infrared range, or of the short-wavelength infrared light. The exemplary embodiment of the sixth wavelength range in the form of the near-infrared range or the short-wavelength infrared light is advantageous, especially when observing an object in twilight or low-light weather conditions. The sixth intensity of the third light generated by the second beam splitter unit can be any selectable intensity, for example, depending on the percentage of the third intensity of the first light generated by the second beam splitter unit and/or the fourth intensity of the second light generated by the second beam splitter unit, a percentage of the light incident in the second beam splitter unit from the lens. For example, the sixth intensity of the third light generated by the second beam splitter unit, and hence the percentage, is 10%, 20%, 30%, 40%, 50%, 60%, 70%, 80%, or 90% of the light incident in the second beam splitter unit from the lens, depending on the percentage of the third intensity of the first light generated by the second beam splitter unit and/or the fourth intensity of the second light generated by the second beam splitter unit. For example, the percentage of the third intensity of the first light generated by the second beam splitter unit is 20%, the percentage of the fourth intensity of the second light generated by the second beam splitter unit is 50%, and the percentage of the sixth intensity of the third light generated by the second beam splitter unit is 30%.

In an exemplary embodiment of the camera system according to the disclosure, provision is additionally or alternatively made for the third detector for the first beam splitter unit to include a sensitive third detector area. The pixels of the third detector for the first beam splitter unit which detect the third light are arranged at the third detector area. The third detector area is not necessarily the entire detector area where pixels of the third detector for the first beam splitter unit which detect the third light are arranged. Rather, an exemplary embodiment of the camera system according to the disclosure provides for the third detector area to be a partial area of the entire detector area of the third detector for the first beam splitter unit. By way of example, provision is made for the processor unit to be used to control the third detector for the first beam splitter unit in such a way that a selectable third detector area is switched to be sensitive for the detection of third light. The third detector area of the third detector for the first beam splitter unit differs in size from the first detector area of the first detector for the first beam splitter unit and/or the second detector area of the second detector for the first beam splitter unit. This exemplary embodiment of the camera system according to the disclosure is advantageous in that a first image generated by the first detector for the first beam splitter unit, a second image generated by the second detector for the first beam splitter unit, and a third image generated by the third detector for the first beam splitter unit are based on differently sized fields of view. As a result, it is possible to provide digital zooming within the scope of the camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based on a third field of view and shows a third image portion of the object, which corresponds to an image at a third zoom level. It is advantageous that the resolution of the images remains the same for all zoom levels if the resolution of the detectors is the same. By contrast, in the case of a digital zoom known from the prior art, the resolution reduces as the zooming increases.

In a further exemplary embodiment of the camera system according to the disclosure, provision is additionally or alternatively made for the third detector for the second beam splitter unit to include a sensitive third detector area. The pixels of the third detector for the second beam splitter unit which detect the third light generated by the second beam splitter unit are arranged at the third detector area. The third detector area is not necessarily the entire detector area where pixels of the third detector for the second beam splitter unit which detect the third light are arranged. Rather, an exemplary embodiment of the camera system according to the disclosure provides for the third detector area to be a partial area of the entire detector area of the third detector for the second beam splitter unit. By way of example, provision is made for the processor unit to be used to control the third detector for the second beam splitter unit in such a way that a selectable third detector area is switched to be sensitive for the detection of third light generated by the second beam splitter unit. The third detector area of the third detector for the second beam splitter unit differs in size from the first detector area of the first detector for the second beam splitter unit and/or the second detector area of the second detector for the second beam splitter unit. This exemplary embodiment of the camera system according to the disclosure is advantageous in that a first image generated by the first detector for the second beam splitter unit, a second image generated by the second detector for the second beam splitter unit, and a third image generated by the third detector for the second beam splitter unit are based on differently sized fields of view. As a result, it is possible to provide digital zooming within the scope of the camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based on a third field of view and shows a third image portion of the object, which corresponds to an image at a third zoom level. It is advantageous that the resolution of the images remains the same for all zoom levels. By contrast, in the case of a digital zoom known from the prior art, the resolution reduces as the zooming increases.

In yet a further exemplary embodiment of the camera system according to the disclosure, provision is additionally or alternatively made for the first beam splitter unit to include a third beam splitter face, at which the third detector for the first beam splitter unit is arranged. The third beam splitter face of the first beam splitter unit includes a third face center. As already explained hereinbefore, the first detector area center of the first detector for the first beam splitter unit is at a first distance from the first face center of the first beam splitter face of the first beam splitter unit. The second detector area center of the second detector for the first beam splitter unit is at a second distance from the second face center of the second beam splitter face of the first beam splitter unit. Further, the third detector area center of the third detector for the first beam splitter unit is at a third distance from the third face center of the third beam splitter face of the first beam splitter unit. The third distance between the third detector area center of the third detector for the first beam splitter unit and the third face center of the third beam splitter face of the first beam splitter unit differs from the first distance between the first detector area center of the first detector for the first beam splitter unit and the first face center of the first beam splitter face of the first beam splitter unit. Additionally or as an alternative, the third distance between the third detector area center of the third detector for the first beam splitter unit and the third face center of the third beam splitter face of the first beam splitter unit differs from the second distance between the second detector area center of the second detector for the first beam splitter unit and the second face center of the second beam splitter face of the first beam splitter unit. In principle, the three detector areas are arranged offset to each other with regard to the beam splitter face assigned to them. This exemplary embodiment ensures that the aforementioned first detector area, the aforementioned second detector area, and the aforementioned third detector area do not record exactly the same image of the object but instead record different image portions of the object. As a result, it is possible to calculate and present a super-resolution image of the object with known super-resolution algorithms (which are used for super-resolution imaging).

For example, at least two of the faces or each of the faces of the first beam splitter face of the first beam splitter unit, the second beam splitter face of the first beam splitter unit, and the third beam splitter face of the first beam splitter unit are arranged with respect to one another at an angle of between 0° and 180°, with the interval boundaries being included. Additionally or as an alternative thereto, at least two faces of the first beam splitter face of the first beam splitter unit, the second beam splitter face of the first beam splitter unit, and the third beam splitter face of the first beam splitter unit are arranged at a distance from one another. In particular, provision is made for at least two of the aforementioned faces of the first beam splitter unit to be arranged parallel to one another. For example, provision is made for the aforementioned beam splitter faces of the first beam splitter unit to be arranged relative to one another in the style of a cube. Expressed in other words, respectively two of the aforementioned faces of the first beam splitter unit are for example arranged with respect to one another at an angle of 90° or substantially 90°.

In a further exemplary embodiment of the camera system according to the disclosure, provision is additionally or alternatively made for the second beam splitter unit to include a third beam splitter face, at which the third detector for the second beam splitter unit is arranged. The third beam splitter face of the second beam splitter unit includes a third face center. As already explained hereinbefore, the first detector area center of the first detector for the second beam splitter unit is at a first distance from the first face center of the first beam splitter face of the second beam splitter unit. The second detector area center of the second detector for the second beam splitter unit is at a second distance from the second face center of the second beam splitter face of the second beam splitter unit. Further, the third detector area center of the third detector for the second beam splitter unit is at a third distance from the third face center of the third beam splitter face of the second beam splitter unit. The third distance between the third detector area center of the third detector for the second beam splitter unit and the third face center of the third beam splitter face of the second beam splitter unit differs from the first distance between the first detector area center of the first detector for the second beam splitter unit and the first face center of the first beam splitter face of the second beam splitter unit. Additionally or as an alternative, the third distance between the third detector area center of the third detector for the second beam splitter unit and the third face center of the third beam splitter face of the second beam splitter unit differs from the second distance between the second detector area center of the second detector for the second beam splitter unit and the second face center of the second beam splitter face of the second beam splitter unit. In principle, the three detector areas are arranged offset to each other with regard to the beam splitter face assigned to them. This exemplary embodiment ensures that the aforementioned first detector area, the aforementioned second detector area, and the aforementioned third detector area do not record exactly the same image of the object but instead record different image portions of the object. As a result, it is possible to calculate and present a super-resolution image of the object using known super-resolution algorithms (which are used for super-resolution imaging).

For example, at least two of the faces or each of the faces of the first beam splitter face of the second beam splitter unit, the second beam splitter face of the second beam splitter unit, and the third beam splitter face of the second beam splitter unit are arranged with respect to one another at an angle of between 0° and 180°, with the interval boundaries being included. Additionally or as an alternative thereto, at least two faces of the first beam splitter face of the second beam splitter unit, the second beam splitter face of the second beam splitter unit, and the third beam splitter face of the second beam splitter unit are arranged at a distance from one another. In particular, provision is made for at least two of the aforementioned faces of the second beam splitter unit to be arranged parallel to one another. For example, provision is made for the aforementioned beam splitter faces of the second beam splitter unit to be arranged relative to one another in the style of a cube. Expressed in other words, respectively two of the aforementioned faces of the second beam splitter unit are for example arranged with respect to one another at an angle of 90° or substantially 90°.

In an exemplary embodiment of the camera system according to the disclosure, provision is additionally or alternatively made for the camera system according to the disclosure to include at least one fourth detector for the first beam splitter unit. Consequently, the camera system according to the disclosure does not only include two or three detectors for the first beam splitter unit but instead includes more than three detectors for the first beam splitter unit. The processor unit is line-connected to the fourth detector for the first beam splitter unit. Accordingly, signals are transmittable from the processor unit to the fourth detector for the first beam splitter unit and/or signals are transmittable from the fourth detector for the first beam splitter unit to the processor unit. The fourth detector for the first beam splitter unit is configured to detect fourth light generated by the first beam splitter unit. The fourth light includes one of the following features: (i) light at only a single seventh wavelength, (ii) light from a seventh wavelength range, or (iii) a specifiable seventh intensity.

Reference is made to the explanations provided hereinbefore in respect of the definition of the terms of single wavelength and wavelength range. These also apply here.

The single seventh wavelength may for example be a wavelength from the visible or invisible wavelength range. In particular, provision is made for the light at the seventh wavelength to be a red light, a green light, or a blue light. For example, the seventh wavelength range can be the wavelength range of the visible light, of the infrared range, of the near-infrared range, or of the short-wavelength infrared light. The exemplary embodiment of the seventh wavelength range in the form of the near-infrared range or the short-wavelength infrared light is advantageous, especially when observing an object in twilight or low-light weather conditions. The seventh intensity of the fourth light generated by the first beam splitter unit can be any selectable intensity, for example, depending on the percentage of the first intensity of the first light generated by the first beam splitter unit and/or the second intensity of the second light generated by the first beam splitter unit and/or the fifth intensity of the third light generated by the first beam splitter unit, a percentage of the light incident in the first beam splitter unit from the lens. For example, the seventh intensity of the fourth light generated by the first beam splitter unit, and hence the percentage, is 10%, 20%, 30%, 40%, 50%, 60%, 70%, 80%, or 90% of the light incident in the first beam splitter unit from the lens, depending on the percentage of the first intensity of the first light generated by the first beam splitter unit and/or the second intensity of the second light generated by the first beam splitter unit and/or the fifth intensity of the third light generated by the first beam splitter unit. For example, the percentage of the first intensity of the first light generated by the first beam splitter unit is 20%, the percentage of the second intensity of the second light generated by the first beam splitter unit is 50%, the percentage of the fifth intensity of the third light generated by the first beam splitter unit is 15%, and the percentage of the seventh intensity of the fourth light generated by the first beam splitter unit is 15%.

In a further exemplary embodiment of the camera system according to the disclosure, provision is additionally or alternatively made for the camera system according to the disclosure to include at least one fourth detector for the second beam splitter unit. Consequently, the camera system according to the disclosure does not only include two or three detectors but instead includes more than three detectors for the second beam splitter unit. The processor unit is line-connected to the fourth detector for the second beam splitter unit. Accordingly, signals are transmittable from the processor unit to the fourth detector for the second beam splitter unit and/or signals are transmittable from the fourth detector for the second beam splitter unit to the processor unit. The fourth detector for the second beam splitter unit is configured to detect fourth light generated by the second beam splitter unit. The fourth light includes one of the following features: (i) light at only a single eighth wavelength, (ii) light from an eighth wavelength range, or (iii) a specifiable eighth intensity.

Reference is made to the explanations provided hereinbefore in respect of the definition of the terms of single wavelength and wavelength range. These also apply here.

The single eighth wavelength may for example be a wavelength from the visible or invisible wavelength range. In particular, provision is made for the light at the eighth wavelength to be a red light, a green light, or a blue light. For example, the eighth wavelength range can be the wavelength range of the visible light, of the infrared range, of the near-infrared range, or of the short-wavelength infrared light. The exemplary embodiment of the eighth wavelength range in the form of the near-infrared range or the short-wavelength infrared light is advantageous, especially when observing an object in twilight or low-light weather conditions. The eighth intensity of the fourth light generated by the second beam splitter unit can be any selectable intensity, for example, depending on the percentage of the third intensity of the first light generated by the second beam splitter unit and/or the fourth intensity of the second light generated by the second beam splitter unit and/or the sixth intensity of the third light generated by the second beam splitter unit, a percentage of the light incident in the second beam splitter unit from the lens. For example, the eighth intensity, and hence the percentage, is 10%, 20%, 30%, 40%, 50%, 60%, 70%, 80%, or 90% of the light incident in the second beam splitter unit from the lens, depending on the percentage of the third intensity of the first light generated by the second beam splitter unit and/or the fourth intensity of the second light generated by the second beam splitter unit and/or the sixth intensity of the third light generated by the second beam splitter unit. For example, the percentage of the third intensity of the first light generated by the second beam splitter unit is 20%, the percentage of the fourth intensity of the second light generated by the second beam splitter unit is 50%, the percentage of the sixth intensity of the third light generated by the second beam splitter unit is 15%, and the percentage of the eighth intensity of the fourth light generated by the second beam splitter unit is 15%.

In yet a further exemplary embodiment of the camera system according to the disclosure, provision is additionally or alternatively made for the fourth detector for the first beam splitter unit to include a sensitive fourth detector area. The pixels of the fourth detector for the first beam splitter unit which detect the fourth light generated by the first beam splitter unit are arranged at the fourth detector area. The fourth detector area is not necessarily the entire detector area where pixels of the fourth detector for the first beam splitter unit, which detect the fourth light generated by the first beam splitter unit, are arranged. Rather, an exemplary embodiment of the camera system according to the disclosure provides for the fourth detector area to be a partial area of the entire detector area of the fourth detector for the first beam splitter unit. By way of example, provision is made for the processor unit to be used to control the fourth detector for the first beam splitter unit in such a way that a selectable fourth detector area is switched to be sensitive for the detection of fourth light generated by the first beam splitter unit. The fourth detector area of the fourth detector for the first beam splitter unit differs in size from the first detector area of the first detector for the first beam splitter unit and/or the second detector area of the second detector for the first beam splitter unit and/or the third detector area of the third detector for the first beam splitter unit. This exemplary embodiment of the camera system according to the disclosure is advantageous in that a first image generated by the first detector for the first beam splitter unit, a second image generated by the second detector for the first beam splitter unit, a third image generated by the third detector for the first beam splitter unit, and a fourth image generated by the fourth detector for the first beam splitter unit are based on differently sized fields of view. As a result, it is possible to provide digital zooming within the scope of the camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based for example on a third field of view and shows a third image portion of the object, which corresponds to an image at a third zoom level. The fourth image is based for example on a fourth field of view and shows a fourth image portion of the object, which corresponds to an image at a fourth zoom level. It is advantageous that the resolution of the images remains the same for all zoom levels if the resolution of the detectors is the same. By contrast, in the case of a digital zoom known from the prior art, the resolution reduces as the zooming increases.

In a further exemplary embodiment of the camera system according to the disclosure, provision is additionally or alternatively made for the fourth detector for the second beam splitter unit to include a sensitive fourth detector area. The pixels of the fourth detector for the second beam splitter unit which detect the fourth light generated by the second beam splitter unit are arranged at the fourth detector area. The fourth detector area is not necessarily the entire detector area where pixels of the fourth detector for the second beam splitter unit, which detect the fourth light generated by the second beam splitter unit, are arranged. Rather, an exemplary embodiment of the camera system according to the disclosure provides for the fourth detector area to be a partial area of the entire detector area of the fourth detector for the second beam splitter unit. By way of example, provision is made for the processor unit to be used to control the fourth detector for the second beam splitter unit in such a way that a selectable fourth detector area is switched to be sensitive for the detection of fourth light generated by the second beam splitter unit. The fourth detector area of the fourth detector for the second beam splitter unit differs in size from the first detector area of the first detector for the second beam splitter unit and/or the second detector area of the second detector for the second beam splitter unit and/or the third detector area of the third detector for the second beam splitter unit. This exemplary embodiment of the camera system according to the disclosure is advantageous in that a first image generated by the first detector for the second beam splitter unit, a second image generated by the second detector for the second beam splitter unit, a third image generated by the third detector for the second beam splitter unit, and a fourth image generated by the fourth detector for the second beam splitter unit are based on differently sized fields of view. As a result, it is possible to provide digital zooming within the scope of the camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based for example on a third field of view and shows a third image portion of the object, which corresponds to an image at a third zoom level. The fourth image is based for example on a fourth field of view and shows a fourth image portion of the object, which corresponds to an image at a fourth zoom level. It is advantageous that the resolution of the images remains the same for all zoom levels if the resolution of the detectors is the same. By contrast, in the case of a digital zoom known from the prior art, the resolution reduces as the zooming increases.

In an exemplary embodiment of the camera system according to the disclosure, provision is additionally or alternatively made for the first beam splitter unit to include a fourth beam splitter face, at which the fourth detector for the first beam splitter unit is arranged. The fourth beam splitter face of the first beam splitter unit includes a fourth face center. As already explained hereinbefore, the first detector area center of the first detector for the first beam splitter unit is at a first distance from the first face center of the first beam splitter face of the first beam splitter unit. The second detector area center of the second detector for the first beam splitter unit is at a second distance from the second face center of the second beam splitter face of the first beam splitter unit. Further, the third detector area center of the third detector for the first beam splitter unit is at a third distance from the third face center of the third beam splitter face of the first beam splitter unit. The fourth detector area center of the fourth detector for the first beam splitter unit is at a fourth distance from the fourth face center of the fourth beam splitter face of the first beam splitter unit. The fourth distance between the fourth detector area center of the fourth detector for the first beam splitter unit and the fourth face center of the fourth beam splitter face of the first beam splitter unit differs from the first distance between the first detector area center of the first detector for the first beam splitter unit and the first face center of the first beam splitter face of the first beam splitter unit. Additionally or as an alternative, the fourth distance between the fourth detector area center of the fourth detector for the first beam splitter unit and the fourth face center of the fourth beam splitter face of the first beam splitter unit differs from the second distance between the second detector area center of the second detector for the first beam splitter unit and the second face center of the second beam splitter face of the first beam splitter unit. Further additionally or in a further alternative, the fourth distance between the fourth detector area center of the fourth detector for the first beam splitter unit and the fourth face center of the fourth beam splitter face of the first beam splitter unit differs from the third distance between the third detector area center of the third detector for the first beam splitter unit and the third face center of the third beam splitter face of the first beam splitter unit. In principle, the aforementioned four detector areas are arranged offset to each other with regard to the beam splitter face assigned to them. This exemplary embodiment ensures that the first detector area, the second detector area, the third detector area, and the fourth detector area do not record exactly the same image of the object but instead record different image portions of the object. As a result, it is possible to calculate and present a super-resolution image of the object with known super-resolution algorithms (which are used for super-resolution imaging).

In a further exemplary embodiment of the camera system according to the disclosure, provision is additionally or alternatively made for the second beam splitter unit to include a fourth beam splitter face, at which the fourth detector for the second beam splitter unit is arranged. The fourth beam splitter face of the second beam splitter unit includes a fourth face center. As already explained hereinbefore, the first detector area center of the first detector for the second beam splitter unit is at a first distance from the first face center of the first beam splitter face of the second beam splitter unit. The second detector area center of the second detector for the second beam splitter unit is at a second distance from the second face center of the second beam splitter face of the second beam splitter unit. Further, the third detector area center of the third detector for the second beam splitter unit is at a third distance from the third face center of the third beam splitter face of the second beam splitter unit. The fourth detector area center of the fourth detector for the second beam splitter unit is at a fourth distance from the fourth face center of the fourth beam splitter face of the second beam splitter unit. The fourth distance between the fourth detector area center of the fourth detector for the second beam splitter unit and the fourth face center of the fourth beam splitter face of the second beam splitter unit differs from the first distance between the first detector area center of the first detector for the second beam splitter unit and the first face center of the first beam splitter face of the second beam splitter unit. Additionally or as an alternative, the fourth distance between the fourth detector area center of the fourth detector for the second beam splitter unit and the fourth face center of the fourth beam splitter face of the second beam splitter unit differs from the second distance between the second detector area center of the second detector for the second beam splitter unit and the second face center of the second beam splitter face of the second beam splitter unit. Further additionally or in a further alternative, the fourth distance between the fourth detector area center of the fourth detector for the second beam splitter unit and the fourth face center of the fourth beam splitter face of the second beam splitter unit differs from the third distance between the third detector area center of the third detector for the second beam splitter unit and the third face center of the third beam splitter face of the second beam splitter unit. In principle, the aforementioned four detector areas are arranged offset to each other with regard to the beam splitter face assigned to them. This exemplary embodiment ensures that the first detector area, the second detector area, the third detector area, and the fourth detector area do not record exactly the same image of the object but instead record different image portions of the object. As a result, it is possible to calculate and present a super-resolution image of the object with known super-resolution algorithms (which are used for super-resolution imaging).

For example, at least two of the faces or each of the faces of the first beam splitter face of the second beam splitter unit, the second beam splitter face of the second beam splitter unit, the third beam splitter face of the second beam splitter unit, and the fourth beam splitter face of the second beam splitter unit are arranged with respect to one another at an angle of between 0° and 180°, with the interval boundaries being included. Additionally or as an alternative thereto, at least two faces of the first beam splitter face of the second beam splitter unit, the second beam splitter face of the second beam splitter unit, the third beam splitter face of the second beam splitter unit, and the fourth beam splitter face of the second beam splitter unit are arranged at a distance from one another. In particular, provision is made for at least two of the aforementioned faces of the second beam splitter unit to be arranged parallel to one another. For example, provision is made for the aforementioned beam splitter faces of the second beam splitter unit to be arranged relative to one another in the style of a cube. Expressed in other words, respectively two of the aforementioned faces of the second beam splitter unit are for example arranged with respect to one another at an angle of 90° or substantially 90°.

In yet a further exemplary embodiment of the camera system according to the disclosure, provision is additionally or alternatively made for the first beam splitter unit to include one of the following features:

- at least one first optical unit in the form of a polyhedron and at least one second optical unit in the form of a polyhedron;
- at least one first optical unit in the form of a polyhedron, at least one second optical unit in the form of a polyhedron, at least one third optical unit in the form of a polyhedron, and at least one fourth optical unit in the form of a polyhedron; and
- at least one first optical unit in the form of a polyhedron, at least one second optical unit in the form of a polyhedron, at least one third optical unit in the form of a polyhedron, at least one fourth optical unit in the form of a polyhedron, at least one fifth optical unit in the form of a polyhedron, at least one sixth optical unit in the form of a polyhedron, at least one seventh optical unit in the form of a polyhedron, and at least one eighth optical unit in the form of a polyhedron.

By way of example, provision is made for a dichroic interface to be arranged between at least two of the aforementioned optical units. In particular, provision is made for the dichroic interface to be arranged as a coating at at least one of the two optical units or as a coating at both of the two optical units. A specific wavelength or a specific wavelength range of the light incident on the dichroic interface is transmitted through the dichroic interface. All further wavelengths or wavelength ranges which do not correspond to the specific wavelength or which do not belong to the specific wavelength range are reflected.

In the case of the exemplary embodiment of the first beam splitter unit including a first optical unit in the form of a polyhedron and a second optical unit in the form of a polyhedron, the first optical unit and the second optical unit are arranged relative to one another in such a way that the first beam splitter unit includes a single dichroic interface. The dichroic interface serves to split the light incident on the dichroic interface into (i) light at a first specific wavelength or from a first specific wavelength range and (ii) light at a second specific wavelength or from a second specific wavelength range.

In the case of the exemplary embodiment of the first beam splitter unit including a first optical unit in the form of a polyhedron, a second optical unit in the form of a polyhedron, a third optical unit in the form of a polyhedron, and a fourth optical unit in the form of a polyhedron, the first optical unit, the second optical unit, the third optical unit, and the fourth optical unit are arranged relative to one another in such a way that the first beam splitter unit includes two dichroic interfaces. The two dichroic interfaces serve to split the light incident on the two dichroic interfaces into (i) light at a first specific wavelength or from a first specific wavelength range, (ii) light at a second specific wavelength or from a second specific wavelength range, and (iii) light at a third specific wavelength or from a third specific wavelength range.

In the exemplary embodiment of the first beam splitter unit including a first optical unit in the form of a polyhedron, a second optical unit in the form of a polyhedron, a third optical unit in the form of a polyhedron, a fourth optical unit in the form of a polyhedron, a fifth optical unit in the form of a polyhedron, a sixth optical unit in the form of a polyhedron, a seventh optical unit in the form of a polyhedron, and an eighth optical unit in the form of a polyhedron, the first optical unit, the second optical unit, the third optical unit, the fourth optical unit, the fifth optical unit, the sixth optical unit, the seventh optical unit, and the eighth optical unit are arranged relative to one another in such a way that the first beam splitter unit includes three dichroic interfaces. The three dichroic interfaces serve to split the light incident on the three dichroic interfaces into (i) light at a first specific wavelength or from a first specific wavelength range, (ii) light at a second specific wavelength or from a second specific wavelength range, (iii) light at a third specific wavelength or from a third specific wavelength range, and (iv) light at a fourth specific wavelength or from a fourth specific wavelength range.

Explicit reference is made to the fact that the disclosure is not restricted to the splitting of light incident on the first beam splitter unit into four specific wavelengths or four specific wavelength ranges. Rather, the first beam splitter unit can be configured such that the splitting of the light incident on the first beam splitter unit into any desired number of wavelengths or wavelength ranges is achievable.

In yet a further exemplary embodiment of the camera system according to the disclosure, provision is additionally or alternatively made for the second beam splitter unit to include one of the following features:

- at least one first optical unit in the form of a polyhedron and at least one second optical unit in the form of a polyhedron;
- at least one first optical unit in the form of a polyhedron, at least one second optical unit in the form of a polyhedron, at least one third optical unit in the form of a polyhedron, and at least one fourth optical unit in the form of a polyhedron; and
- at least one first optical unit in the form of a polyhedron, at least one second optical unit in the form of a polyhedron, at least one third optical unit in the form of a polyhedron, at least one fourth optical unit in the form of a polyhedron, at least one fifth optical unit in the form of a polyhedron, at least one sixth optical unit in the form of a polyhedron, at least one seventh optical unit in the form of a polyhedron, and at least one eighth optical unit in the form of a polyhedron.

By way of example, provision is made for a dichroic interface to be arranged between at least two of the aforementioned optical units. In particular, provision is made for the dichroic interface to be arranged as a coating at at least one of the two optical units or as a coating at both of the two optical units. A specific wavelength or a specific wavelength range of the light incident on the dichroic interface is transmitted through the dichroic interface. All further wavelengths or wavelength ranges which do not correspond to the specific wavelength or which do not belong to the specific wavelength range are reflected.

In the case of the exemplary embodiment of the second beam splitter unit including a first optical unit in the form of a polyhedron and a second optical unit in the form of a polyhedron, the first optical unit and the second optical unit are arranged relative to one another in such a way that the second beam splitter unit includes a single dichroic interface. The dichroic interface serves to split the light incident on the dichroic interface into (i) light at a first specific wavelength or from a first specific wavelength range and (ii) light at a second specific wavelength or from a second specific wavelength range.

In the case of the exemplary embodiment of the second beam splitter unit including a first optical unit in the form of a polyhedron, a second optical unit in the form of a polyhedron, a third optical unit in the form of a polyhedron, and a fourth optical unit in the form of a polyhedron, the first optical unit, the second optical unit, the third optical unit, and the fourth optical unit are arranged relative to one another in such a way that the second beam splitter unit includes two dichroic interfaces. The two dichroic interfaces serve to split the light incident on the two dichroic interfaces into (i) light at a first specific wavelength or from a first specific wavelength range, (ii) light at a second specific wavelength or from a second specific wavelength range, and (iii) light at a third specific wavelength or from a third specific wavelength range.

In the exemplary embodiment of the second beam splitter unit including a first optical unit in the form of a polyhedron, a second optical unit in the form of a polyhedron, a third optical unit in the form of a polyhedron, a fourth optical unit in the form of a polyhedron, a fifth optical unit in the form of a polyhedron, a sixth optical unit in the form of a polyhedron, a seventh optical unit in the form of a polyhedron, and an eighth optical unit in the form of a polyhedron, the first optical unit, the second optical unit, the third optical unit, the fourth optical unit, the fifth optical unit, the sixth optical unit, the seventh optical unit, and the eighth optical unit are arranged relative to one another in such a way that the first beam splitter unit includes three dichroic interfaces. The three dichroic interfaces serve to split the light incident on the three dichroic interfaces into (i) light at a first specific wavelength or from a first specific wavelength range, (ii) light at a second specific wavelength or from a second specific wavelength range, (iii) light at a third specific wavelength or from a third specific wavelength range, and (iv) light at a fourth specific wavelength or from a fourth specific wavelength range.

Explicit reference is made to the fact that the disclosure is not restricted to the splitting of light incident on the second beam splitter unit into four specific wavelengths or four specific wavelength ranges. Rather, the second beam splitter unit can be configured such that the splitting of the light incident on the second beam splitter unit into any desired number of wavelengths or wavelength ranges is achievable.

In a further exemplary embodiment of the camera system according to the disclosure, provision is additionally or alternatively made for the camera system according to the disclosure to include at least one transmitter unit for illuminating the object with light. By way of example, the transmitter unit is arranged at the first beam splitter unit and/or at the second beam splitter unit. In particular, provision is made for the transmitter unit to be in the form of a light source for illuminating the object, a laser beam of a rangefinder, and/or a laser beam of an illumination device. The light reflected by the object is detected and evaluated using at least one of the aforementioned detectors.

The disclosure also relates to a further camera system for imaging an object. For example, the further camera system is arranged in a binocular apparatus, in a pair of field glasses, in a refractor, in particular a telescopic sight, in a telescope, in a spotting scope, in a night vision apparatus, in a cellular telephone and/or in a tablet computer.

The further camera system according to the disclosure includes at least one optical axis and at least one lens for imaging the object, with the lens being arranged along the optical axis. For example, the lens includes at least one lens element. In particular, provision is made for the lens to include a plurality of lens elements and/or a plurality of optical units, for example lens element groups. In this case, a lens element group is understood to mean an optical unit including at least one lens element or a plurality of lens elements. Additionally, the further camera system according to the disclosure is provided with at least one processor unit and at least one display unit for displaying an image of the object, with the processor unit being line-connected to the display unit. Accordingly, signals are transmittable from the processor unit to the display unit and/or from the display unit to the processor unit. The display unit is in the form of a digital display unit. In particular, the display unit can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

Further, the further camera system according to an exemplary embodiment of the disclosure includes at least one beam splitter unit. The lens is arranged first along the optical axis in a direction of light incidence, followed by the beam splitter unit. The further camera system according to an exemplary embodiment of the disclosure moreover includes at least one first detector and at least one second detector. The first detector and the second detector are assigned to the beam splitter unit. The first detector and the second detector serve to detect light generated by the beam splitter unit. The processor unit is line-connected to both the first detector and the second detector. Accordingly, signals are transmittable from the processor unit to the first detector and/or from the first detector to the processor unit. Additionally, signals are transmittable from the processor unit to the second detector and/or from the second detector to the processor unit. The first detector is configured to detect first light generated by the beam splitter unit. Expressed in other words, the first detector detects first light which is generated by the beam splitter unit by the incidence of light incident on the beam splitter unit. The second detector is configured to detect second light generated by the beam splitter unit. Expressed in other words, the second detector detects second light which is generated by the beam splitter unit by the incidence of light incident on the beam splitter unit.

By way of example, the first detector and/or the second detector are/is in the form of a CCD detector or CMOS detector. However, the disclosure is not restricted to the aforementioned exemplary embodiments. Rather, the first detector and/or the second detector can be any detector suitable for the disclosure.

Further, provision is made in the further camera system according to an exemplary embodiment of the disclosure for the first light to have a specifiable first intensity and for the second light to have a specifiable second intensity. The light incident on the beam splitter unit is consequently split into the first light with the first intensity and into the second light with the second intensity. The first intensity and the second intensity can differ from one another. However, the first intensity and the second intensity are formed the same in an exemplary embodiment. The first intensity of the first light can be any selectable intensity, for example a percentage of the light incident in the beam splitter unit from the lens. For example, the first intensity of the first light, and hence the percentage, is 10%, 20%, 30%, 40%, 50%, 60%, 70%, 80%, or 90% of the light incident in the beam splitter unit from the lens. For example, the second intensity of the second light, and hence the percentage, is 10%, 20%, 30%, 40%, 50%, 60%, 70%, 80%, or 90% of the light incident in the beam splitter unit from the lens, depending on the percentage of the first intensity of the first light. For example, the percentage of the first intensity of the first light is 20% and the percentage of the second intensity of the second light is 80%.

The processor unit is additionally in the form of for example a control unit and/or supply unit, which controls the display unit, the first detector, and/or the second detector and/or which supplies these/this with voltage.

It was recognized that, on account of the split of the light incident in the beam splitter unit into the first light with a first intensity and into the second light with a second intensity, the further camera system according to an exemplary embodiment of the disclosure likewise has a good light efficiency and a good color resolution for the purpose of generating a good image of an object. The split components of the light are detected by different detectors. The different detection signals provided by the different detectors are used for generating a single image and/or a plurality of images of the object. The single generated image or the plurality of generated images have a good light efficiency and a good color resolution. In comparison with the prior art, in which a single detector provided with a Bayer filter and having a single detector area is used, the disclosure first of all provides a plurality of detectors with a plurality of detector areas, with the result that, in comparison with the prior art, more information can be used for the generation of the image of the object. Secondly, the plurality of detectors can be controlled on an individual basis. Both effects lead to images with a good light efficiency and a good color resolution.

In an exemplary embodiment of the further camera system according to the disclosure, provision is additionally or alternatively made for a first optical device to be arranged between the beam splitter unit and the first detector. The first optical device guides the first light from the beam splitter unit to the first detector. Additionally or as an alternative thereto, provision is made for a second optical device to be arranged between the beam splitter unit and the second detector. The second optical device guides the second light from the beam splitter unit to the second detector. In a further exemplary embodiment of the further camera system according to the disclosure, provision is additionally or alternatively made for the first detector and/or the second detector to be arranged at the beam splitter unit. By way of example, the beam splitter unit includes a first beam splitter face, at which the first detector is arranged. In particular, provision is made for the beam splitter unit to include a second beam splitter face, at which the second detector is arranged.

For example, the first beam splitter face and the second beam splitter face are arranged with respect to one another at an angle of between 0° and 180°, with the interval boundaries being included. Additionally or as an alternative thereto, the first beam splitter face and the second beam splitter face are arranged at a distance from one another. In particular, provision is made for the first beam splitter face and the second beam splitter face to be arranged parallel to one another. For example, provision is made for the aforementioned beam splitter faces to be arranged relative to one another in the style of a cube. Expressed in other words, the aforementioned faces are for example arranged with respect to one another at an angle of 90° or substantially 90°.

In a further exemplary embodiment of the further camera system according to the disclosure, provision is additionally or alternatively made for the first light to include one of the following features: (i) light at only a single first wavelength or (ii) light from a first wavelength range.

Reference is made to the explanations provided hereinbefore in respect of the definition of the terms of single wavelength and wavelength range. These also apply here.

The single first wavelength may for example be a wavelength from the visible or invisible wavelength range. In particular, provision is made for the light at the first wavelength to be a red light, a green light, or a blue light. For example, the first wavelength range can be the wavelength range of the visible light, of the infrared range, of the near-infrared range, or of the short-wavelength infrared light. The exemplary embodiment of the first wavelength range in the form of the near-infrared range or the short-wavelength infrared light is advantageous, especially when observing an object in twilight or low-light weather conditions.

In yet a further exemplary embodiment of the further camera system according to the disclosure, provision is additionally or alternatively made for the second light to include one of the following features: (i) light at only a single second wavelength or (ii) light from a second wavelength range.

Reference is made to the explanations provided hereinbefore in respect of the definition of the terms of single wavelength and wavelength range. These also apply here.

The single second wavelength may for example be a wavelength from the visible or invisible wavelength range. In particular, provision is made for the light at the second wavelength to be a red light, a green light, or a blue light. For example, the second wavelength range can be the wavelength range of the visible light, of the infrared range, of the near-infrared range, or of the short-wavelength infrared light. The exemplary embodiment of the second wavelength range in the form of the near-infrared range or the short-wavelength infrared light is advantageous, especially when observing an object in twilight or low-light weather conditions.

In a further exemplary embodiment of the further camera system according to the disclosure, provision is additionally or alternatively made for the first detector to include a sensitive first detector area. The pixels of the first detector which detect the first light are arranged at the first detector area. The first detector area is not necessarily the entire detector area where pixels of the first detector which detect the first light are arranged. Rather, an exemplary embodiment of the further camera system according to the disclosure provides for the first detector area to be a partial area of the entire detector area of the first detector. By way of example, provision is made for the processor unit to be used to control the first detector in such a way that a selectable first detector area is switched to be sensitive for the detection of first light. Further, additional provision is made for the second detector to include a sensitive second detector area. The pixels of the second detector which detect the second light are arranged at the second detector area. The second detector area is not necessarily the entire detector area where pixels of the second detector which detect the second light are arranged. Rather, an exemplary embodiment of the further camera system according to the disclosure provides for the second detector area to be a partial area of the entire detector area of the second detector. By way of example, provision is made for the processor unit to be used to control the second detector in such a way that a selectable second detector area is switched to be sensitive for the detection of second light. The first detector area differs in size from the second detector area. This exemplary embodiment of the further camera system according to the disclosure is advantageous in that a first image generated by the first detector and a second image generated by the second detector are based on differently sized fields of view. As a result, it is possible to provide digital zooming within the scope of the further camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. It is advantageous that the resolution of the images remains the same for all zoom levels if the resolution of the detectors is the same. By contrast, in the case of a digital zoom known from the prior art, the resolution reduces as the zooming increases.

In an exemplary embodiment of the further camera system according to the disclosure, provision is additionally or alternatively made for the beam splitter unit to include a first beam splitter face, at which the first detector is arranged. The first beam splitter face includes a first face center. Moreover, the beam splitter unit includes a second beam splitter face, at which the second detector is arranged. The second beam splitter face includes a second face center. The first detector includes a first detector area center. By contrast, the second detector includes a second detector area center. In this exemplary embodiment of the further camera system according to the disclosure, provision is made for the first detector area center of the first detector to be at a first distance from the first face center of the first beam splitter face and for the second detector area center of the second detector to be at a second distance from the second face center of the second beam splitter face. The first distance differs from the second distance. In principle, the two detector areas are arranged offset to each other with regard to the beam splitter face assigned to them. This exemplary embodiment ensures that the first detector area and the second detector area do not record exactly the same image of the object but instead record different image portions of the object. As a result, it is possible to calculate and present a super-resolution image of the object using known super-resolution algorithms (which are used for super-resolution imaging).

In a further exemplary embodiment of the further camera system according to the disclosure, provision is additionally or alternatively made for the camera system according to the disclosure to include at least one third detector. The further camera system according to the disclosure consequently includes not only two detectors in the form of the first detector and the second detector, but more than two detectors. The processor unit is line-connected to the third detector. Accordingly, signals are transmittable from the processor unit to the third detector and/or signals are transmittable from the third detector to the processor unit. The third detector is configured to detect third light generated by the beam splitter unit. The third light includes one of the following features: (i) light at only a single third wavelength, (ii) light from a third wavelength range, or (iii) a specifiable third intensity.

Reference is made to the explanations provided hereinbefore in respect of the definition of the terms of single wavelength and wavelength range. These also apply here.

The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing an object in twilight or low-light weather conditions. The third intensity of the third light can be any selectable intensity, for example, depending on the percentage of the first intensity of the first light and/or the second intensity of the second light, a percentage of the light incident in the beam splitter unit from the lens. For example, the third intensity of the third light, and hence the percentage, is 10%, 20%, 30%, 40%, 50%, 60%, 70%, 80%, or 90% of the light incident in the beam splitter unit from the lens, depending on the percentage of the first intensity of the first light and/or the second intensity of the second light. For example, the percentage of the first intensity of the first light is 20%, the percentage of the second intensity of the second light is 50%, and the percentage of the third intensity of the third light is 30%.

In yet a further exemplary embodiment of the further camera system according to the disclosure, provision is additionally or alternatively made for the third detector to include a sensitive third detector area. The pixels of the third detector which detect the third light are arranged at the third detector area. The third detector area is not necessarily the entire detector area where pixels of the third detector which detect the third light are arranged. Rather, an exemplary embodiment of the further camera system according to the disclosure provides for the third detector area to be a partial area of the entire detector area of the third detector. By way of example, provision is made for the processor unit to be used to control the third detector in such a way that a selectable third detector area is switched to be sensitive for the detection of third light. The third detector area differs in size from the first detector area and/or the second detector area. This exemplary embodiment of the further camera system according to the disclosure is advantageous in that a first image generated by the first detector, a second image generated by the second detector, and a third image generated by the third detector are based on differently sized fields of view. As a result, it is possible to provide digital zooming within the scope of the further camera system according to an aspect of the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based on a third field of view and shows a third image portion of the object, which corresponds to an image at a third zoom level. It is advantageous that the resolution of the images remains the same for all zoom levels if the resolution of the detectors is the same. By contrast, in the case of a digital zoom known from the prior art, the resolution reduces as the zooming increases.

In a further exemplary embodiment of the further camera system according to the disclosure, provision is additionally or alternatively made for the beam splitter unit to include a third beam splitter face, at which the third detector is arranged. The third beam splitter face includes a third face center. As already explained hereinbefore, the first detector area center of the first detector is at a first distance from the first face center of the first beam splitter face. The second detector area center of the second detector is at a second distance from the second face center of the second beam splitter face. Further, the third detector area center of the third detector is at a third distance from the third face center of the third beam splitter face. The first distance differs from the second distance and/or from the third distance. In principle, the three detector areas are arranged offset to each other with regard to the beam splitter face assigned to them. This exemplary embodiment ensures that the first detector area, the second detector area, and the third detector area do not record exactly the same image of the object but instead record different image portions of the object. As a result, it is possible to calculate and present a super-resolution image of the object with known super-resolution algorithms (which are used for super-resolution imaging).

For example, at least two of the faces or each of the faces of the first beam splitter face, the second beam splitter face, and the third beam splitter face are arranged with respect to one another at an angle of between 0° and 180°, with the interval boundaries being included. Additionally or as an alternative thereto, at least two faces of the first beam splitter face, the second beam splitter face, and the third beam splitter face are arranged at a distance from one another. In particular, provision is made for at least two of the aforementioned faces to be arranged parallel to one another. For example, provision is made for the aforementioned beam splitter faces to be arranged relative to one another in the style of a cube. Expressed in other words, respectively two of the aforementioned faces are for example arranged with respect to one another at an angle of 90° or substantially 90°.

In an exemplary embodiment of the further camera system according to the disclosure, provision is additionally or alternatively made for the further camera system according to the disclosure to include at least one fourth detector. The further camera system according to the disclosure consequently includes not only three detectors in the form of the first detector, the second detector, and the third detector, but more than three detectors. The processor unit is line-connected to the fourth detector. Accordingly, signals are transmittable from the processor unit to the fourth detector and/or signals are transmittable from the fourth detector to the processor unit. The fourth detector is configured to detect fourth light generated by the beam splitter unit. The fourth light includes one of the following features: (i) light at only a single fourth wavelength, (ii) light from a fourth wavelength range, or (iii) a specifiable fourth intensity.

Reference is made to the explanations provided hereinbefore in respect of the definition of the terms of single wavelength and wavelength range. These also apply here.

The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing an object in twilight or low-light weather conditions. The fourth intensity of the fourth light can be any selectable intensity, for example, depending on the percentage of the first intensity of the first light and/or the second intensity of the second light and/or the third intensity of the third light, a percentage of the light incident in the beam splitter unit from the lens. For example, the fourth intensity of the fourth light, and hence the percentage, is 10%, 20%, 30%, 40%, 50%, 60%, 70%, 80%, or 90% of the light incident in the beam splitter unit from the lens, depending on the percentage of the first intensity of the first light and/or the second intensity of the second light and/or the third intensity of the third light. For example, the percentage of the first intensity of the first light is 20%, the percentage of the second intensity of the second light is 50%, the percentage of the third intensity of the third light is 10%, and the percentage of the fourth intensity of the fourth light is 20%.

In a further exemplary embodiment of the further camera system according to the disclosure, provision is additionally or alternatively made for the fourth detector to include a sensitive fourth detector area. The pixels of the fourth detector which detect the fourth light are arranged at the fourth detector area. The fourth detector area is not necessarily the entire detector area where pixels of the fourth detector which detect the fourth light are arranged. Rather, an exemplary embodiment of the further camera system according to the disclosure provides for the fourth detector area to be a partial area of the entire detector area of the fourth detector. By way of example, provision is made for the processor unit to be used to control the fourth detector in such a way that a selectable fourth detector area is switched to be sensitive for the detection of fourth light. The fourth detector area differs in size from the first detector area and/or the second detector area and/or the third detector area. This embodiment of the further camera system according to the disclosure is advantageous in that a first image generated by the first detector, a second image generated by the second detector, a third image generated by the third detector, and a fourth image generated by the fourth detector are based on differently sized fields of view. As a result of this, it is possible to provide digital zooming within the scope of the further camera system according to an aspect of the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based for example on a third field of view and shows a third image portion of the object, which corresponds to an image at a third zoom level. The fourth image is based for example on a fourth field of view and shows a fourth image portion of the object, which corresponds to an image at a fourth zoom level. It is advantageous that the resolution of the images remains the same for all zoom levels if the resolution of the detectors is the same. By contrast, in the case of a digital zoom known from the prior art, the resolution reduces as the zooming increases.

In yet a further exemplary embodiment of the further camera system according to the disclosure, provision is additionally or alternatively made for the beam splitter unit to include a fourth beam splitter face, at which the fourth detector is arranged. The fourth beam splitter face includes a fourth face center. As already explained hereinbefore, the first detector area center of the first detector is at a first distance from the first face center of the first beam splitter face. The second detector area center of the second detector is at a second distance from the second face center of the second beam splitter face. Further, the third detector area center of the third detector is at a third distance from the third face center of the third beam splitter face. The fourth detector area center of the fourth detector is at a fourth distance from the fourth face center of the fourth beam splitter face. The first distance differs from the second distance and/or from the third distance and/or from the fourth distance. In principle, the four detector areas are arranged offset to each other with regard to the beam splitter face assigned to them. This exemplary embodiment ensures that the first detector area, the second detector area, the third detector area, and the fourth detector area do not record exactly the same image of the object but instead record different image portions of the object. As a result, it is possible to calculate and present a super-resolution image of the object with known super-resolution algorithms (which are used for super-resolution imaging).

For example, at least two of the faces or each of the faces of the first beam splitter face, the second beam splitter face, the third beam splitter face, and the fourth beam splitter face are arranged with respect to one another at an angle of between 0° and 180°, with the interval boundaries being included. Additionally or as an alternative thereto, at least two faces of the first beam splitter face, the second beam splitter face, the third beam splitter face, and the fourth beam splitter face are arranged at a distance from one another. In particular, provision is made for at least two of the aforementioned faces to be arranged parallel to one another. For example, provision is made for the aforementioned beam splitter faces to be arranged relative to one another in the style of a cube. Expressed in other words, respectively two of the aforementioned faces are for example arranged with respect to one another at an angle of 90° or substantially 90°.

In a further exemplary embodiment of the further camera system according to the disclosure, provision is additionally or alternatively made for the beam splitter unit to include one of the following features:

- at least one first optical unit in the form of a polyhedron and at least one second optical unit in the form of a polyhedron;
- at least one first optical unit in the form of a polyhedron, at least one second optical unit in the form of a polyhedron, at least one third optical unit in the form of a polyhedron, and at least one fourth optical unit in the form of a polyhedron; and
- at least one first optical unit in the form of a polyhedron, at least one second optical unit in the form of a polyhedron, at least one third optical unit in the form of a polyhedron, at least one fourth optical unit in the form of a polyhedron, at least one fifth optical unit in the form of a polyhedron, at least one sixth optical unit in the form of a polyhedron, at least one seventh optical unit in the form of a polyhedron, and at least one eighth optical unit in the form of a polyhedron.

By way of example, provision is made for a dichroic interface to be arranged between at least two of the aforementioned optical units. In particular, provision is made for the dichroic interface to be arranged as a coating at at least one of the two optical units or as a coating at both of the two optical units. A specific wavelength or a specific wavelength range of the light incident on the dichroic interface is transmitted through the dichroic interface. All further wavelengths or wavelength ranges which do not correspond to the specific wavelength or which do not belong to the specific wavelength range are reflected.

In the case of the exemplary embodiment of the beam splitter unit including a first optical unit in the form of a polyhedron and a second optical unit in the form of a polyhedron, the first optical unit and the second optical unit are arranged relative to one another in such a way that the beam splitter unit includes a single dichroic interface. The dichroic interface serves to split the light incident on the dichroic interface into (i) light at a first specific wavelength or from a first specific wavelength range and (ii) light at a second specific wavelength or from a second specific wavelength range.

In the case of the exemplary embodiment of the beam splitter unit including a first optical unit in the form of a polyhedron, a second optical unit in the form of a polyhedron, a third optical unit in the form of a polyhedron, and a fourth optical unit in the form of a polyhedron, the first optical unit, the second optical unit, the third optical unit, and the fourth optical unit are arranged relative to one another in such a way that the beam splitter unit includes two dichroic interfaces. The two dichroic interfaces serve to split the light incident on the two dichroic interfaces into (i) light at a first specific wavelength or from a first specific wavelength range, (ii) light at a second specific wavelength or from a second specific wavelength range, and (iii) light at a third specific wavelength or from a third specific wavelength range.

In the exemplary embodiment of the beam splitter unit including a first optical unit in the form of a polyhedron, a second optical unit in the form of a polyhedron, a third optical unit in the form of a polyhedron, a fourth optical unit in the form of a polyhedron, a fifth optical unit in the form of a polyhedron, a sixth optical unit in the form of a polyhedron, a seventh optical unit in the form of a polyhedron, and an eighth optical unit in the form of a polyhedron, the first optical unit, the second optical unit, the third optical unit, the fourth optical unit, the fifth optical unit, the sixth optical unit, the seventh optical unit, and the eighth optical unit are arranged relative to one another in such a way that the beam splitter unit includes three dichroic interfaces. The three dichroic interfaces serve to split the light incident on the three dichroic interfaces into (i) light at a first specific wavelength or from a first specific wavelength range, (ii) light at a second specific wavelength or from a second specific wavelength range, (iii) light at a third specific wavelength or from a third specific wavelength range, and (iv) light at a fourth specific wavelength or from a fourth specific wavelength range.

Explicit reference is made to the fact that the disclosure is not restricted to the splitting of light incident on the beam splitter unit into four specific wavelengths or four specific wavelength ranges. Rather, the beam splitter unit can be configured such that the splitting of the light incident on the beam splitter unit into any desired number of wavelengths or wavelength ranges is achievable.

In a further exemplary embodiment of the further camera system according to the disclosure, provision is additionally or alternatively made for the further camera system according to the disclosure to include at least one transmitter unit for illuminating the object with light. By way of example, the transmitter unit is arranged at the beam splitter unit. In particular, provision is made for the transmitter unit to be in the form of a light source for illuminating the object, a laser beam of a rangefinder, and/or a laser beam of an illumination device. The light reflected by the object is detected and evaluated using at least one of the aforementioned detectors.

The disclosure relates to an even further camera system for imaging an object. For example, the even further camera system according to the disclosure is arranged in a binocular system, in a pair of field glasses, in a refractor, in particular a telescopic sight, in a telescope, in a spotting scope, in a night vision apparatus, in a cellular telephone and/or in a tablet computer.

The even further camera system according to an aspect of the disclosure includes at least one optical axis and at least one lens for imaging the object, with the lens being arranged along the optical axis. For example, the lens includes at least one lens element. In particular, provision is made for the lens to include a plurality of lens elements and/or a plurality of optical units, for example lens element groups. In this case, a lens element group is understood to mean an optical unit including at least one lens element or a plurality of lens elements. Additionally, the even further camera system according to the disclosure is provided with at least one processor unit and at least one display unit for displaying an image of the object, with the processor unit being line-connected to the display unit. Accordingly, signals are transmittable from the processor unit to the display unit and/or from the display unit to the processor unit. The display unit is in the form of a digital display unit. In particular, the display unit can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

Further, the even further camera system according to an aspect of the disclosure includes at least one beam splitter unit. The lens is arranged first along the optical axis in a direction of light incidence, followed by the beam splitter unit. The even further camera system according to the disclosure moreover includes at least one first detector and at least one second detector. The first detector and the second detector are assigned to the beam splitter unit. The first detector and the second detector serve to detect light generated by the beam splitter unit. The processor unit is line-connected to both the first detector and the second detector. Accordingly, signals are transmittable from the processor unit to the first detector and/or from the first detector to the processor unit. Additionally, signals are transmittable from the processor unit to the second detector and/or from the second detector to the processor unit. The first detector is configured to detect first light generated by the beam splitter unit. Expressed in other words, the first detector detects first light which is generated by the beam splitter unit by the incidence of light incident on the beam splitter unit. The second detector is configured to detect second light generated by the beam splitter unit. Expressed in other words, the second detector detects second light which is generated by the beam splitter unit by the incidence of light incident on the beam splitter unit.

By way of example, the first detector and/or the second detector are/is in the form of a CCD detector or CMOS detector. However, the disclosure is not restricted to the aforementioned embodiments. Rather, the first detector and/or the second detector can be any detector suitable for the disclosure.

Further, provision is made in the even further camera system according to an aspect of the disclosure for the first detector to include a sensitive first detector area, for the second detector to include a sensitive second detector area, and for the first detector area to differ in size from the second detector area.

For example, the pixels of the first detector which detect the first light are arranged at the first detector area. The first detector area is not necessarily the entire detector area where pixels of the first detector which detect the first light are arranged. Rather, an exemplary embodiment of the even further camera system according to the disclosure provides for the first detector area to be a partial area of the entire detector area of the first detector. By way of example, provision is made for the processor unit to be used to control the first detector in such a way that a selectable first detector area is switched to be sensitive for the detection of first light.

By way of example, the pixels of the second detector which detect the second light are arranged at the second detector area. The second detector area is not necessarily the entire detector area where pixels of the second detector which detect the second light are arranged. Rather, an exemplary embodiment of the even further camera system according to the disclosure provides for the second detector area to be a partial area of the entire detector area of the second detector. By way of example, provision is made for the processor unit to be used to control the second detector in such a way that a selectable second detector area is switched to be sensitive for the detection of second light.

The first detector area differs in size from the second detector area. The even further camera system according to an aspect of the disclosure is advantageous in that a first image generated by the first detector and a second image generated by the second detector are based on differently sized fields of view. As a result of this, it is possible to provide digital zooming within the scope of the even further camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. It is advantageous that the resolution of the images remains the same for all zoom levels if the resolution of the detectors is the same. By contrast, in the case of a digital zoom known from the prior art, the resolution reduces as the zooming increases.

The processor unit is additionally in the form of for example a control unit and/or supply unit, which controls the display unit, the first detector, and/or the second detector and/or which supplies these/this with voltage.

In an exemplary embodiment of the even further camera system according to the disclosure, provision is additionally or alternatively made for a first optical device to be arranged between the beam splitter unit and the first detector. The first optical device guides the first light from the beam splitter unit to the first detector. Additionally or as an alternative thereto, provision is made for a second optical device to be arranged between the beam splitter unit and the second detector. The second optical device guides the second light from the beam splitter unit to the second detector. In a further exemplary embodiment of the even further camera system according to the disclosure, provision is additionally or alternatively made for the first detector and/or the second detector to be arranged at the beam splitter unit. By way of example, the beam splitter unit includes a first beam splitter face, at which the first detector is arranged. In particular, provision is made for the beam splitter unit to include a second beam splitter face, at which the second detector is arranged.

For example, the first beam splitter face and the second beam splitter face are arranged with respect to one another at an angle of between 0° and 180°, with the interval boundaries being included. Additionally or as an alternative thereto, the first beam splitter face and the second beam splitter face are arranged at a distance from one another. In particular, provision is made for the first beam splitter face and the second beam splitter face to be arranged parallel to one another. For example, provision is made for the aforementioned beam splitter faces to be arranged relative to one another in the style of a cube. Expressed in other words, the aforementioned faces are for example arranged with respect to one another at an angle of 90° or substantially 90°.

In a further exemplary embodiment of the even further camera system according to the disclosure, provision is additionally or alternatively made for the first light to include one of the following features: (i) light at only a single first wavelength, (ii) light from a first wavelength range, or (iii) a specifiable first intensity.

Reference is made to the explanations provided hereinbefore in respect of the definition of the terms of single wavelength and wavelength range. These also apply here.

The single first wavelength may for example be a wavelength from the visible or invisible wavelength range. In particular, provision is made for the light at the first wavelength to be a red light, a green light, or a blue light. For example, the first wavelength range can be the wavelength range of the visible light, of the infrared range, of the near-infrared range, or of the short-wavelength infrared light. The exemplary embodiment of the first wavelength range in the form of the near-infrared range or the short-wavelength infrared light is advantageous, especially when observing an object in twilight or low-light weather conditions. The first intensity of the first light can be any selectable intensity, for example a percentage of the light incident in the beam splitter unit from the lens. For example, the first intensity of the first light, and hence the percentage, is 10%, 20%, 30%, 40%, 50%, 60%, 70%, 80%, or 90% of the light incident in the beam splitter unit from the lens.

In yet a further exemplary embodiment of the even further camera system according to the disclosure, provision is additionally or alternatively made for the second light to include one of the following features: (i) light at only a single second wavelength, (ii) light from a second wavelength range, or (iii) a specifiable second intensity.

Reference is made to the explanations provided hereinbefore in respect of the definition of the terms of single wavelength and wavelength range. These also apply here.

The single second wavelength may for example be a wavelength from the visible or invisible wavelength range. In particular, provision is made for the light at the second wavelength to be a red light, a green light, or a blue light. For example, the second wavelength range can be the wavelength range of the visible light, of the infrared range, of the near-infrared range, or of the short-wavelength infrared light. The exemplary embodiment of the second wavelength range in the form of the near-infrared range or the short-wavelength infrared light is advantageous, especially when observing an object in twilight or low-light weather conditions. The second intensity of the second light can be any selectable intensity, for example, depending on the percentage of the first intensity of the first light, a percentage of the light incident in the beam splitter unit from the lens. For example, the second intensity of the second light, and hence the percentage, is 10%, 20%, 30%, 40%, 50%, 60%, 70%, 80%, or 90% of the light incident in the beam splitter unit from the lens, depending on the percentage of the first intensity of the first light. For example, the percentage of the first intensity of the first light is 20% and the percentage of the second intensity of the second light is 80%.

In a further exemplary embodiment of the even further camera system according to the disclosure, provision is additionally or alternatively made for the beam splitter unit to include a first beam splitter face, at which the first detector is arranged. The first beam splitter face includes a first face center. Moreover, the beam splitter unit includes a second beam splitter face, at which the second detector is arranged. The second beam splitter face includes a second face center. The first detector includes a first detector area center. By contrast, the second detector includes a second detector area center. In this exemplary embodiment of the even further camera system according to the disclosure, provision is made for the first detector area center of the first detector to be at a first distance from the first face center of the first beam splitter face and for the second detector area center of the second detector to be at a second distance from the second face center of the second beam splitter face. The first distance differs from the second distance. In principle, the two detector areas are arranged offset to each other with regard to the beam splitter face assigned to them. This exemplary embodiment ensures that the first detector area and the second detector area do not record exactly the same image of the object but instead record different image portions of the object. As a result, it is possible to calculate and present a super-resolution image of the object using known super-resolution algorithms (which are used for super-resolution imaging).

In an exemplary embodiment of the even further camera system according to the disclosure, provision is additionally or alternatively made for the camera system according to the disclosure to include at least one third detector. The even further camera system according to the disclosure consequently includes not only two detectors in the form of the first detector and the second detector, but more than two detectors. The processor unit is line-connected to the third detector. Accordingly, signals are transmittable from the processor unit to the third detector and/or signals are transmittable from the third detector to the processor unit. The third detector is configured to detect third light generated by the beam splitter unit. The third light includes one of the following features: (i) light at only a single third wavelength, (ii) light from a third wavelength range, or (iii) a specifiable third intensity.

Reference is made to the explanations provided hereinbefore in respect of the definition of the terms of single wavelength and wavelength range. These also apply here.

The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The third intensity of the third light can be any selectable intensity, for example, depending on the percentage of the first intensity of the first light and/or the second intensity of the second light, a percentage of the light incident in the beam splitter unit from the lens. For example, the third intensity of the third light, and hence the percentage, is 10%, 20%, 30%, 40%, 50%, 60%, 70%, 80%, or 90% of the light incident in the beam splitter unit from the lens, depending on the percentage of the first intensity of the first light and/or the second intensity of the second light. For example, the percentage of the intensity of the first light is 20%, the percentage of the second intensity of the second light is 50%, and the percentage of the third intensity of the third light is 30%.

In a further exemplary embodiment of the even further camera system according to the disclosure, provision is additionally or alternatively made for the third detector to include a sensitive third detector area. The pixels of the third detector which detect the third light are arranged at the third detector area. The third detector area is not necessarily the entire detector area where pixels of the third detector which detect the third light are arranged. Rather, an exemplary embodiment of the even further camera system according to the disclosure provides for the third detector area to be a partial area of the entire detector area of the third detector. By way of example, provision is made for the processor unit to be used to control the third detector in such a way that a selectable third detector area is switched to be sensitive for the detection of third light. The third detector area differs in size from the first detector area and/or the second detector area. This exemplary embodiment of the even further camera system according to the disclosure is advantageous in that a first image generated by the first detector, a second image generated by the second detector, and a third image generated by the third detector are based on differently sized fields of view. As a result of this, it is possible to provide digital zooming within the scope of the even further camera system according to the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based for example on a third field of view and shows a third image portion of the object, which corresponds to an image at a third zoom level. It is advantageous that the resolution of the images remains the same for all zoom levels if the resolution of the detectors is the same. By contrast, in the case of a digital zoom known from the prior art, the resolution reduces as the zooming increases.

In yet a further exemplary embodiment of the even further camera system according to the disclosure, provision is additionally or alternatively made for the beam splitter unit to include a third beam splitter face, at which the third detector is arranged. The third beam splitter face includes a third face center. As already explained hereinbefore, the first detector area center of the first detector is at a first distance from the first face center of the first beam splitter face. The second detector area center of the second detector is at a second distance from the second face center of the second beam splitter face. Further, the third detector area center of the third detector is at a third distance from the third face center of the third beam splitter face. The first distance differs from the second distance and/or from the third distance. In principle, the three detector areas are arranged offset to each other with regard to the beam splitter face assigned to them. This exemplary embodiment ensures that the first detector area, the second detector area, and the third detector area do not record exactly the same image of the object but instead record different image portions of the object. As a result, it is possible to calculate and present a super-resolution image of the object using known super-resolution algorithms (which are used for super-resolution imaging).

For example, at least two of the faces or each of the faces of the first beam splitter face, the second beam splitter face, and the third beam splitter face are arranged with respect to one another at an angle of between 0° and 180°, with the interval boundaries being included. Additionally or as an alternative thereto, at least two faces of the first beam splitter face, the second beam splitter face, and the third beam splitter face are arranged at a distance from one another. In particular, provision is made for at least two of the aforementioned faces to be arranged parallel to one another. For example, provision is made for the aforementioned beam splitter faces to be arranged relative to one another in the style of a cube. Expressed in other words, respectively two of the aforementioned faces are for example arranged with respect to one another at an angle of 90° or substantially 90°.

In a further exemplary embodiment of the further camera system according to the disclosure, provision is additionally or alternatively made for the even further camera system according to the disclosure to include at least one fourth detector. The even further camera system according to an aspect of the disclosure consequently includes not only three detectors in the form of the first detector, the second detector, and the third detector, but more than three detectors. The processor unit is line-connected to the fourth detector. Accordingly, signals are transmittable from the processor unit to the fourth detector and/or signals are transmittable from the fourth detector to the processor unit. The fourth detector is configured to detect fourth light generated by the beam splitter unit. The fourth light includes one of the following features: (i) light at only a single fourth wavelength, (ii) light from a fourth wavelength range, or (iii) a specifiable fourth intensity.

Reference is made to the explanations provided hereinbefore in respect of the definition of the terms of single wavelength and wavelength range. These also apply here.

The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing an object in twilight or low-light weather conditions. The fourth intensity of the fourth light can be any selectable intensity, for example, depending on the percentage of the first intensity of the first light and/or the second intensity of the second light and/or the third intensity of the third light, a percentage of the light incident in the beam splitter unit from the lens. For example, the fourth intensity of the fourth light, and hence the percentage, is 10%, 20%, 30%, 40%, 50%, 60%, 70%, 80%, or 90% of the light incident in the beam splitter unit from the lens, depending on the percentage of the first intensity of the first light and/or the second intensity of the second light and/or the third intensity of the third light. For example, the percentage of the first intensity of the first light is 20%, the percentage of the second intensity of the second light is 50%, the percentage of the third intensity of the third light is 10%, and the percentage of the fourth intensity of the fourth light is 20%.

In an exemplary embodiment of the even further camera system according to the disclosure, provision is additionally or alternatively made for the fourth detector to include a sensitive fourth detector area. The pixels of the fourth detector which detect the fourth light are arranged at the fourth detector area. The fourth detector area is not necessarily the entire detector area where pixels of the fourth detector which detect the fourth light are arranged. Rather, an exemplary embodiment of the even further camera system according to the disclosure provides for the fourth detector area to be a partial area of the entire detector area of the fourth detector. By way of example, provision is made for the processor unit to be used to control the fourth detector in such a way that a selectable fourth detector area is switched to be sensitive for the detection of fourth light. The fourth detector area differs in size from the first detector area and/or the second detector area and/or the third detector area. This exemplary embodiment of the even further camera system according to the disclosure is advantageous in that a first image generated by the first detector, a second image generated by the second detector, a third image generated by the third detector, and a fourth image generated by the fourth detector are based on differently sized fields of view. As a result, it is possible to provide digital zooming within the scope of the even further camera system according to an aspect of the disclosure, and generate different zoom images with different zoom levels. For example, the first image is based on a first field of view and shows a first image portion of the object, which corresponds to an image at a first zoom level. Further, for example, the second image is based on a second field of view and shows a second image portion of the object, which corresponds to an image at a second zoom level. Moreover, the third image is based for example on a third field of view and shows a third image portion of the object, which corresponds to an image at a third zoom level. The fourth image is based for example on a fourth field of view and shows a fourth image portion of the object, which corresponds to an image at a fourth zoom level. It is advantageous that the resolution of the images remains the same for all zoom levels if the resolution of the detectors is the same. By contrast, in the case of a digital zoom known from the prior art, the resolution reduces as the zooming increases.

In a further exemplary embodiment of the even further camera system according to the disclosure, provision is additionally or alternatively made for the beam splitter unit to include a fourth beam splitter face, at which the fourth detector is arranged. The fourth beam splitter face includes a fourth face center. As already explained hereinbefore, the first detector area center of the first detector is at a first distance from the first face center of the first beam splitter face. The second detector area center of the second detector is at a second distance from the second face center of the second beam splitter face. Further, the third detector area center of the third detector is at a third distance from the third face center of the third beam splitter face. The fourth detector area center of the fourth detector is at a fourth distance from the fourth face center of the fourth beam splitter face. The first distance differs from the second distance and/or from the third distance and/or from the fourth distance. In principle, the four detector areas are arranged offset to each other with regard to the beam splitter face assigned to them. This exemplary embodiment ensures that the first detector area, the second detector area, the third detector area, and the fourth detector area do not record exactly the same image of the object but instead record different image portions of the object. As a result, it is possible to calculate and present a super-resolution image of the object using known super-resolution algorithms (which are used for super-resolution imaging).

For example, at least two of the faces or each of the faces of the first beam splitter face, the second beam splitter face, the third beam splitter face, and the fourth beam splitter face are arranged with respect to one another at an angle of between 0° and 180°, with the interval boundaries being included. Additionally or as an alternative thereto, at least two faces of the first beam splitter face, the second beam splitter face, the third beam splitter face, and the fourth beam splitter face are arranged at a distance from one another. In particular, provision is made for at least two of the aforementioned faces to be arranged parallel to one another. For example, provision is made for the aforementioned beam splitter faces to be arranged relative to one another in the style of a cube. Expressed in other words, respectively two of the aforementioned faces are for example arranged with respect to one another at an angle of 90° or substantially 90°.

In a further exemplary embodiment of the even further camera system according to the disclosure, provision is additionally or alternatively made for the beam splitter unit to include one of the following features:

- at least one first optical unit in the form of a polyhedron and at least one second optical unit in the form of a polyhedron;
- at least one first optical unit in the form of a polyhedron, at least one second optical unit in the form of a polyhedron, at least one third optical unit in the form of a polyhedron, and at least one fourth optical unit in the form of a polyhedron; and
- at least one first optical unit in the form of a polyhedron, at least one second optical unit in the form of a polyhedron, at least one third optical unit in the form of a polyhedron, at least one fourth optical unit in the form of a polyhedron, at least one fifth optical unit in the form of a polyhedron, at least one sixth optical unit in the form of a polyhedron, at least one seventh optical unit in the form of a polyhedron, and at least one eighth optical unit in the form of a polyhedron.

By way of example, provision is made for a dichroic interface to be arranged between at least two of the aforementioned optical units. In particular, provision is made for the dichroic interface to be arranged as a coating at at least one of the two optical units or as a coating at both of the two optical units. A specific wavelength or a specific wavelength range of the light incident on the dichroic interface is transmitted through the dichroic interface. All further wavelengths or wavelength ranges which do not correspond to the specific wavelength or which do not belong to the specific wavelength range are reflected.

In the case of the exemplary embodiment of the beam splitter unit including a first optical unit in the form of a polyhedron and a second optical unit in the form of a polyhedron, the first optical unit and the second optical unit are arranged relative to one another in such a way that the beam splitter unit includes a single dichroic interface. The dichroic interface serves to split the light incident on the dichroic interface into (i) light at a first specific wavelength or from a first specific wavelength range and (ii) light at a second specific wavelength or from a second specific wavelength range.

In the case of the exemplary embodiment of the beam splitter unit including a first optical unit in the form of a polyhedron, a second optical unit in the form of a polyhedron, a third optical unit in the form of a polyhedron, and a fourth optical unit in the form of a polyhedron, the first optical unit, the second optical unit, the third optical unit, and the fourth optical unit are arranged relative to one another in such a way that the beam splitter unit includes two dichroic interfaces. The two dichroic interfaces serve to split the light incident on the two dichroic interfaces into (i) light at a first specific wavelength or from a first specific wavelength range, (ii) light at a second specific wavelength or from a second specific wavelength range, and (iii) light at a third specific wavelength or from a third specific wavelength range.

In the exemplary embodiment of the beam splitter unit including a first optical unit in the form of a polyhedron, a second optical unit in the form of a polyhedron, a third optical unit in the form of a polyhedron, a fourth optical unit in the form of a polyhedron, a fifth optical unit in the form of a polyhedron, a sixth optical unit in the form of a polyhedron, a seventh optical unit in the form of a polyhedron, and an eighth optical unit in the form of a polyhedron, the first optical unit, the second optical unit, the third optical unit, the fourth optical unit, the fifth optical unit, the sixth optical unit, the seventh optical unit, and the eighth optical unit are arranged relative to one another in such a way that the beam splitter unit includes three dichroic interfaces. The three dichroic interfaces serve to split the light incident on the three dichroic interfaces into (i) light at a first specific wavelength or from a first specific wavelength range, (ii) light at a second specific wavelength or from a second specific wavelength range, (iii) light at a third specific wavelength or from a third specific wavelength range, and (iv) light at a fourth specific wavelength or from a fourth specific wavelength range.

Explicit reference is made to the fact that the disclosure is not restricted to the splitting of light incident on the beam splitter unit into four specific wavelengths or four specific wavelength ranges. Rather, the beam splitter unit can be configured such that the splitting of the light incident on the beam splitter unit into any desired number of wavelengths or wavelength ranges is achievable.

In a further exemplary embodiment of the even further camera system according to the disclosure, provision is additionally or alternatively made for the even further camera system according to the disclosure to include at least one transmitter unit for illuminating the object with light. By way of example, the transmitter unit is arranged at the beam splitter unit. In particular, provision is made for the transmitter unit to be in the form of a light source for illuminating the object, a laser beam of a rangefinder, and/or a laser beam of an illumination device. The light reflected by the object is detected and evaluated using at least one of the aforementioned detectors.

The exemplary embodiments of the methods according to the disclosure described hereinbefore or hereinafter can also be used to operate at least one of the described camera systems. Reference is made here to the explanations given hereinbefore. These also apply accordingly here.

When a camera system as described hereinbefore or hereinafter is integrated into a mobile apparatus, for example a telephone or a tablet computer, the light yield obtained on account of the large accumulated detector areas, in particular, is advantageous. Further, a restricted installation space in a mobile apparatus means that it is not readily possible to install a detector with a large detector area for the purpose of obtaining a high light yield, since further optical components should also be adapted in that case. By contrast, the disclosure requires no adaptation of the optical components even though the detector area is multiplied as a result of using a plurality of detectors. In principle, all that is required is installation space for at least one beam splitter.

When a camera system as described hereinbefore or hereinafter is integrated into a mobile apparatus, for example a telephone or a tablet computer, the use of a deflection unit may be advantageous to allow longer lenses to be realized.

As already explained hereinbefore, at least one of the detectors may be provided for the detection of light at wavelengths from the near-infrared range. Additionally, in a further exemplary embodiment provision is made to arrange at this detector or in the vicinity of this detector at least one further detector, for example an autofocus detector, an exposure detector, a TOF detector, and/or a lidar detector. Compact housing of all detectors in one module is advantageous in this case. Further, the viewing angle of individual detectors is more or less identical.

All of the exemplary embodiments described in this patent application may include more than one beam splitter unit, even if this is not explicitly described hereinbefore or hereinafter. By way of example, one of the camera systems or the digital long-range optical apparatus includes a first beam splitter unit and a second beam splitter unit. Reference is made to all explanations given hereinabove and hereinbelow, which also apply here.

For example, the first beam splitter unit splits the light in such a way that a detector arranged at the first beam splitter unit detects light at wavelengths from the near-infrared range. Further, the second beam splitter unit for example splits the light into three visible components, for example into red light, into green light, and into blue light. An advantage of this exemplary embodiment is that the detection and the image generated with the light from the near-infrared range may have a different field of view. For example, this field of view has a wider angle than the field of view of the images of the visible light. However, the perspective center of all images remains identical.

As already described hereinabove, the detectors of the various exemplary embodiments may have different embodiments and designs. For example, the detectors have different detection areas. In addition or as an alternative thereto, provision is made for the detectors to include different Bayer filters. Expressed in other words, the detectors have different Bayer patterns. What this can achieve is that each of the three color information items (red, green, blue) is available in each physical pixel. It is then no longer necessary to carry out what is known as "Bayer demosaicing". A higher resolution is also obtained overall. The use of an anti-aliasing filter at the detectors is then no longer necessary either. Moreover, an exemplary embodiment of the disclosure provides for the color filter characteristic of the Bayer filters of the detectors to differ. For example, it is thus possible to record different red wavelength ranges. A higher color resolution can be obtained as a result.

At least one of the detectors may have a monochromatic design in an exemplary embodiment of the disclosure. As a result, a high resolution and luminous grayscale image is additionally available.

All camera systems according to an aspect of the disclosure are also advantageous for recording images underwater. The absorption rate of light in water depends on the wavelength of the light. While blue light can penetrate up to a depth of 60 m in clear water, the penetration depth of for example red light is usually only up to 8 m or less. For this reason, underwater recordings have a blue or green tinge in many cases. A white balance is difficult since too little yellow and red light is present in the images. In general, the light conditions underwater are difficult, especially at relatively large depths. A beam splitter unit as is used in the camera systems according to an aspect of the disclosure for example includes detectors for different colors. A detector for recording the red wavelength range can carry out a longer exposure or operate using a different ISO value than, for example, a detector detecting the blue wavelength range. The record of wavelength ranges outside of the visible range may for example assist in identifying and classifying living beings. Further, the disclosure provides images with less noise on account of the high light yield. Additionally, the structure of the camera systems according to an aspect of the disclosure is very compact. All these advantages are particularly desirable for an underwater camera.

BRIEF DESCRIPTION OF THE DRAWINGS

The disclosure will now be described with reference to the drawings wherein.

DESCRIPTION OF EXEMPLARY EMBODIMENTS

Figure 1:
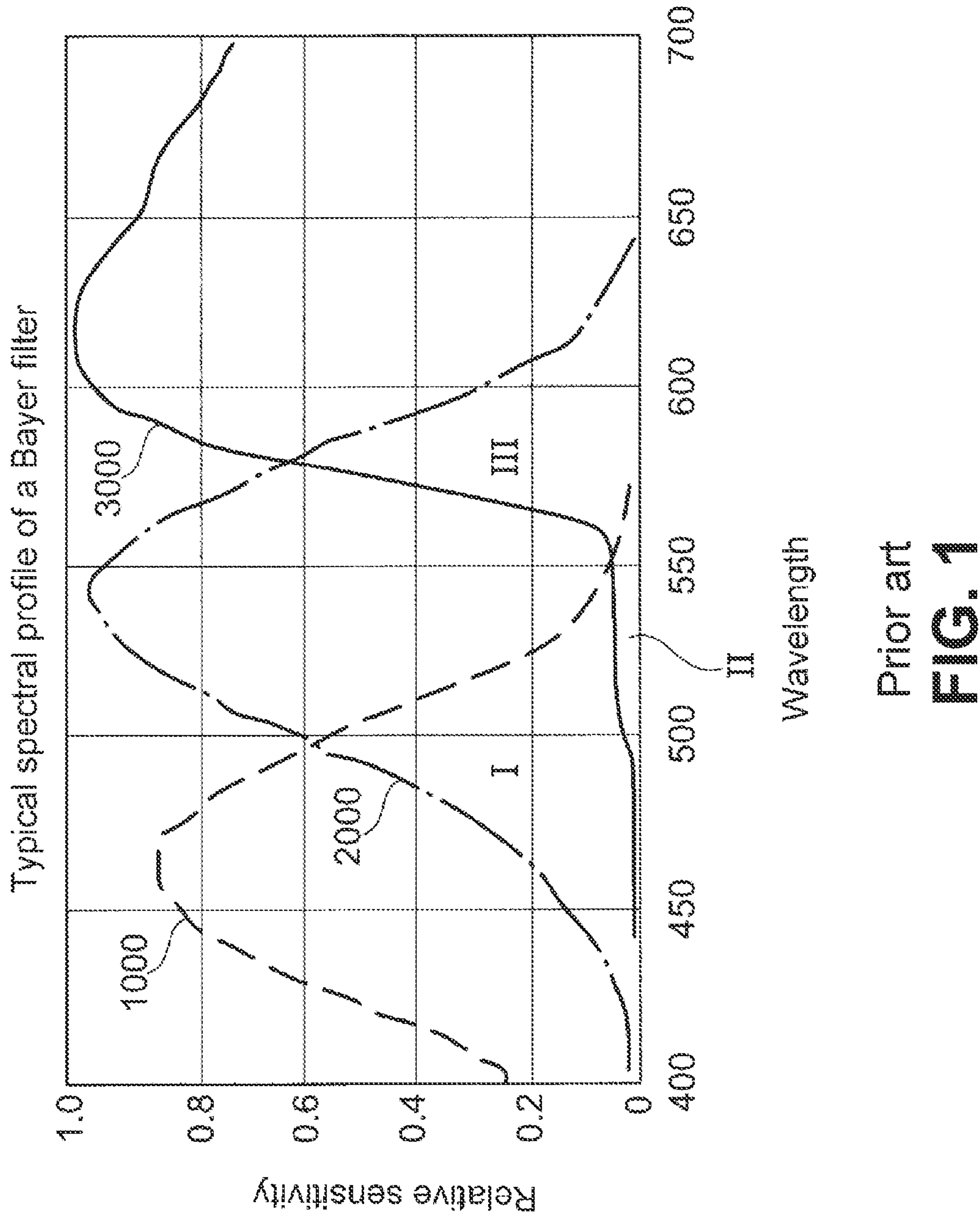
FIG. 1 shows a spectral profile of a Bayer filter known in the prior art.
Figure 2:
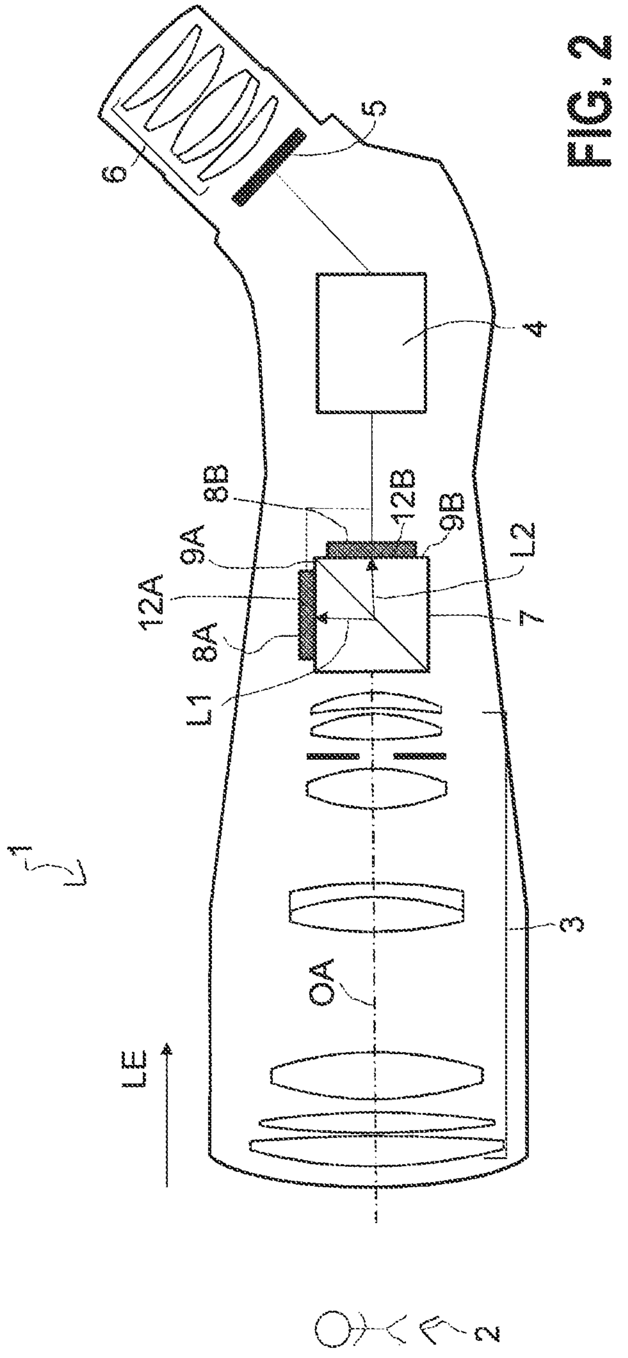
FIG. 2 shows a schematic illustration of a first embodiment of a digital long-range optical apparatus.

FIG. 2 shows an exemplary embodiment of a digital long-range optical apparatus 1 according to the disclosure for imaging an object 2. In this context, both hereinbefore and hereinafter, a digital long-range optical apparatus is understood to mean an optical system which finds use in terrestrial or astronomical context in order to strongly magnify objects such that these are perceivable in detail by a human eye. Reference is made to the explanations given hereinbefore, which also apply here. FIG. 2 shows the exemplary embodiment of the digital long-range optical apparatus 1 in the form of a spotting scope. Further exemplary embodiments of the digital long-range optical apparatus 1 according to the disclosure provide for the digital long-range optical apparatus 1 to be in the form of a binocular apparatus, a pair of field glasses, a refractor, in particular a telescopic sight, a telescope, or a night vision apparatus.

The digital long-range optical apparatus 1 in accordance with FIG. 2 includes an optical axis OA and a lens 3 for imaging the object 2, with the lens 3 being arranged along the optical axis OA. For example, the lens 3 includes at least one lens element. In particular, provision is made for the lens 3 to include a plurality of lens elements and/or a plurality of optical units, for example lens element groups. In this case, a lens element group is understood to mean an optical unit including at least one lens element or a plurality of lens elements.

Moreover, the digital long-range optical apparatus 1 in accordance with FIG. 2 is provided with a processor unit 4 and with a display unit 5 for displaying an image of the object 2. The processor unit 4 is line-connected to the display unit 5. Accordingly, signals are transmittable from the processor unit 4 to the display unit 5 and/or from the display unit 5 to the processor unit 4. The display unit 5 is in the form of a digital display unit. In particular, the display unit 5 can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used. In the exemplary embodiment of the digital long-range optical apparatus 1 in accordance with FIG. 2, the image of the object 2 displayed on the display unit 5 is observed with an eyepiece 6. For example, the eyepiece 6 includes at least one lens element. In particular, provision is made for the eyepiece 6 to include a plurality of lens elements and/or a plurality of optical units, for example lens element groups. In this case, a lens element group is understood to mean an optical unit including at least one lens element or a plurality of lens elements.

Further, the digital long-range optical apparatus 1 in accordance with FIG. 2 includes a beam splitter unit 7. The lens 3 is arranged first along the optical axis OA in a direction of light incidence LE, followed by the beam splitter unit 7. Moreover, the digital long-range optical apparatus 1 in accordance with FIG. 2 includes a first detector 8A and a second detector 8B. The processor unit 4 is line-connected to both the first detector 8A and the second detector 8B. Accordingly, signals are transmittable from the processor unit 4 to the first detector 8A and/or from the first detector 8A to the processor unit 4. Additionally, signals are transmittable from the processor unit 4 to the second detector 8B and/or from the second detector 8B to the processor unit 4.

The first detector 8A is configured to detect first light L1 generated by the beam splitter unit 7. Expressed in other words, the first detector 8A detects first light L1 which is generated by the beam splitter unit 7 by the incidence of light incident on the beam splitter unit 7. The second detector 8B is configured to detect second light L2 generated by the beam splitter unit 7. Expressed in other words, the second detector 8B detects second light L2 which is generated by the beam splitter unit 7 by the incidence of light incident on the beam splitter unit 7.

By way of example, the first detector 8A and/or the second detector 8B are/is in the form of a CCD detector or CMOS detector. However, the disclosure is not restricted to the aforementioned exemplary embodiments. Rather, the first detector 8A and/or the second detector 8B can be any detector suitable for the disclosure. By way of example, one of the two detectors 8A and 8B or both of the aforementioned detectors is/are in the form of a detector provided with a Bayer filter. The Bayer filter includes color filters for the colors of red, green, and blue. A respective color filter is assigned to an individual pixel of the corresponding detector 8A, 8B. Expressed in other words, a respective color filter is arranged at a respective pixel of the corresponding detector 8A, 8B. A color filter serves to transmit a single color of the light incident on the color filter. Light of this individual color reaches the pixel assigned to the color filter of the corresponding detector 8A, 8B. By contrast, further colors of the light are filtered out with the color filter. Light of these further colors consequently does not reach the pixel.

The processor unit 4 is additionally in the form of for example a control unit and/or supply unit, which controls the display unit 5, the first detector 8A, and/or the second detector 8B and/or which supplies these/this with voltage.

In the case of the digital long-range optical apparatus 1 in accordance with FIG. 2, the first detector 8A and the second detector 8B are arranged at the beam splitter unit 7. The beam splitter unit 7 includes a first beam splitter face 9A, at which the first detector 8A is arranged. Further, the beam splitter unit 7 includes a second beam splitter face 9B, at which the second detector 8B is arranged. In a further exemplary embodiment of the digital long-range optical apparatus 1, provision is additionally or alternatively made for a first optical device (not illustrated) to be arranged between the beam splitter unit 7 and the first detector 8A. The first optical device guides the first light L1 from the beam splitter unit 7 to the first detector 8A. Additionally or as an alternative thereto, provision is made in this exemplary embodiment for a second optical device (not illustrated) to be arranged between the beam splitter unit 7 and the second detector 8B. The second optical device guides the second light L2 from the beam splitter unit 7 to the second detector 8B.

For example, the first beam splitter face 9A and the second beam splitter face 9B are arranged with respect to one another at an angle of between 0° and 180°, with the interval boundaries being included. Additionally or as an alternative thereto, the first beam splitter face 9A and the second beam splitter face 9B are arranged at a distance from one another. In particular, provision is made for the first beam splitter face 9A and the second beam splitter face 9B to be arranged parallel to one another. For example, provision is made for the aforementioned beam splitter faces 9A, 9B to be arranged relative to one another in the style of a cube. Expressed in other words, the aforementioned faces 9A, 9B are for example arranged with respect to one another at an angle of 90° or substantially 90°.

By way of example, the first detector 8A includes a sensitive first detector area 12A. The pixels of the first detector 8A which detect the first light L1 are arranged at the first detector area 12A. The first detector area 12A is not necessarily the entire detector area where pixels of the first detector 8A which detect the first light L1 are arranged. Rather, an exemplary embodiment of the digital long-range optical apparatus 1 provides for the first detector area 12A to be a partial area of the entire detector area of the first detector 8A. By way of example, provision is made for the processor unit 4 to be used to control the first detector 8A in such a way that a selectable first detector area 12A is switched to be sensitive for the detection of first light L1. Further, additional provision is made for the second detector 8B to include a sensitive second detector area 12B. The pixels of the second detector 8B which detect the second light L2 are arranged at the second detector area 12B. The second detector area 12B is not necessarily the entire detector area where pixels of the second detector 8B which detect the second light L2 are arranged. Rather, an exemplary embodiment of the digital long-range optical apparatus 1 provides for the second detector area 12B to be a partial area of the entire detector area of the second detector 8B. By way of example, provision is made for the processor unit 4 to be used to control the second detector 8B in such a way that a selectable second detector area 12B is switched to be sensitive for the detection of second light L2.

Light emanating from the object 2 enters the lens 3 in the direction of the light incidence LE and is incident on the beam splitter unit 7. The beam splitter unit 7 serves to split the light into the first light L1 and into the second light L2. Expressed in other words, the beam splitter unit 7 serves to split the light into two components.

The first light L1 includes one of the following features: (i) light at only a single first wavelength, (ii) light from a first wavelength range, or (iii) a specifiable first intensity. Reference is made to the explanations provided hereinbefore in respect of the definition of the terms of single wavelength and wavelength range. These also apply here. The single first wavelength may for example be a wavelength from the visible or invisible wavelength range. In particular, provision is made for the light at the first wavelength to be a red light, a green light, or a blue light. For example, the first wavelength range can be the wavelength range of the visible light, of the infrared range, of the near-infrared range, or of the short-wavelength infrared light. The exemplary embodiment of the first wavelength range in the form of the near-infrared range or the short-wavelength infrared light is advantageous, especially when observing an object 2 in twilight or low-light weather conditions. The first intensity of the first light L1 can be any selectable intensity, for example a percentage of the light incident in the beam splitter unit 7 from the lens 3. For example, the first intensity of the first light L1, and hence the percentage, is 10%, 20%, 30%, 40%, 50%, 60%, 70%, 80%, or 90% of the light incident in the beam splitter unit 7 from the lens 3.

In the digital long-range optical apparatus 1 in accordance with FIG. 2, the second light L2 includes one of the following features: (i) light at only a single second wavelength, (ii) light from a second wavelength range, or (iii) a specifiable second intensity. Reference is made to the explanations provided hereinbefore in respect of the definition of the terms of single wavelength and wavelength range. These also apply here. The single second wavelength may for example be a wavelength from the visible or invisible wavelength range. In particular, provision is made for the light at the second wavelength to be a red light, a green light, or a blue light. For example, the second wavelength range can be the wavelength range of the visible light, of the infrared range, of the near-infrared range, or of the short-wavelength infrared light. The exemplary embodiment of the second wavelength range in the form of the near-infrared range or the short-wavelength infrared light is advantageous, especially when observing an object 2 in twilight or low-light weather conditions. The second intensity of the second light L2 can be any selectable intensity, for example, depending on the percentage of the first intensity of the first light L1, a percentage of the light incident in the beam splitter unit 7 from the lens 3. For example, the second intensity of the second light L2, and hence the percentage, is 10%, 20%, 30%, 40%, 50%, 60%, 70%, 80%, or 90% of the light incident in the beam splitter unit 7 from the lens 3, depending on the percentage of the first intensity of the first light L1. For example, the percentage of the first intensity of the first light L1 is 20% and the percentage of the second intensity of the second light L2 is 80%.

On account of the beam splitter unit 7, the digital long-range optical apparatus 1 has a good light efficiency and a good color resolution for the purpose of generating a good image of the object 2. With the beam splitter unit 7, it is possible to split light into different color components (wavelengths) and/or wavelength ranges, with the result that information with different color components and/or wavelength ranges is generated. The split color components and/or wavelength ranges are detected by different detectors, for example by the first detector 8A and the second detector 8B. The different detection signals provided by the detectors 8A, 8B are used for generating a single image and/or a plurality of images of the object 2. The single generated image or the plurality of generated images have a good light efficiency and a good color resolution. In comparison with the prior art, in which a single detector provided with a Bayer filter and having a single detector area is used, the disclosure first of all provides a plurality of detectors with a plurality of detector areas, with the result that, in comparison with the prior art, more information can be used for the generation of the image of the object 2. Secondly, the plurality of detectors can be controlled on an individual basis. Both effects lead to images with a good light efficiency and a good color resolution.

Figures 3, 4:
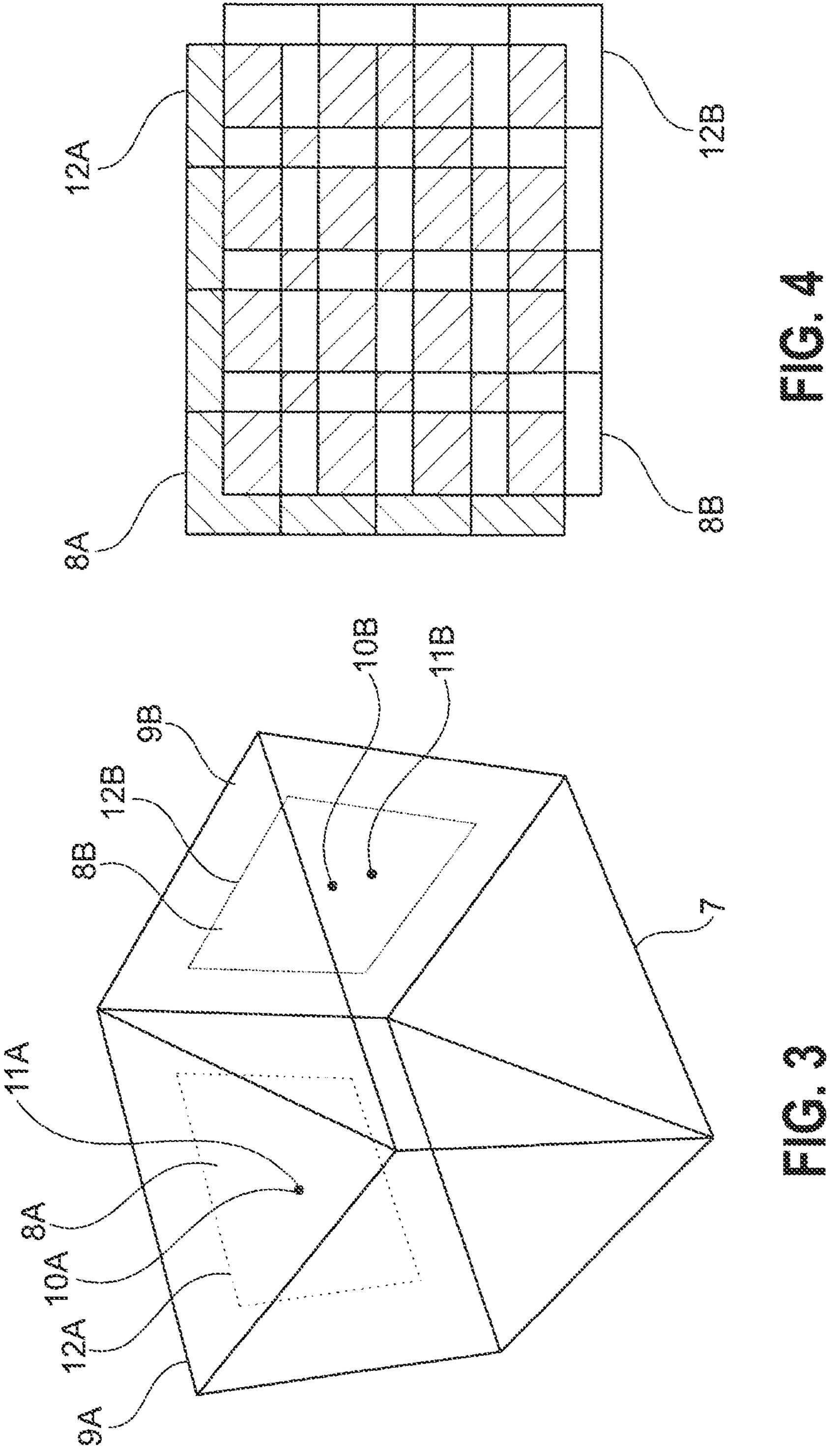
FIG. 3 shows a schematic illustration of a beam splitter unit.
FIG. 4 shows a schematic illustration of detector areas of different detectors.

FIG. 3 shows a further exemplary embodiment of the beam splitter 7. The first detector 8A is arranged at the first beam splitter face 9A, the first detector 8A having the first detector area 12A. The second detector 8B is arranged at the second beam splitter face 9B, the second detector 8B having the second detector area 12B. The first beam splitter face 9A includes a first face center 10A. The second beam splitter face 9B includes a second face center 10B. The first detector area 12A of the first detector 8A includes a first detector area center 11A. By contrast, the second detector area 12B of the second detector 8B includes a second detector area center 11B. In this embodiment of the beam splitter 7, the first face center 10A corresponds to the first detector area center 11A. Accordingly, the first detector area center 11A of the first detector 8A is at a first distance from the first face center 10A of the first beam splitter face 9A, the first distance being basically zero. The second detector area center 11B of the second detector 8B is at a second distance from the second face center 10B of the second beam splitter face 9B, the second distance being not zero. The first distance differs from the second distance. In principle, the two detector areas 12A and 12B are arranged offset to each other with regard to the beam splitter face 9A and 9B assigned to them. This can also be described as follows. If, as illustrated in FIG. 4, the first detector area 12A of the first detector 8A and the second detector area 12B of the second detector 8B were to be arranged relative to one another in one plane, then the two detector areas 12A and 12B would be arranged offset from one another, with the result that the first detector area 12A and the second detector area 12B do not record exactly the same image of the object 2 but record different image portions of the object 2. This is explained hereinafter using a simplified exemplary embodiment. In the exemplary embodiment illustrated in FIG. 4, the first detector area 12A and the second detector area 12B each contain 4 by 4 pixels. The arrangement of the second detector area 12B is displaced by half a pixel with respect to the first detector area 12A. As a result, it is possible to calculate and present a super-resolution image of the object 2 with known super-resolution algorithms (which are used for super-resolution imaging).

Figure 5:
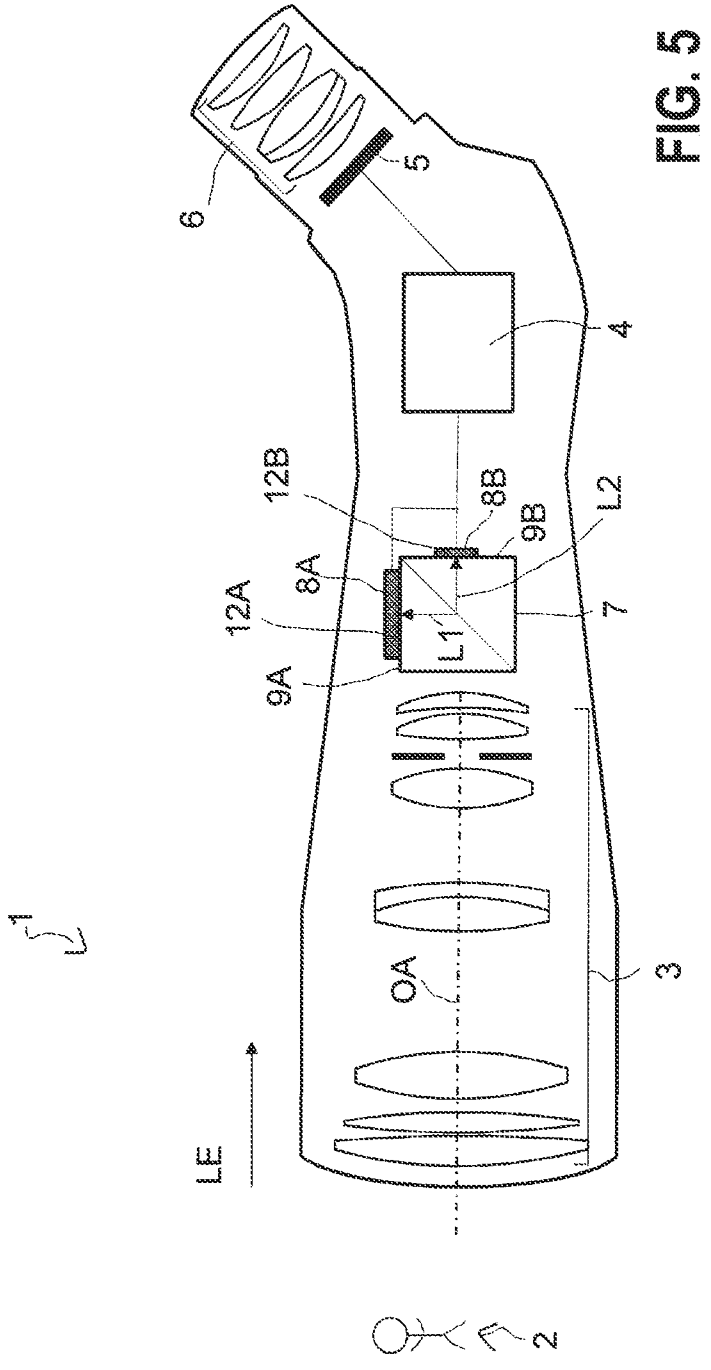
FIG. 5 shows a second exemplary embodiment of a digital long-range optical apparatus.

FIG. 5 shows a further exemplary embodiment of a digital long-range optical apparatus 1 according to the disclosure for imaging an object 2. The further embodiment of FIG. 5 is based on the embodiment of FIG. 2. Therefore, reference is made to all the explanations provided hereinbefore, which also apply here. In contrast to the exemplary embodiment of FIG. 2, the exemplary embodiment of FIG. 5 provides for the first detector area 12A to differ in size from the second detector area 12B. In the exemplary embodiment illustrated in FIG. 5, the first detector area 12A is larger than the second detector area 12B. By way of example, the first detector area 12A is two times, three times, or four times larger than the second detector area 12B. This exemplary embodiment of the digital long-range optical apparatus 1 is advantageous in that a first image generated by the first detector 8A and a second image generated by the second detector 8B are based on differently sized fields of view. As a result, it is possible to provide digital zooming within the scope of the digital long-range optical apparatus 1, and generate different zoom images with different zoom levels. For example, the first image is based on a first field of view and shows a first image portion of the object 2, which corresponds to an image at a first zoom level. Further, for example, the second image is based on a second field of view and shows a second image portion of the object 2, which corresponds to an image at a second zoom level. It is advantageous that the resolution of the images remains the same for all zoom levels if the resolution of the detectors is the same. By contrast, in the case of a digital zoom known from the prior art, the resolution reduces as the zooming increases.

Figure 6:
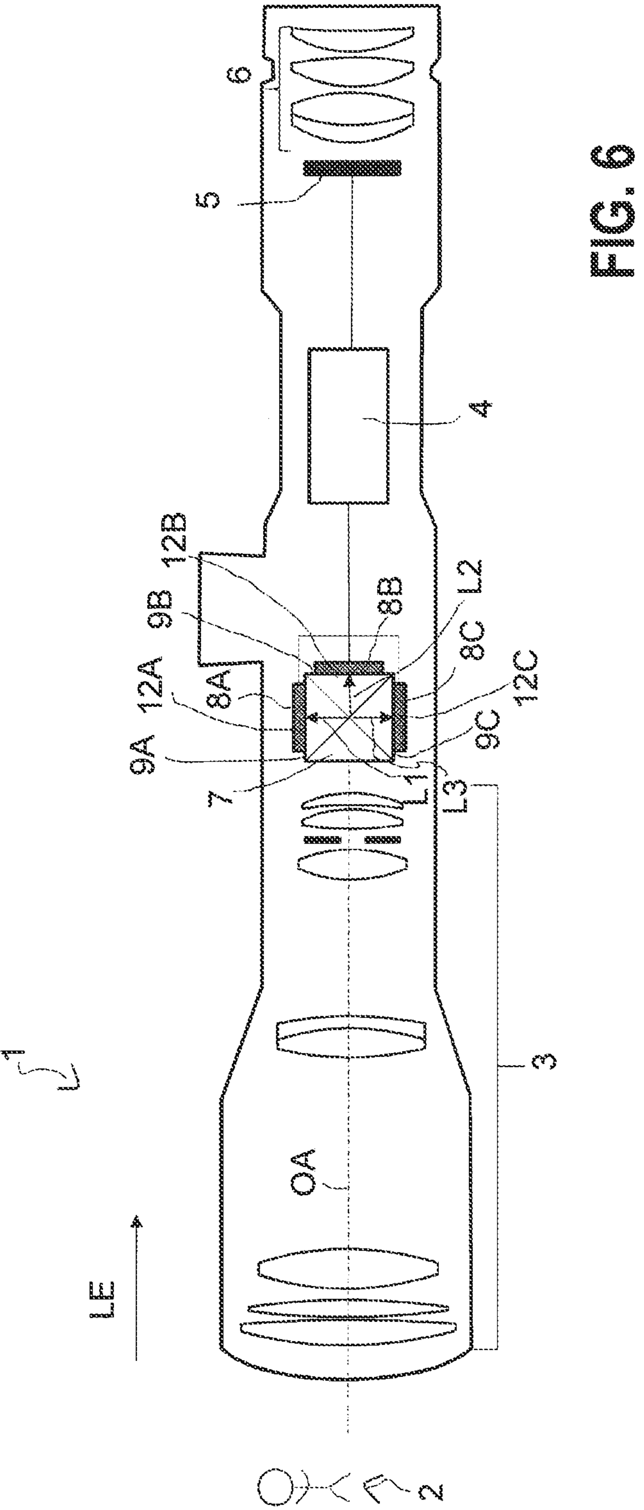
FIG. 6 shows a third exemplary embodiment of a digital long-range optical apparatus.

FIG. 6 shows a further exemplary embodiment of a digital long-range optical apparatus 1 according to the disclosure for imaging an object 2. The further exemplary embodiment of FIG. 6 is based on the exemplary embodiment of FIG. 2. Therefore, reference is made to all the explanations provided hereinbefore, which also apply here. FIG. 6 shows the exemplary embodiment of the digital long-range optical apparatus 1 in the form of a refractor, in particular a telescopic sight. Further exemplary embodiments of the digital long-range optical apparatus 1 according to the disclosure provide for the digital long-range optical apparatus 1 to be in the form of a binocular apparatus, a pair of field glasses, a spotting scope, a telescope, or a night vision apparatus. In contrast to the exemplary embodiment of FIG. 2, the exemplary embodiment of FIG. 6 provides for the digital long-range optical apparatus 1 to include a third detector 8C. The digital long-range optical apparatus 1 consequently includes not only two detectors in the form of the first detector 8A and the second detector 8B, but more than two detectors. The processor unit 4 is line-connected to the third detector 8C. Accordingly, signals are transmittable from the processor unit 4 to the third detector 8C and/or signals are transmittable from the third detector 8C to the processor unit 4. The third detector 8C is configured to detect third light L3 generated by the beam splitter unit 7.

As specified hereinbefore, the first detector 8A and/or the second detector 8B are/is in the form of a CCD detector or CMOS detector, for example. By way of example, the third detector 8C is also in the form of a CCD detector or CMOS detector. However, the disclosure is not restricted to the aforementioned exemplary embodiments. Rather, the first detector 8A and/or the second detector 8B and/or the third detector 8C can be any detector suitable for the disclosure. By way of example, at least one of the detectors 8A, 8B, and 8C is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The third detector 8C is arranged at the beam splitter unit 7. The beam splitter unit 7 includes a third beam splitter face 9C, at which the third detector 8C is arranged. In a further exemplary embodiment of the digital long-range optical apparatus 1, provision is additionally or alternatively made for a third optical device (not illustrated) to be arranged between the beam splitter unit 7 and the third detector 8C. The third optical device guides the third light L3 from the beam splitter unit 7 to the third detector 8C.

For example, at least two of the faces or each of the faces of the first beam splitter face 9A, the second beam splitter face 9B, and the third beam splitter face 9C are arranged with respect to one another at an angle of between 0° and 180°, with the interval boundaries being included. Additionally or as an alternative thereto, at least two faces of the first beam splitter face 9A, the second beam splitter face 9B, and the third beam splitter face 9C are arranged at a distance from one another. In particular, provision is made for at least two of the aforementioned faces 9A to 9C to be arranged parallel to one another. For example, provision is made for the aforementioned beam splitter faces 9A to 9C to be arranged relative to one another in the style of a cube. Expressed in other words, respectively two of the aforementioned faces 9A to 9C are for example arranged with respect to one another at an angle of 90° or substantially 90°.

The third light L3 includes one of the following features: (i) light at only a single third wavelength, (ii) light from a third wavelength range, or (iii) a specifiable third intensity. Reference is made to the explanations provided hereinbefore in respect of the definition of the terms of single wavelength and wavelength range. These also apply here. The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing an object 2 in twilight or low-light weather conditions. The third intensity of the third light L3 can be any selectable intensity, for example, depending on the percentage of the first intensity of the first light L1 and/or the second intensity of the second light L2, a percentage of the light incident in the beam splitter unit 7 from the lens 3. For example, the third intensity of the third light L3, and hence the percentage, is 10%, 20%, 30%, 40%, 50%, 60%, 70%, 80%, or 90% of the light incident in the beam splitter unit 7 from the lens 3, depending on the percentage of the first intensity of the first light L1 and/or the second intensity of the second light L2. For example, the percentage of the first intensity of the first light L1 is 20%, the percentage of the second intensity of the second light L2 is 50%, and the percentage of the third intensity of the third light L3 is 30%.

Figure 6B:
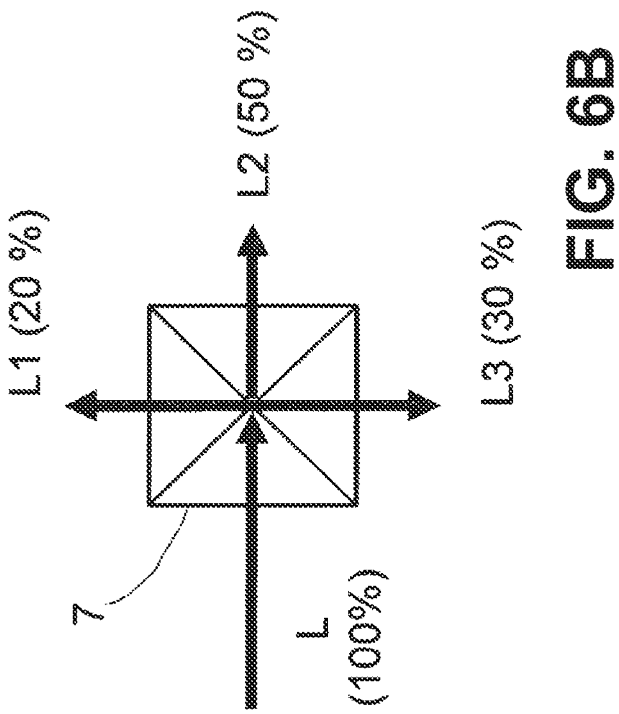
FIG. 6B shows a further schematic illustration of a beam splitter unit.
Figure 6A:
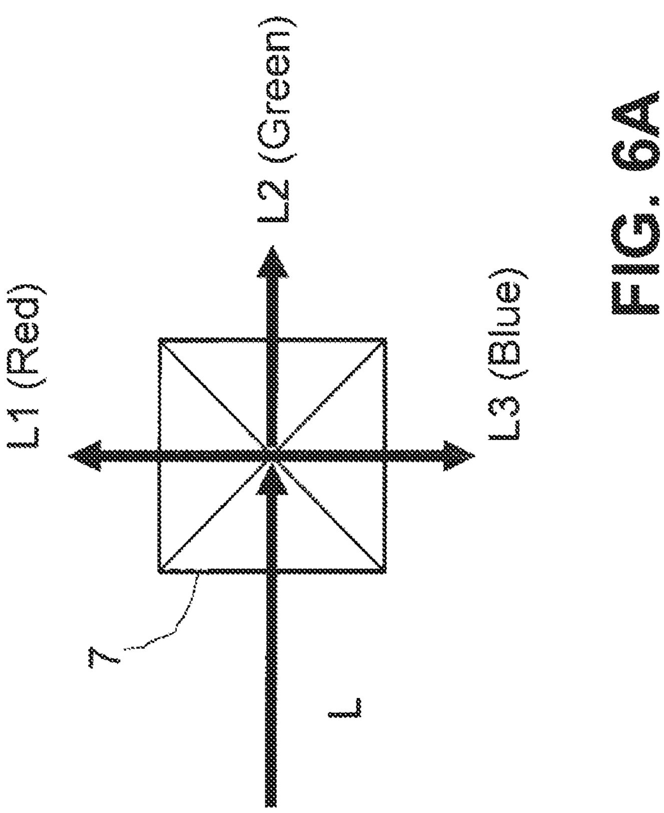
FIG. 6A shows a schematic illustration of a beam splitter unit.

FIG. 6A shows the beam splitter unit 7, in which light L from the lens 3 is incident. The incident light L is split into the first light L1, into the second light L2, and into the third light L3. By way of example, the first light L1 includes only a single wavelength of the red light. Further, the second light L2 includes only a single wavelength of the green light, for example. The third light L3 for example includes only a single wavelength of the blue light. As an alternative thereto, provision is for example made for the first light L1 to include one wavelength or a plurality of wavelengths from the wavelength range of the red light. Further, provision is for example made for the second light L2 to contain one wavelength or a plurality of wavelengths from the wavelength range of the green light. Moreover, provision is for example made for the third light L3 to contain one wavelength or a plurality of wavelengths from the wavelength range of the blue light.

FIG. 6B shows the beam splitter unit 7, in which light L from the lens 3 is incident. The incident light L includes an intensity of 100%. It is split into the first light L1 with an intensity of 20%, into the second light L2 with an intensity of 50%, and into the third light L3 with an intensity of 30%. By way of example, the first light L1 includes only a single wavelength of the red light. Further, the second light L2 includes only a single wavelength of the green light, for example. The third light L3 for example includes only a single wavelength of the blue light. As an alternative thereto, provision is for example made for the first light L1 to include one wavelength or a plurality of wavelengths from the wavelength range of the red light. Further, provision is for example made for the second light L2 to contain one wavelength or a plurality of wavelengths from the wavelength range of the green light. Moreover, provision is for example made for the third light L3 to contain one wavelength or a plurality of wavelengths from the wavelength range of the blue light.

The third detector 8C includes a sensitive third detector area 12C (see FIG. 6). The pixels of the third detector 8C which detect the third light L3 are arranged at the third detector area 12C. The third detector area 12C is not necessarily the entire detector area where pixels of the third detector 8C which detect the third light L3 are arranged. Rather, an exemplary embodiment of the digital long-range optical apparatus 1 provides for the third detector area 12C to be a partial area of the entire detector area of the third detector 8C. By way of example, provision is made for the processor unit 4 to be used to control the third detector 8C in such a way that a selectable third detector area is switched to be sensitive for the detection of third light L3.

In a further exemplary embodiment of the digital long-range optical apparatus 1 in accordance with FIG. 6, the first detector area 12A, the second detector area 12B, and the third detector area 12C have a relative arrangement as described in relation to FIGS. 3 and 4. Reference is made to the comments made hereinbefore, which also apply here. As described hereinbefore, the beam splitter unit 7 includes the third beam splitter face 9C, at which the third detector 8C is arranged. The third beam splitter face 9C includes a third face center (not illustrated). The third detector area 12C of the third detector 8C includes a third detector area center (not illustrated). As already explained hereinbefore, the first detector area center 11A of the first detector 8A is at a first distance from the first face center 10A of the first beam splitter face 9A. The second detector area center 11B of the second detector 8B is at a second distance from the second face center 10B of the second beam splitter face 9B. Further, the third detector area center of the third detector 8C is at a third distance from the third face center of the third beam splitter face 9C. The first distance differs from the second distance and/or from the third distance. In principle, the three detector areas 12A, 12B, and 12C are arranged offset to each other with regard to the beam splitter face 9A, 9B, and 9C assigned to them. If the first detector area 12A of the first detector 8A, the second detector area 12B of the second detector 8B, and the third detector area 12C of the third detector 8C were to be arranged relative to one another in one plane, then the detector areas 12A, 12B, and 12C would be arranged offset from one another, with the result that the first detector area 12A, the second detector area 12B, and the third detector area 12C do not record exactly the same image of the object 2 but record different image portions of the object 2. This exemplary embodiment consequently ensures that the first detector area 12A, the second detector area 12B, and the third detector area 12C do not record exactly the same image of the object 2 but instead record different image portions of the object 2. As a result, it is possible to calculate and present a super-resolution image of the object 2 using known super-resolution algorithms (which are used for super-resolution imaging).

Figure 7:
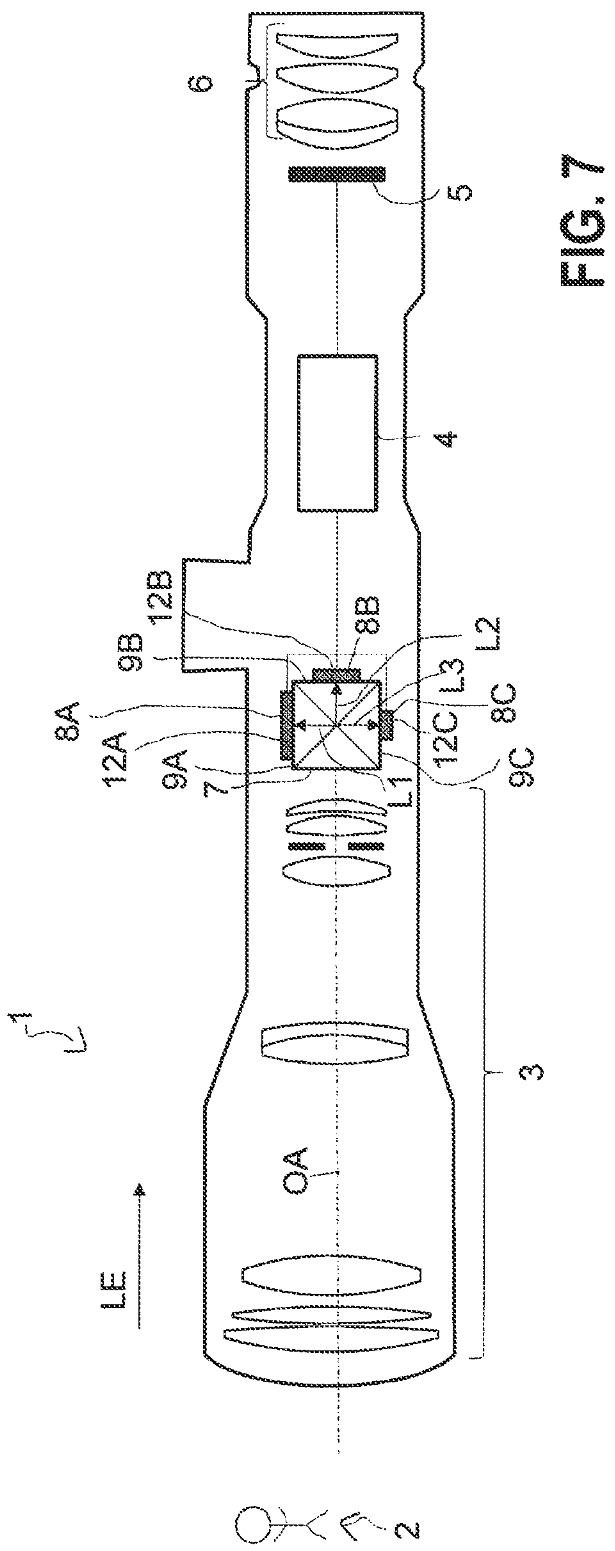
FIG. 7 shows a fourth exemplary embodiment of a digital long-range optical apparatus.

FIG. 7 shows a further exemplary embodiment of a digital long-range optical apparatus 1 for imaging an object 2. The further exemplary embodiment of FIG. 7 is based on the exemplary embodiment of FIG. 6. Therefore, reference is made to all the explanations provided hereinbefore, which also apply here. In contrast to the exemplary embodiment of FIG. 6, the exemplary embodiment of FIG. 7 provides for the third detector area 12C to differ in size from the first detector area 12A and/or the second detector area 12B. In the exemplary embodiment illustrated in FIG. 7, the first detector area 12A is larger than the second detector area 12B. Further, the second detector area 12B is larger than the third detector area 12C. By way of example, the first detector area 12A is two times, three times, or four times larger than the second detector area 12B. Further, the second detector area 12B is for example two times, three times, or four times larger than the third detector area 12C. This exemplary embodiment of the digital long-range optical apparatus 1 is advantageous in that a first image generated by the first detector 8A, a second image generated by the second detector 8B, and a third image generated by the third detector 8C are based on differently sized fields of view. As a result, it is possible to provide digital zooming within the scope of the digital long-range optical apparatus 1, and generate different zoom images with different zoom levels. For example, the first image is based on a first field of view and shows a first image portion of the object 2, which corresponds to an image at a first zoom level. Further, for example, the second image is based on a second field of view and shows a second image portion of the object 2, which corresponds to an image at a second zoom level. Moreover, the third image is based on a third field of view and shows a third image portion of the object 2, which corresponds to an image at a third zoom level. It is advantageous that the resolution of the images remains the same for all zoom levels if the resolution of the detectors is the same. By contrast, in the case of a digital zoom known from the prior art, the resolution reduces as the zooming increases.

Figure 8:
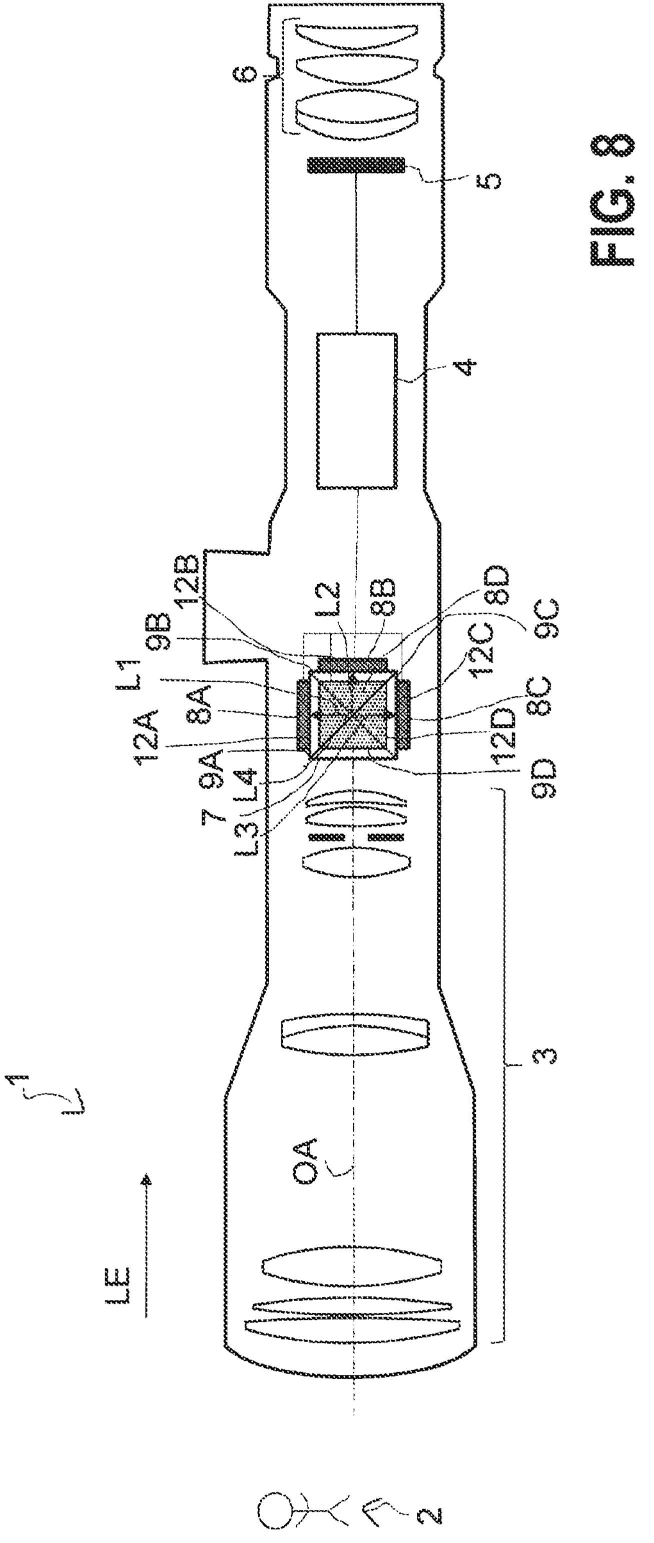
FIG. 8 shows a fifth exemplary embodiment of a digital long-range optical apparatus.

FIG. 8 shows a further exemplary embodiment of a digital long-range optical apparatus 1 according to the disclosure for imaging an object 2. The further exemplary embodiment of FIG. 8 is based on the exemplary embodiment of FIG. 6. Therefore, reference is made to all the explanations provided hereinbefore, which also apply here. Identical components are provided with the same reference signs. FIG. 8 shows the exemplary embodiment of the digital long-range optical apparatus 1 in the form of a refractor, in particular a telescopic sight. Further exemplary embodiments of the digital long-range optical apparatus 1 according to the disclosure provide for the digital long-range optical apparatus 1 to be in the form of a binocular apparatus, a pair of field glasses, a spotting scope, a telescope, or a night vision apparatus. In contrast to the exemplary embodiment of FIG. 6, the exemplary embodiment of FIG. 8 provides for the digital long-range optical apparatus 1 to include a fourth detector 8D. The digital long-range optical apparatus 1 consequently includes not only three detectors in the form of the first detector 8A, the second detector 8B, and the third detector 8C, but more than three detectors. The processor unit 4 is line-connected to the fourth detector 8D. Accordingly, signals are transmittable from the processor unit 4 to the fourth detector 8D and/or signals are transmittable from the fourth detector 8D to the processor unit 4. The fourth detector 8D is configured to detect fourth light L4 generated by the beam splitter unit 7.

The fourth detector 8D is arranged at the beam splitter unit 7. The beam splitter unit 7 includes a fourth beam splitter face 9D, at which the fourth detector 8D is arranged. The fourth beam splitter face 9D and hence the fourth detector 8D are arranged in a plane extending parallel to the plane of the drawing (plane of the sheet). The fourth light L4 runs perpendicular to the plane of the drawing until it is incident on the fourth detector 8D. In a further exemplary embodiment of the digital long-range optical apparatus 1, provision is additionally or alternatively made for a fourth optical device (not illustrated) to be arranged between the beam splitter unit 7 and the fourth detector 8D. The fourth optical device guides the fourth light L4 from the beam splitter unit 7 to the fourth detector 8D.

For example, at least two of the faces or each of the faces of the first beam splitter face 9A, the second beam splitter face 9B, the third beam splitter face 9C, and the fourth beam splitter face 9D are arranged with respect to one another at an angle of between 0° and 180°, with the interval boundaries being included. Additionally or as an alternative thereto, at least two faces of the first beam splitter face 9A, the second beam splitter face 9B, the third beam splitter face 9C, and the fourth beam splitter face 9D are arranged at a distance from one another. In particular, provision is made for at least two of the aforementioned faces 9A to 9D to be arranged parallel to one another. For example, provision is made for the aforementioned beam splitter faces 9A to 9D to be arranged relative to one another in the style of a cube. Expressed in other words, respectively two of the aforementioned faces 9A to 9D are for example arranged with respect to one another at an angle of 90° or substantially 90°.

As specified hereinbefore, the first detector 8A and/or the second detector 8B and/or the third detector 8C are/is in the form of a CCD detector or CMOS detector, for example. By way of example, the fourth detector 8D is also in the form of a CCD detector or CMOS detector. However, the disclosure is not restricted to the aforementioned exemplary embodiments. Rather, the first detector 8A and/or the second detector 8B and/or the third detector 8C and/or the fourth detector 8D can be any detector suitable for the disclosure. By way of example, at least one of the detectors 8A, 8B, 8C, and 8D is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The fourth light L4 includes one of the following features: (i) light at only a single fourth wavelength, (ii) light from a fourth wavelength range, or (iii) a specifiable fourth intensity. Reference is made to the explanations provided hereinbefore in respect of the definition of the terms of single wavelength and wavelength range. These also apply here. The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing an object 2 in twilight or low-light weather conditions. The fourth intensity of the fourth light L4 can be any selectable intensity, for example, depending on the percentage of the first intensity of the first light L1 and/or the second intensity of the second light L2 and/or the third intensity of the third light L3, a percentage of the light incident in the beam splitter unit 7 from the lens 3. For example, the fourth intensity of the fourth light L4, and hence the percentage, is 10%, 20%, 30%, 40%, 50%, 60%, 70%, 80%, or 90% of the light incident in the beam splitter unit 7 from the lens 3, depending on the percentage of the first intensity of the first light L1 and/or the second intensity of the second light L2 and/or the third intensity of the third light L3. For example, the percentage of the first intensity of the first light L1 is 20%, the percentage of the second intensity of the second light L2 is 50%, the percentage of the third intensity of the third light L3 is 10%, and the percentage of the fourth intensity of the fourth light L4 is 20%.

The fourth detector 8D includes a sensitive fourth detector area 12D. The pixels of the fourth detector 8D which detect the fourth light L4 are arranged at the fourth detector area 12D. The fourth detector area 12D is not necessarily the entire detector area where pixels of the fourth detector 8D which detect the fourth light L4 are arranged. Rather, an exemplary embodiment of the digital long-range optical apparatus 1 provides for the fourth detector area 12D to be a partial area of the entire detector area of the fourth detector 8D. By way of example, provision is made for the processor unit 4 to be used to control the fourth detector 8D in such a way that a selectable fourth detector area 12D is switched to be sensitive for the detection of fourth light L4.

In a further exemplary embodiment of the digital long-range optical apparatus 1 in accordance with FIG. 8, the first detector area 12A, the second detector area 12B, the third detector area 12C, and the fourth detector area 12D have a relative arrangement as described in relation to FIGS. 3 and 4. Reference is made to the comments made hereinbefore, which also apply here. The fourth detector area 12D of the fourth detector 8D includes a fourth detector area center (not illustrated). The fourth beam splitter face 9D includes a fourth face center (not illustrated). As already explained hereinbefore, the first detector area center 11A of the first detector 8A is at a first distance from the first face center 10A of the first beam splitter face 9A. The second detector area center 11B of the second detector 8B is at a second distance from the second face center 10B of the second beam splitter face 9B. Further, the third detector area center of the third detector 8C is at a third distance from the third face center of the third beam splitter face 9C. The fourth detector area center of the fourth detector 8D is at a fourth distance from the fourth face center of the fourth beam splitter face 9D. The first distance differs from the second distance and/or from the third distance and/or from the fourth distance. In principle, the four detector areas 12A, 12B, 12C, and 12D are arranged offset to each other with regard to the beam splitter face 9A, 9B, 9C, and 9D assigned to them. This exemplary embodiment ensures that the first detector area 12A, the second detector area 12B, the third detector area 12C, and the fourth detector area 12D do not record exactly the same image of the object 2 but instead record different image portions of the object 2. As a result, it is possible to calculate and present a super-resolution image of the object 2 with known super-resolution algorithms (which are used for super-resolution imaging).

Figure 9:
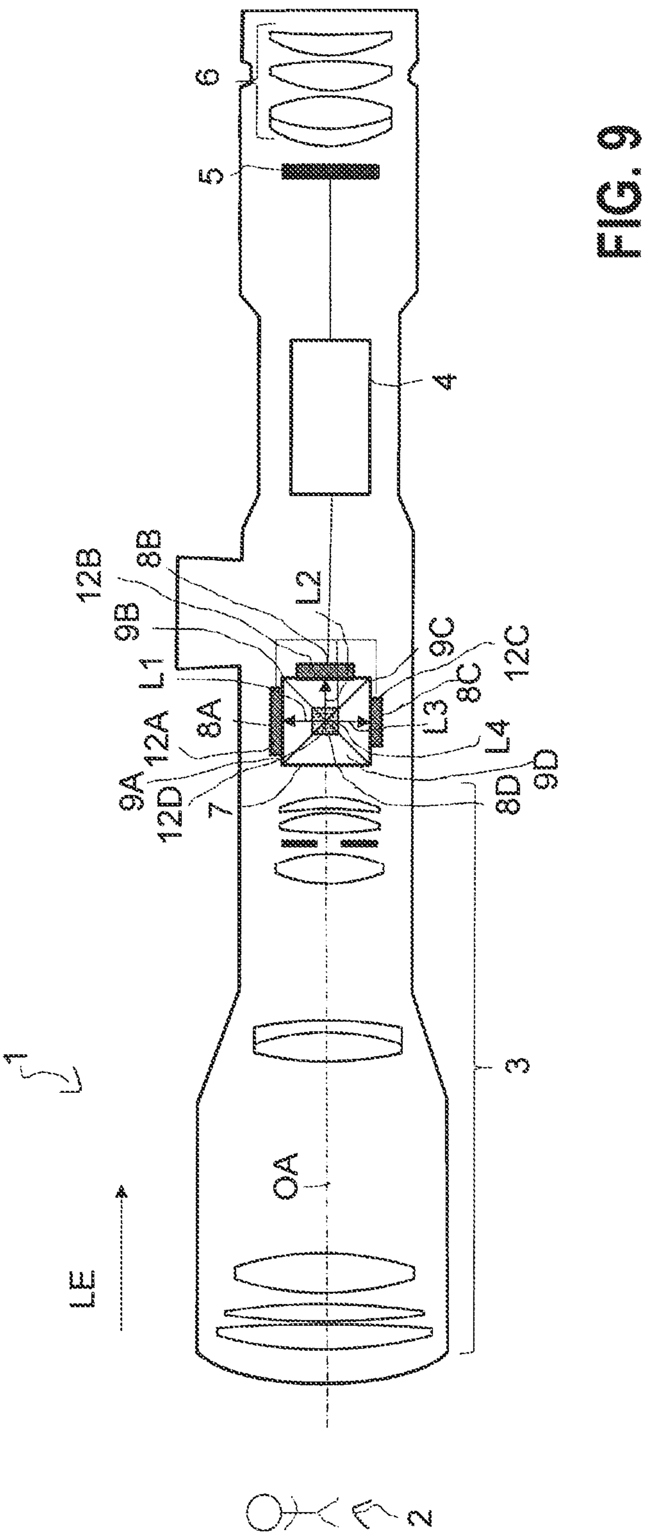
FIG. 9 shows a sixth exemplary embodiment of a digital long-range optical apparatus.

FIG. 9 shows a further exemplary embodiment of a digital long-range optical apparatus 1 for imaging an object 2. The further exemplary embodiment of FIG. 9 is based on the exemplary embodiment of FIG. 8. Therefore, reference is made to all the explanations provided hereinbefore, which also apply here. In contrast to the exemplary embodiment of FIG. 8, the exemplary embodiment of FIG. 9 provides for the fourth detector area 12D to differ in size from the first detector area 12A and/or the second detector area 12B and/or the third detector area 12C. By way of example, the fourth detector area 12D is smaller than the third detector area 12C. The third detector area 12C is for example smaller than the second detector area 12B. The second detector area 12B is for example smaller than the first detector area 12A. By way of example, the first detector area 12A is two times, three times, or four times larger than the second detector area 12B. Further, the second detector area 12B is for example two times, three times, or four times larger than the third detector area 12C. Moreover, the third detector area 12C is for example two times, three times, or four times larger than the fourth detector area 12D. This exemplary embodiment of the digital long-range optical apparatus 1 is advantageous in that a first image generated by the first detector 8A, a second image generated by the second detector 8B, a third image generated by the third detector 8C, and a fourth image generated by the fourth detector 8D are based on differently sized fields of view. As a result, it is possible to provide digital zooming within the scope of the digital long-range optical apparatus 1, and generate different zoom images with different zoom levels. For example, the first image is based on a first field of view and shows a first image portion of the object 2, which corresponds to an image at a first zoom level. Further, for example, the second image is based on a second field of view and shows a second image portion of the object 2, which corresponds to an image at a second zoom level. Moreover, the third image is based on a third field of view and shows a third image portion of the object 2, which corresponds to an image at a third zoom level. The fourth image is based on a fourth field of view and shows a fourth image portion of the object 2, which corresponds to an image at a fourth zoom level. It is advantageous that the resolution of the images remains the same for all zoom levels if the resolution of the detectors is the same. By contrast, in the case of a digital zoom known from the prior art, the resolution reduces as the zooming increases.

Figure 10:
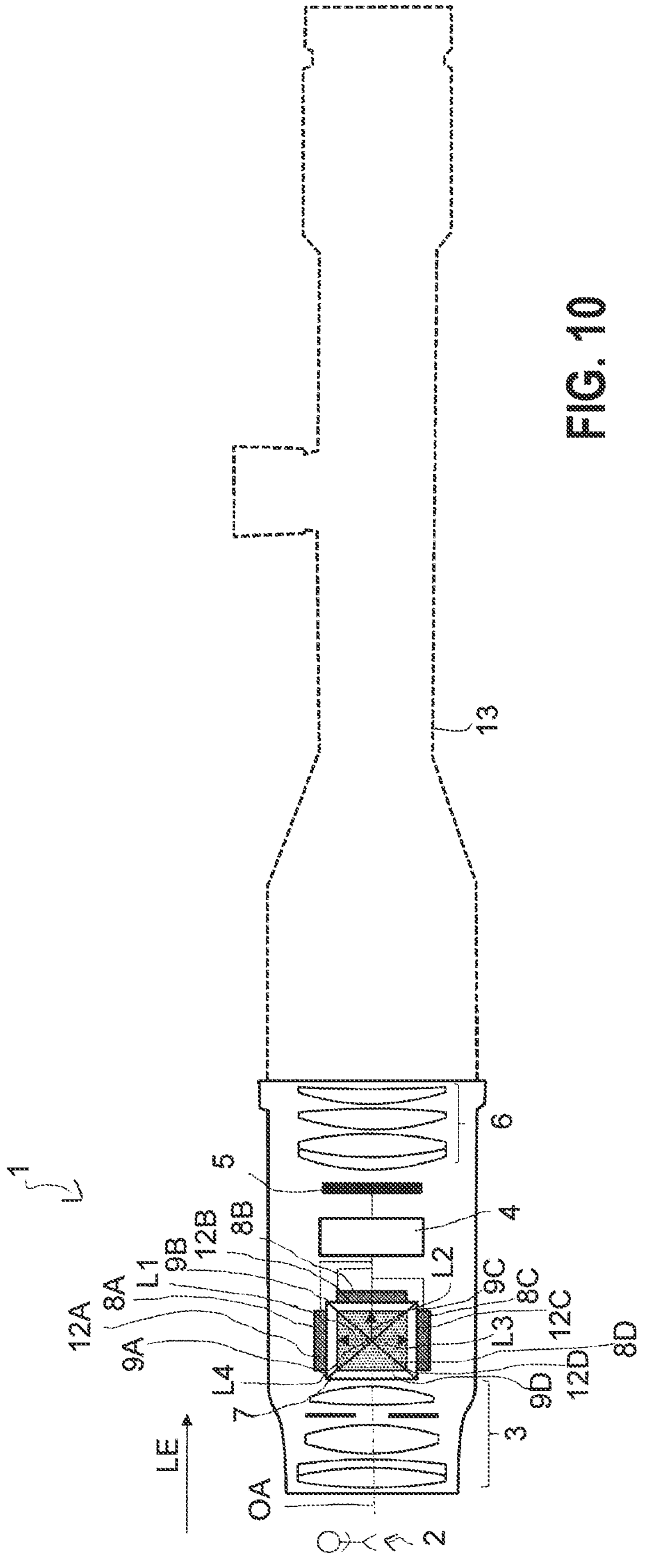
FIG. 10 shows a seventh exemplary embodiment of a digital long-range optical apparatus.

FIG. 10 shows a further exemplary embodiment of a digital long-range optical apparatus 1 according to the disclosure for imaging an object 2. The further exemplary embodiment of FIG. 10 is based on the exemplary embodiment of FIG. 8. Therefore, reference is made to all the explanations provided hereinbefore, which also apply here. Identical components are provided with the same reference signs. FIG. 10 shows the exemplary embodiment of the digital long-range optical apparatus 1 in the form of an attachment apparatus for an analog observation apparatus 13.

Figure 11:
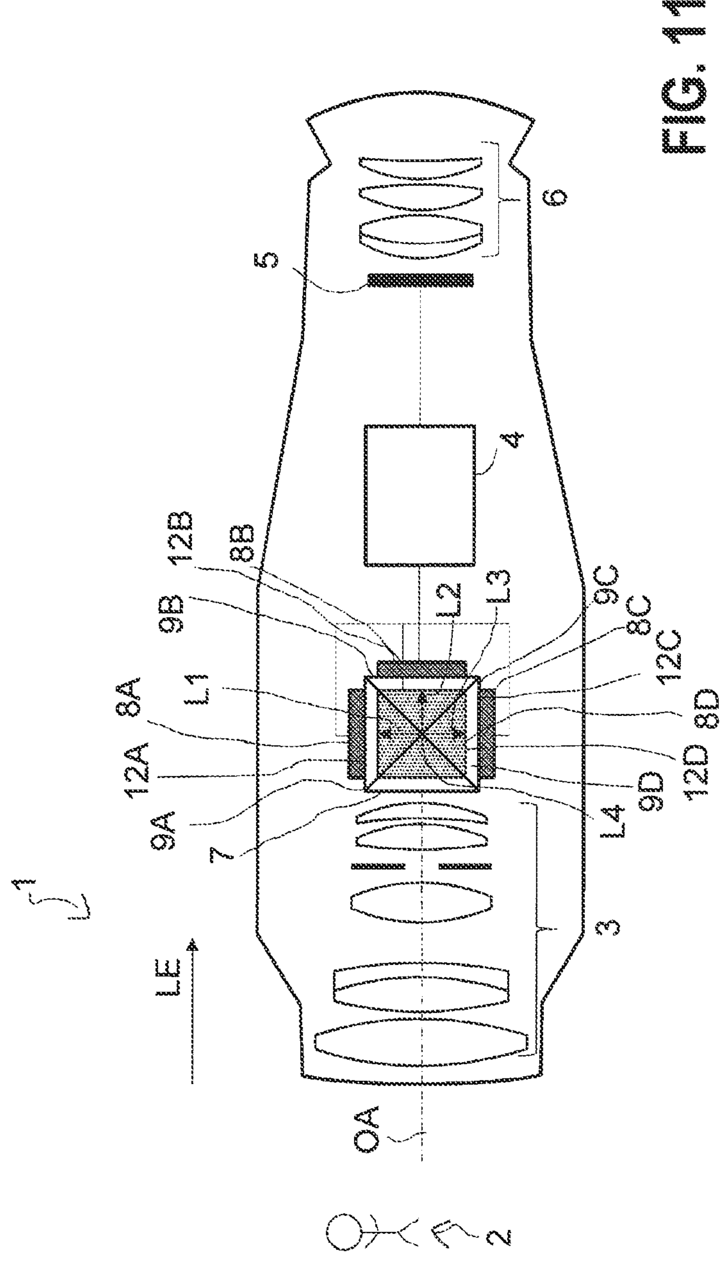
FIG. 11 shows an eighth exemplary embodiment of a digital long-range optical apparatus.

FIG. 11 shows a further exemplary embodiment of a digital long-range optical apparatus 1 according to the disclosure for imaging an object 2. The further exemplary embodiment of FIG. 11 is based on the exemplary embodiment of FIG. 8. Therefore, reference is made to all the explanations provided hereinbefore, which also apply here. Identical components are provided with the same reference signs. FIG. 11 shows the exemplary embodiment of the digital long-range optical apparatus 1 in the form of a single channel, hand-held observation apparatus.

Figure 12:
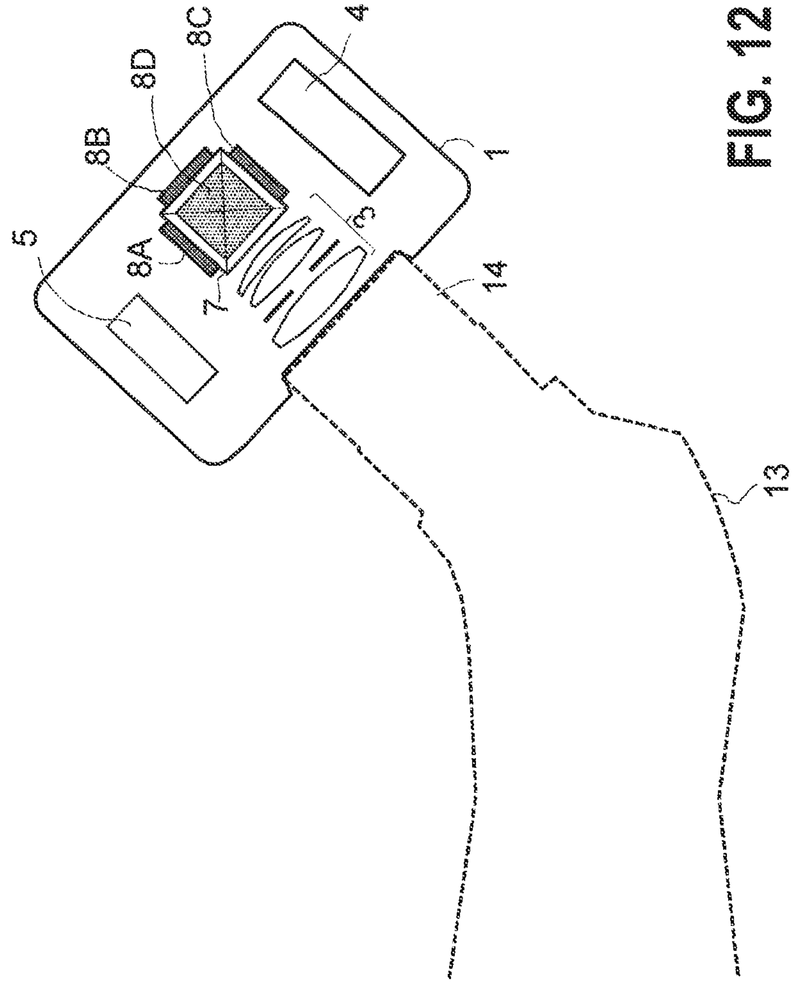
FIG. 12 shows a ninth exemplary embodiment of a digital long-range optical apparatus.

FIG. 12 shows a further exemplary embodiment of a digital long-range optical apparatus 1 according to the disclosure for imaging an object 2. The further exemplary embodiment of FIG. 12 is based on the exemplary embodiment of FIG. 8. Therefore, reference is made to all the explanations provided hereinbefore, which also apply here. Identical components are provided with the same reference signs. FIG. 12 shows the exemplary embodiment of the digital long-range optical apparatus 1 in the form of a plug-on device for an analog observation apparatus 13. The digital long-range optical apparatus 1 is arranged at an eyepiece 14 of the analog observation apparatus 13. Consequently, the available opening is defined by the exit pupil of the eyepiece 14 of the analog observation apparatus 13. The optimal size of the detector areas 12A, 12B, 12C, and 12D of the detectors 8A, 8B, 8C, and 8D is defined thereby. A greater size of the detector areas 12A to 12D would not collect more light since the available opening cannot be enlarged in this embodiment.

Figure 13:
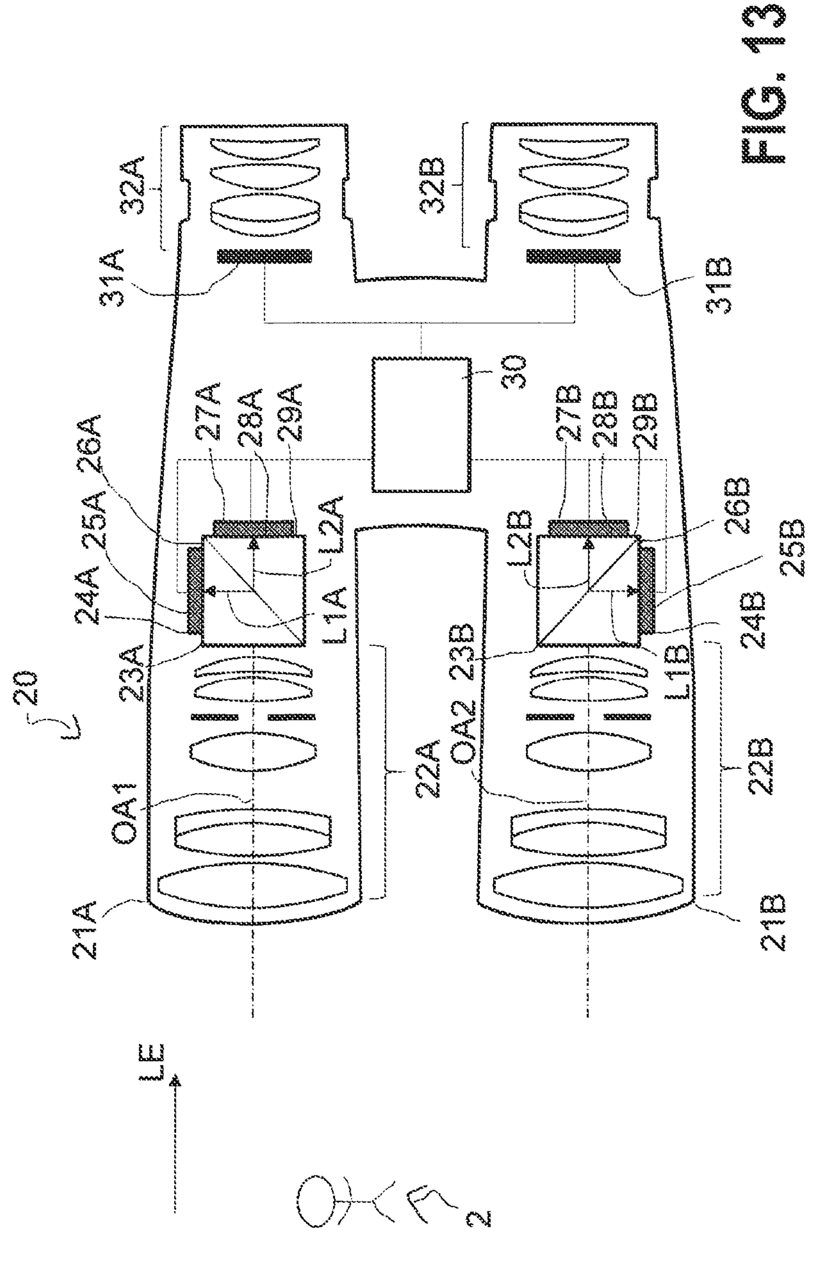
FIG. 13 shows a tenth exemplary embodiment of a digital long-range optical apparatus.

FIG. 13 shows an exemplary embodiment of a digital long-range optical apparatus 20 according to the disclosure for imaging an object 2. FIG. 13 shows the exemplary embodiment of the digital long-range optical apparatus 20 in the form of a binocular system, for example in the form of field glasses. The digital long-range optical system 20 includes a first observation channel 21A and a second observation channel 21B.

The first observation channel 21A includes a first optical axis OA1 and a first lens 22A for imaging an object 2, with the first lens 22A being arranged along the first optical axis OA1. For example, the first lens 22A includes at least one lens element. In particular, provision is made for the first lens 22A to include a plurality of lens elements and/or a plurality of optical units, for example lens element groups. In this case, a lens element group is understood to mean an optical unit including at least one lens element or a plurality of lens elements.

The second observation channel 21B includes a second optical axis OA2 and a second lens 22B for imaging the object 2, with the second lens 22B being arranged along the second optical axis OA2. For example, the second lens 22B includes at least one lens element. In particular, provision is made for the second lens 22B to include a plurality of lens elements and/or a plurality of optical units, for example lens element groups. In this case, a lens element group is understood to mean an optical unit including at least one lens element or a plurality of lens elements.

Moreover, the digital long-range optical apparatus 20 in accordance with FIG. 13 is provided with a processor unit 30, with a first display unit 31A for displaying an image of the object 2 for the first observation channel 21A, and with a second display unit 31B for displaying an image of the object 2 for the second observation channel 21B. The processor unit 30 is line-connected to the first display unit 31A. Accordingly, signals are transmittable from the processor unit 30 to the first display unit 31A and/or from the first display unit 31A to the processor unit 30. Further, the processor unit 30 is line-connected to the second display unit 31B. Accordingly, signals are transmittable from the processor unit 30 to the second display unit 31B and/or from the second display unit 31B to the processor unit 30.

The first display unit 31A is in the form of a digital display unit. In particular, the first display unit 31A can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

The second display unit 31B is in the form of a digital display unit. In particular, the second display unit 31B can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

In the exemplary embodiment of the digital long-range optical apparatus 20 in accordance with FIG. 13, the image of the object 2 displayed on the first display unit 31A is observed using a first eyepiece 32A of the first observation channel 21A. For example, the first eyepiece 32A includes at least one lens element. In particular, provision is made for the first eyepiece 32A to include a plurality of lens elements and/or a plurality of optical units, for example lens element groups. In this case, a lens element group is understood to mean an optical unit including at least one lens element or a plurality of lens elements.

In the exemplary embodiment of the digital long-range optical apparatus 20 in accordance with FIG. 13, the image of the object 2 displayed on the second display unit 31B is observed with a second eyepiece 32B of the second observation channel 21B. For example, the second eyepiece 32B includes at least one lens element. In particular, provision is made for the second eyepiece 32B to include a plurality of lens elements and/or a plurality of optical units, for example lens element groups. In this case, a lens element group is understood to mean an optical unit including at least one lens element or a plurality of lens elements.

Further, the digital long-range optical apparatus 20 in accordance with FIG. 13 includes a first beam splitter unit 23A of the first observation channel 21A. The first lens 22A is arranged first along the first optical axis OA1 in a direction of light incidence LE, followed by the first beam splitter unit 23A. Moreover, the first observation channel 21A in accordance with FIG. 13 includes a first detector 24A and a second detector 27A. The processor unit 30 is line-connected to both the first detector 24A of the first observation channel 21A and the second detector 27A of the first observation channel 21A. Accordingly, signals are transmittable from the processor unit 30 to the first detector 24A of the first observation channel 21A and/or from the first detector 24A of the first observation channel 21A to the processor unit 30. Further, signals are transmittable from the processor unit 30 to the second detector 27A of the first observation channel 21A and/or from the second detector 27A of the first observation channel 21A to the processor unit 30. The first detector 24A of the first observation channel 21A is configured to detect first light L1A generated by the first beam splitter unit 23A. Expressed in other words, the first detector 24A of the first observation channel 21A detects first light L1A which is generated by the first beam splitter unit 23A by the incidence of light incident on the first beam splitter unit 23A. The second detector 27A of the first observation channel 21A is configured to detect second light L2A generated by the first beam splitter unit 23A. Expressed in other words, the second detector 27A detects second light L2A which is generated by the first beam splitter unit 23A by the incidence of light incident on the first beam splitter unit 23A.

By way of example, the first detector 24A of the first observation channel 21A and/or the second detector 27A of the first observation channel 21A are/is in the form of a CCD detector or CMOS detector. However, the disclosure is not restricted to the aforementioned exemplary embodiments. Rather, the first detector 24A of the first observation channel 21A and/or the second detector 27A of the first observation channel 21A can be any detector suitable for the disclosure. By way of example, at least one of two detectors 24A and 27A of the first observation channel 21A is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The processor unit 30 is additionally in the form of for example a control unit and/or supply unit, which controls the first display unit 31A of the first observation channel 21A, the first detector 24A of the first observation channel 21A, and/or the second detector 27A of the first observation channel 21A and/or which supplies these/this with voltage.

In the case of the digital long-range optical apparatus 20 in accordance with FIG. 13, the first detector 24A of the first observation channel 21A and the second detector 27A of the first observation channel 21A are arranged at the first beam splitter unit 23A. The first beam splitter unit 23A includes a first beam splitter face 26A, at which the first detector 24A of the first observation channel 21A is arranged. Further, the first beam splitter unit 23A includes a second beam splitter face 29A, at which the second detector 27A of the first observation channel 21A is arranged. In a further exemplary embodiment of the digital long-range optical apparatus 20, provision is additionally or alternatively made for a first optical device (not illustrated) to be arranged between the first beam splitter unit 23A and the first detector 24A of the first observation channel 21A. The first optical device guides the first light L1A from the first beam splitter unit 23A to the first detector 24A of the first observation channel 21A. Additionally or as an alternative thereto, provision is made in this exemplary embodiment for a second optical device (not illustrated) to be arranged between the first beam splitter unit 23A and the second detector 27A of the first observation channel 21A. The second optical device guides the second light L2A from the first beam splitter unit 23A to the second detector 27A of the first observation channel 21A.

For example, the first beam splitter face 26A of the first beam splitter unit 23A and the second beam splitter face 29A of the first beam splitter unit 23A are arranged with respect to one another at an angle of between 0° and 180°, with the interval boundaries being included. Additionally or as an alternative thereto, the first beam splitter face 26A of the first beam splitter unit 23A and the second beam splitter face 29A of the first beam splitter unit 23A are arranged at a distance from one another. In particular, provision is made for the first beam splitter face 26A of the first beam splitter unit 23A and the second beam splitter face 29A of the first beam splitter unit 23A to be arranged parallel to one another. For example, provision is made for the aforementioned beam splitter faces 26A and 29A of the first beam splitter unit 23A to be arranged relative to one another in the style of a cube. Expressed in other words, the aforementioned faces 26A and 29A of the first beam splitter unit 23A are for example arranged with respect to one another at an angle of 90° or substantially 90°.

By way of example, the first detector 24A of the first observation channel 21A includes a sensitive first detector area 25A. The pixels of the first detector 24A of the first observation channel 21A which detect the first light L1A are arranged at the first detector area 25A. The first detector area 25A is not necessarily the entire detector area where pixels of the first detector 24A of the first observation channel 21A which detect the first light L1A are arranged. Rather, an exemplary embodiment of the digital long-range optical apparatus 20 provides for the first detector area 25A to be a partial area of the entire detector area of the first detector 24A of the first observation channel 21A. By way of example, provision is made for the processor unit 30 to be used to control the first detector 24A of the first observation channel 21A in such a way that a selectable first detector area 25A is switched to be sensitive for the detection of first light L1A. Further, additional provision is made for the second detector 27A of the first observation channel 21A to include a sensitive second detector area 28A. The pixels of the second detector 27A of the first observation channel 21A which detect the second light L2A are arranged at the second detector area 28A. The second detector area 28A is not necessarily the entire detector area where pixels of the second detector 27A of the first observation channel 21A which detect the second light L2A are arranged. Rather, an exemplary embodiment of the digital long-range optical apparatus 20 provides for the second detector area 28A to be a partial area of the entire detector area of the second detector 27A of the first observation channel 21A. By way of example, provision is made for the processor unit 30 to be used to control the second detector 27A of the first observation channel 21A in such a way that a selectable second detector area 28A is switched to be sensitive for the detection of second light L2A.

Light emanating from the object 2 enters the first lens 22A in the direction of the light incidence LE and is incident on the first beam splitter unit 23A. The first beam splitter unit 23A serves to split the light into the first light L1A and into the second light L2A. Expressed in other words, the first beam splitter unit 23A serves to split the light into two components.

The first light L1A includes one of the following features: (i) light at only a single first wavelength, (ii) light from a first wavelength range, or (iii) a specifiable first intensity. Reference is made to the explanations provided hereinbefore in respect of the definition of the terms of single wavelength and wavelength range. These also apply here. The single first wavelength may for example be a wavelength from the visible or invisible wavelength range. In particular, provision is made for the light at the first wavelength to be a red light, a green light, or a blue light. For example, the first wavelength range can be the wavelength range of the visible light, of the infrared range, of the near-infrared range, or of the short-wavelength infrared light. The exemplary embodiment of the first wavelength range in the form of the near-infrared range or the short-wavelength infrared light is advantageous, especially when observing an object 2 in twilight or low-light weather conditions. The first intensity of the first light L1A can be any selectable intensity, for example a percentage of the light incident in the first beam splitter unit 23A from the first lens 22A. For example, the first intensity of the first light L1A, and hence the percentage, is 10%, 20%, 30%, 40%, 50%, 60%, 70%, 80%, or 90% of the light incident in the first beam splitter unit 23A from the first lens 22A.

In the digital long-range optical apparatus 20 in accordance with FIG. 13, the second light L2A includes one of the following features: (i) light at only a single second wavelength, (ii) light from a second wavelength range, or (iii) a specifiable second intensity. Reference is made to the explanations provided hereinbefore in respect of the definition of the terms of single wavelength and wavelength range. These also apply here. The single second wavelength may for example be a wavelength from the visible or invisible wavelength range. In particular, provision is made for the light at the second wavelength to be a red light, a green light, or a blue light. For example, the second wavelength range can be the wavelength range of the visible light, of the infrared range, of the near-infrared range, or of the short-wavelength infrared light. The exemplary embodiment of the second wavelength range in the form of the near-infrared range or the short-wavelength infrared light is advantageous, especially when observing an object 2 in twilight or low-light weather conditions. The second intensity of the second light L2A can be any selectable intensity, for example, depending on the percentage of the first intensity of the first light L1A, a percentage of the light incident in the first beam splitter unit 23A from the first lens 22A. For example, the second intensity of the second light L2A, and hence the percentage, is 10%, 20%, 30%, 40%, 50%, 60%, 70%, 80%, or 90% of the light incident in the first beam splitter unit 23A from the first lens 22A, depending on the percentage of the first intensity of the first light L1A. For example, the percentage of the first intensity of the first light L1A is 20% and the percentage of the second intensity of the second light L2A is 80%.

Further, the digital long-range optical apparatus 20 in accordance with FIG. 13 includes a second beam splitter unit 23B of the second observation channel 21B. The second lens 22B is arranged first along the second optical axis OA2 in the direction of light incidence LE, followed by the second beam splitter unit 23B. Moreover, the second observation channel 21B in accordance with FIG. 13 includes a first detector 24B and a second detector 27B. The processor unit 30 is line-connected to both the first detector 24B of the second observation channel 21B and the second detector 27B of the second observation channel 21B. Accordingly, signals are transmittable from the processor unit 30 to the first detector 24B of the second observation channel 21B and/or from the first detector 24B of the second observation channel 21B to the processor unit 30. Further, signals are transmittable from the processor unit 30 to the second detector 27B of the second observation channel 21B and/or from the second detector 27B of the second observation channel 21B to the processor unit 30. The first detector 24B of the second observation channel 21B is configured to detect first light L1B generated by the second beam splitter unit 23B. Expressed in other words, the first detector 24B of the second observation channel 21B detects first light L1B which is generated by the second beam splitter unit 23B by the incidence of light incident on the second beam splitter unit 23B. The second detector 27B of the second observation channel 21B is configured to detect second light L2B generated by the second beam splitter unit 23B. Expressed in other words, the second detector 27B of the second observation channel 21B detects second light L2B which is generated by the second beam splitter unit 23B by the incidence of light incident on the second beam splitter unit 23B.

By way of example, the first detector 24B of the second observation channel 21B and/or the second detector 27B of the second observation channel 21B are/is in the form of a CCD detector or CMOS detector. However, the disclosure is not restricted to the aforementioned exemplary embodiments. Rather, the first detector 24B of the second observation channel 21B and/or the second detector 27B of the second observation channel 21B can be any detector suitable for the disclosure. By way of example, at least one of two detectors 24B and 27B of the second observation channel 21B is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The processor unit 30 is additionally in the form of for example a control unit and/or supply unit, which controls the second display unit 31B of the second observation channel 21B, the first detector 24B of the second observation channel 21B, and/or the second detector 27B of the second observation channel 21B and/or which supplies these/this with voltage.

In the case of the digital long-range optical apparatus 20 in accordance with FIG. 13, the first detector 24B of the second observation channel 21B and the second detector 27B of the second observation channel 21B are arranged at the second beam splitter unit 23B. The second beam splitter unit 23B includes a first beam splitter face 26B, at which the first detector 24B of the second observation channel 21B is arranged. Further, the second beam splitter unit 23B includes a second beam splitter face 29B, at which the second detector 27B of the second observation channel 21B is arranged. In a further exemplary embodiment of the digital long-range optical apparatus 20, provision is additionally or alternatively made for a first optical device (not illustrated) to be arranged between the second beam splitter unit 23B and the first detector 24B of the second observation channel 21B. The first optical device guides the first light L1B from the second beam splitter unit 23B to the first detector 24B of the second observation channel 21B. Additionally or as an alternative thereto, provision is made in this exemplary embodiment for a second optical device (not illustrated) to be arranged between the second beam splitter unit 23B and the second detector 27B of the second observation channel 21B. The second optical device guides the second light L2B from the second beam splitter unit 23B to the second detector 27B of the second observation channel 21B.

For example, the first beam splitter face 26B of the second beam splitter unit 23B and the second beam splitter face 29B of the second beam splitter unit 23B are arranged with respect to one another at an angle of between 0° and 180°, with the interval boundaries being included. Additionally or as an alternative thereto, the first beam splitter face 26B of the second beam splitter unit 23B and the second beam splitter face 29B of the second beam splitter unit 23B are arranged at a distance from one another. In particular, provision is made for the first beam splitter face 26B of the second beam splitter unit 23B and the second beam splitter face 29B of the second beam splitter unit 23B to be arranged parallel to one another. For example, provision is made for the aforementioned beam splitter faces 26B and 29B of the second beam splitter unit 23B to be arranged relative to one another in the style of a cube. Expressed in other words, the aforementioned faces 26B and 29B of the second beam splitter unit 23B are for example arranged with respect to one another at an angle of 90° or substantially 90°.

By way of example, the first detector 24B of the second observation channel 21B includes a sensitive first detector area 25B. The pixels of the first detector 24B of the second observation channel 21B which detect the first light L1B are arranged at the first detector area 25B. The first detector area 25B is not necessarily the entire detector area where pixels of the first detector 24B of the second observation channel 21B which detect the first light L1B are arranged. Rather, an embodiment of the digital long-range optical apparatus 20 provides for the first detector area 25B to be a partial area of the entire detector area of the first detector 24B of the second observation channel 21B. By way of example, provision is made for the processor unit 30 to be used to control the first detector 24B of the second observation channel 21B in such a way that a selectable first detector area 25B is switched to be sensitive for the detection of first light L1B. Further, additional provision is made for the second detector 27B of the second observation channel 21B to include a sensitive second detector area 28B. The pixels of the second detector 27B of the second observation channel 21B which detect the second light L2B are arranged at the second detector area 28B. The second detector area 28B is not necessarily the entire detector area where pixels of the second detector 27B of the second observation channel 21B which detect the second light L2B are arranged. Rather, an embodiment of the digital long-range optical apparatus 20 provides for the second detector area 28B to be a partial area of the entire detector area of the second detector 27B of the second observation channel 21B. By way of example, provision is made for the processor unit 30 to be used to control the second detector 27B of the second observation channel 21B in such a way that a selectable second detector area 28B is switched to be sensitive for the detection of second light L2B.

Light emanating from the object 2 enters the second lens 22B in the direction of the light incidence LE and is incident on the second beam splitter unit 23B. The second beam splitter unit 23B serves to split the light into the first light L1B and into the second light L2B. Expressed in other words, the second beam splitter unit 23B serves to split the light into two components.

The first light L1B includes one of the following features: (i) light at only a single third wavelength, (ii) light from a third wavelength range, or (iii) a specifiable third intensity. Reference is made to the explanations provided hereinbefore in respect of the definition of the terms of single wavelength and wavelength range. These also apply here. The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing the object 2 in twilight or low-light weather conditions. The third intensity of the first light L1B can be any selectable intensity, for example a percentage of the light incident in the second beam splitter unit 23B from the second lens 22B. For example, the third intensity of the first light L1B, and hence the percentage, is 10%, 20%, 30%, 40%, 50%, 60%, 70%, 80%, or 90% of the light incident in the second beam splitter unit 23B from the second lens 22B.

In the digital long-range optical apparatus 20 in accordance with FIG. 13, the second light L2B includes one of the following features: (i) light at only a single fourth wavelength, (ii) light from a fourth wavelength range, or (iii) a specifiable fourth intensity. Reference is made to the explanations provided hereinbefore in respect of the definition of the terms of single wavelength and wavelength range. These also apply here. The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing an object 2 in twilight or low-light weather conditions. The fourth intensity of the second light L2B can be any selectable intensity, for example, depending on the percentage of the third intensity of the first light L1B, a percentage of the light incident in the second beam splitter unit 23B from the second lens 22B. For example, the fourth intensity of the second light L2B, and hence the percentage, is 10%, 20%, 30%, 40%, 50%, 60%, 70%, 80%, or 90% of the light incident in the second beam splitter unit 23B from the second lens 22B, depending on the percentage of the third intensity of the first light L1B. For example, the percentage of the third intensity of the first light L1B is 20% and the percentage of the fourth intensity of the second light L2B is 80%.

In a further exemplary embodiment of the digital long-range optical apparatus 20 in accordance with FIG. 13, the first detector area 25B and the second detector area 28B in the second observation channel 21B have a relative arrangement as described in relation to FIGS. 3 and 4. Therefore, reference is made to the aforementioned explanations, which also apply here. If the first detector area 25B of the first detector 24B of the second observation channel 21B and the second detector area 28B of the second detector 27B of the second observation channel 21B were to be arranged relative to one another in one plane, then the aforementioned detector areas would be arranged offset from one another, with the result that the first detector area 25B and the second detector area 28B do not record exactly the same image of the object 2 but record different image portions of the object 2. This exemplary embodiment consequently ensures that the first detector area 25B and the second detector area 28B do not record exactly the same image of the object 2 but instead record different image portions of the object 2. As a result, it is possible to calculate and present a super-resolution image of the object 2 using known super-resolution algorithms (which are used for super-resolution imaging).

Different detectors and/or a different number of detectors may be arranged at the first beam splitter unit 23A and the second beam splitter unit 23B. A few exemplary embodiments are discussed in more detail hereinafter.

Figure 14:
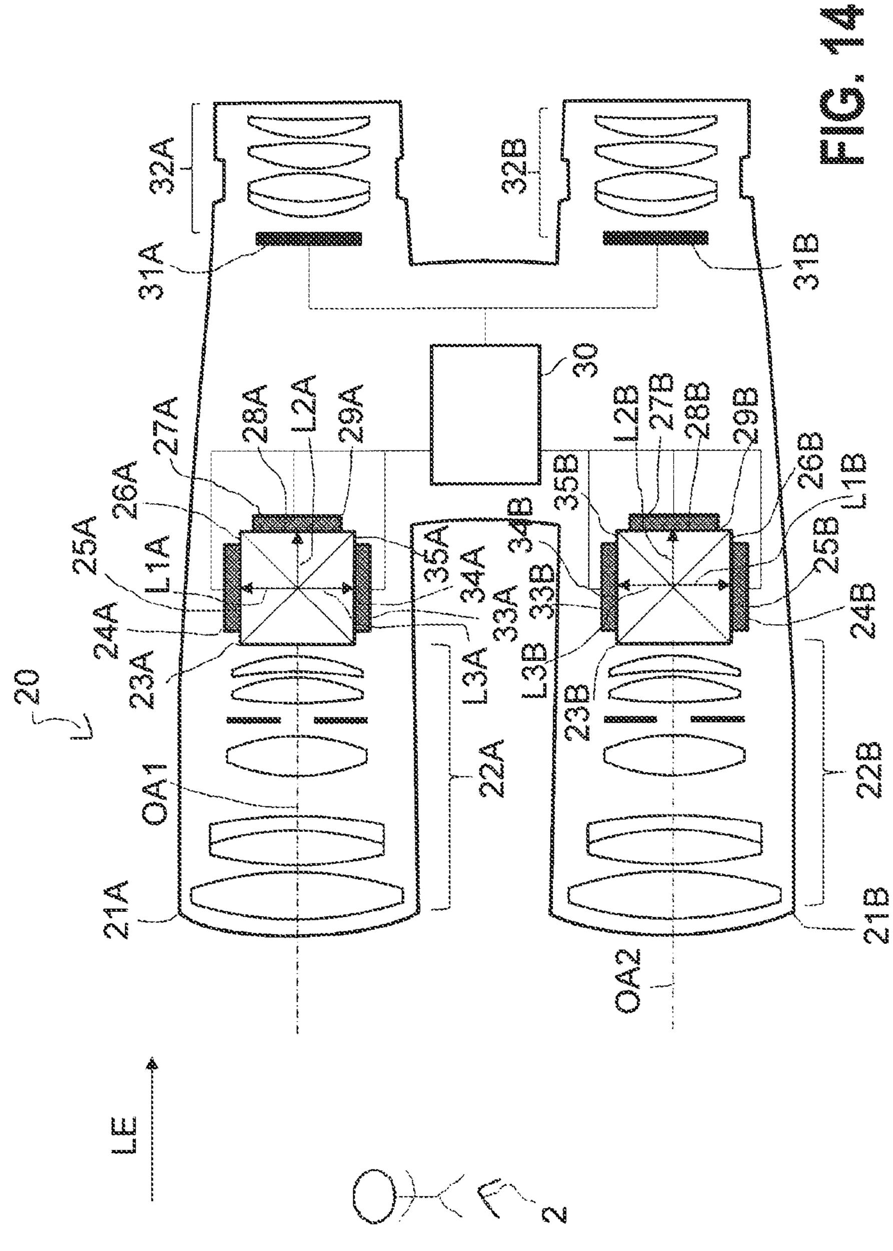
FIG. 14 shows an eleventh exemplary embodiment of a digital long-range optical apparatus.

FIG. 14 shows a further exemplary embodiment of a digital long-range optical apparatus 20 according to the disclosure for imaging an object 2. The further exemplary embodiment of FIG. 14 is based on the embodiment of FIG. 13. Therefore, reference is made to all the explanations provided hereinbefore, which also apply here. Identical components are provided with identical reference signs. In contrast to the exemplary embodiment of FIG. 13, the exemplary embodiment of FIG. 14 provides for the digital long-range optical apparatus 20 to additionally include a third detector 33A of the first observation channel 21A. The processor unit 30 is line-connected to the third detector 33A of the first observation channel 21A. Accordingly, signals are transmittable from the processor unit 30 to the third detector 33A of the first observation channel 21A and/or from the third detector 33A of the first observation channel 21A to the processor unit 30. The third detector 33A is configured to detect third light L3A generated by the first beam splitter unit 23A.

As specified above, the first detector 24A of the first observation channel 21A and/or the second detector 27A of the first observation channel 21A are/is in the form of a CCD detector or CMOS detector, for example. By way of example, the third detector 33A of the first observation channel 21A is also in the form of a CCD detector or CMOS detector. However, the disclosure is not restricted to the aforementioned exemplary embodiments. Rather, the first detector 24A of the first observation channel 21A and/or the second detector 27A of the first observation channel 21A and/or the third detector 33A of the first observation channel 21A can be any detector suitable for the disclosure. By way of example, at least one of the detectors 24A, 27A, and 33A is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The third detector 33A of the first observation channel 21A is arranged at the first beam splitter unit 23A. The first beam splitter unit 23A includes a third beam splitter face 35A, at which the third detector 33A of the first observation channel 21A is arranged. In a further exemplary embodiment of the digital long-range optical apparatus 20, provision is additionally or alternatively made for a third optical device (not illustrated) to be arranged between the first beam splitter unit 23A and the third detector 33A of the first observation channel 21A. The third optical device guides the third light L3A from the first beam splitter unit 23A to the third detector 33A of the first observation channel 21A.

For example, at least two of the faces or each of the faces of the first beam splitter face 26A of the first beam splitter unit 23A, the second beam splitter face 29A of the first beam splitter unit 23A, and the third beam splitter face 35A of the first beam splitter unit 23A are arranged with respect to one another at an angle of between 0° and 180°, with the interval boundaries being included. Additionally or as an alternative thereto, at least two faces of the first beam splitter face 26A of the first beam splitter unit 23A, the second beam splitter face 29A of the first beam splitter unit 23A, and the third beam splitter face 35A of the first beam splitter unit 23A are arranged at a distance from one another. In particular, provision is made for at least two of the aforementioned faces 26A, 29A, and 35A of the first beam splitter unit 23A to be arranged parallel to one another. For example, provision is made for the aforementioned beam splitter faces 26A, 29A, and 35A of the first beam splitter unit 23A to be arranged relative to one another in the style of a cube. Expressed in other words, respectively two of the aforementioned faces 26A, 29A, and 35A of the first beam splitter unit 23A are for example arranged with respect to one another at an angle of 90° or substantially 90°.

The third light L3A includes one of the following features: (i) light at only a single fifth wavelength, (ii) light from a fifth wavelength range, or (iii) a specifiable fifth intensity. Reference is made to the explanations provided hereinbefore in respect of the definition of the terms of single wavelength and wavelength range. These also apply here. The single fifth wavelength may for example be a wavelength from the visible or invisible wavelength range.

In particular, provision is made for the light at the fifth wavelength to be a red light, a green light, or a blue light. For example, the fifth wavelength range can be the wavelength range of the visible light, of the infrared range, of the near-infrared range, or of the short-wavelength infrared light. The exemplary embodiment of the fifth wavelength range in the form of the near-infrared range or the short-wavelength infrared light is advantageous, especially when observing the object 2 in twilight or low-light weather conditions. The fifth intensity of the third light L3A can be any selectable intensity, for example, depending on the percentage of the first intensity of the first light L1A and/or the second intensity of the second light L2A, a percentage of the light incident in the first beam splitter unit 23A from the first lens 22A. For example, the fifth intensity of the third light L3A, and hence the percentage, is 10%, 20%, 30%, 40%, 50%, 60%, 70%, 80%, or 90% of the light incident in the first beam splitter unit 23A from the first lens 22A, depending on the percentage of the first intensity of the first light L1A and/or the second intensity of the second light L2A. For example, the percentage of the first intensity of the first light L1A is 20%, the percentage of the second intensity of the second light L2A is 50%, and the percentage of the fifth intensity of the third light L3A is 30%.

By way of example, the first light L1A includes only a single wavelength of the red light. Further, the second light L2A includes only a single wavelength of the green light, for example. The third light L3A for example includes only a single wavelength of the blue light. As an alternative thereto, provision is for example made for the first light L1A to include one wavelength or a plurality of wavelengths from the wavelength range of the red light. Further, provision is for example made for the second light L2A to contain one wavelength or a plurality of wavelengths from the wavelength range of the green light. Moreover, provision is for example made for the third light L3A to contain one wavelength or a plurality of wavelengths from the wavelength range of the blue light.

The third detector 33A of the first observation channel 21A includes a sensitive third detector area 34A. The pixels of the third detector 33A of the first observation channel 21A which detect the third light L3A are arranged at the third detector area 34A. The third detector area 34A of the first observation channel 21A is not necessarily the entire detector area where pixels of the third detector 33A of the first observation channel 21A which detect the third light L3A are arranged. Rather, an exemplary embodiment of the digital long-range optical apparatus 20 provides for the third detector area 34A to be a partial area of the entire detector area of the third detector 33A of the first observation channel 21A. By way of example, provision is made for the processor unit 30 to be used to control the third detector 33A of the first observation channel 21A in such a way that a selectable third detector area 34A is switched to be sensitive for the detection of third light L3A.

In a further exemplary embodiment of the digital long-range optical apparatus 20 in accordance with FIG. 14, the first detector area 25A, the second detector area 28A, and the third detector area 34A have a relative arrangement as described in relation to FIGS. 3 and 4. Reference is made to the explanations given hereinbefore. These also apply here. If the first detector area 25A, the second detector area 28A, and the third detector area 34A were to be arranged relative to one another in one plane, then the aforementioned detector areas would be arranged offset from one another, with the result that the first detector area 25A, the second detector area 28A, and the third detector area 34A do not record exactly the same image of the object 2 but record different image portions of the object 2. This exemplary embodiment consequently ensures that the first detector area 25A, the second detector area 28A, and the third detector area 34A do not record exactly the same image of the object 2 but instead record different image portions of the object 2. As a result, it is possible to calculate and present a super-resolution image of the object 2 using known super-resolution algorithms (which are used for super-resolution imaging).

Further, in contrast to the exemplary embodiment of FIG. 13, the exemplary embodiment of FIG. 14 provides for the digital long-range optical apparatus 20 to additionally include a third detector 33B of the second observation channel 21B. The processor unit 30 is line-connected to the third detector 33B of the second observation channel 21B. Accordingly, signals are transmittable from the processor unit 30 to the third detector 33B of the second observation channel 21B and/or from the third detector 33B of the second observation channel 21B to the processor unit 30. The third detector 33B is configured to detect third light L3B generated by the second beam splitter unit 23B.

As specified above, the first detector 24B of the second observation channel 21B and/or the second detector 27B of the second observation channel 21B are/is in the form of a CCD detector or CMOS detector, for example. By way of example, the third detector 33B of the second observation channel 21B is also in the form of a CCD detector or CMOS detector. However, the disclosure is not restricted to the aforementioned exemplary embodiments. Rather, the first detector 24B of the second observation channel 21B and/or the second detector 27B of the second observation channel 21B and/or the third detector 33B of the second observation channel 21B can be any detector suitable for the disclosure. By way of example, at least one of the detectors 24B, 27B, and 33B is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The third detector 33B of the second observation channel 21B is arranged at the second beam splitter unit 23B. The second beam splitter unit 23B includes a third beam splitter face 35B, at which the third detector 33B of the second observation channel 21B is arranged. In a further exemplary embodiment of the digital long-range optical apparatus 20, provision is additionally or alternatively made for a third optical device (not illustrated) to be arranged between the second beam splitter unit 23B and the third detector 33B of the second observation channel 21B. The third optical device guides the third light L3B from the second beam splitter unit 23B to the third detector 33B of the second observation channel 21B.

For example, at least two of the faces or each of the faces of the first beam splitter face 26B of the second beam splitter unit 23B, the second beam splitter face 29B of the second beam splitter unit 23B, and the third beam splitter face 35B of the second beam splitter unit 23B are arranged with respect to one another at an angle of between 0° and 180°, with the interval boundaries being included. Additionally or as an alternative thereto, at least two faces of the first beam splitter face 26B of the second beam splitter unit 23B, the second beam splitter face 29B of the second beam splitter unit 23B, and the third beam splitter face 35B of the second beam splitter unit 23B are arranged at a distance from one another. In particular, provision is made for at least two of the aforementioned faces 26B, 29B, and 35B of the second beam splitter unit 23B to be arranged parallel to one another. For example, provision is made for the aforementioned beam splitter faces 26B, 29B, and 35B of the second beam splitter unit 23B to be arranged relative to one another in the style of a cube. Expressed in other words, respectively two of the aforementioned faces 26B, 29B, and 35B of the second beam splitter unit 23B are for example arranged with respect to one another at an angle of 90° or substantially 90°.

The third light L3B includes one of the following features: (i) light at only a single sixth wavelength, (ii) light from a sixth wavelength range, or (iii) a specifiable sixth intensity. Reference is made to the explanations provided hereinbefore in respect of the definition of the terms of single wavelength and wavelength range. These also apply here. The single sixth wavelength may for example be a wavelength from the visible or invisible wavelength range. In particular, provision is made for the light at the sixth wavelength to be a red light, a green light, or a blue light. For example, the sixth wavelength range can be the wavelength range of the visible light, of the infrared range, of the near-infrared range, or of the short-wavelength infrared light. The exemplary embodiment of the sixth wavelength range in the form of the near-infrared range or the short-wavelength infrared light is advantageous, especially when observing the object 2 in twilight or low-light weather conditions. The sixth intensity of the third light L3B can be any selectable intensity, for example, depending on the percentage of the third intensity of the first light L1B and/or the fourth intensity of the second light L2B, a percentage of the light incident in the second beam splitter unit 23B from the second lens 22B. For example, the sixth intensity of the third light L3B, and hence the percentage, is 10%, 20%, 30%, 40%, 50%, 60%, 70%, 80%, or 90% of the light incident in the second beam splitter unit 23B from the second lens 22B, depending on the percentage of the third intensity of the first light L1B and/or fourth intensity of the second light L2B. For example, the percentage of the third intensity of the first light L1B is 20%, the percentage of the fourth intensity of the second light L2B is 50%, and the percentage of the sixth intensity of the third light L3B is 30%.

By way of example, the first light L1B includes only a single wavelength of the red light. Further, the second light L2B includes only a single wavelength of the green light, for example. The third light L3B for example includes only a single wavelength of the blue light. As an alternative thereto, provision is for example made for the first light L1B to include one wavelength or a plurality of wavelengths from the wavelength range of the red light. Further, provision is for example made for the second light L2B to contain one wavelength or a plurality of wavelengths from the wavelength range of the green light. Moreover, provision is for example made for the third light L3B to contain one wavelength or a plurality of wavelengths from the wavelength range of the blue light.

The third detector 33B of the second observation channel 21B includes a sensitive third detector area 34B. The pixels of the third detector 33B of the second observation channel 21B which detect the third light L3B are arranged at the third detector area 34B. The third detector area 34B is not necessarily the entire detector area where pixels of the third detector 33B of the second observation channel 21 which detect the third light L3B are arranged. Rather, an exemplary embodiment of the digital long-range optical apparatus 20 provides for the third detector area 34B to be a partial area of the entire detector area of the third detector 33B of the second observation channel 21B. By way of example, provision is made for the processor unit 30 to be used to control the third detector 33B of the second observation channel 21B in such a way that a selectable third detector area 34B is switched to be sensitive for the detection of third light L3B.

In a further exemplary embodiment of the digital long-range optical apparatus 20 in accordance with FIG. 14, the first detector area 25B, the second detector area 28B, and the third detector area 34B have a relative arrangement as described in relation to FIGS. 3 and 4. Reference is made to the explanations given hereinbefore. These also apply here. If the first detector area 25B, the second detector area 28B, and the third detector area 34B were to be arranged relative to one another in one plane, then the aforementioned detector areas would be arranged offset from one another, with the result that the first detector area 25B, the second detector area 28B, and the third detector area 34B do not record exactly the same image of the object 2 but record different image portions of the object 2. This exemplary embodiment consequently ensures that the first detector area 25B, the second detector area 28B, and the third detector area 34B do not record exactly the same image of the object 2 but instead record different image portions of the object 2. As a result, it is possible to calculate and present a super-resolution image of the object 2 with known super-resolution algorithms (which are used for super-resolution imaging).

Figure 15:
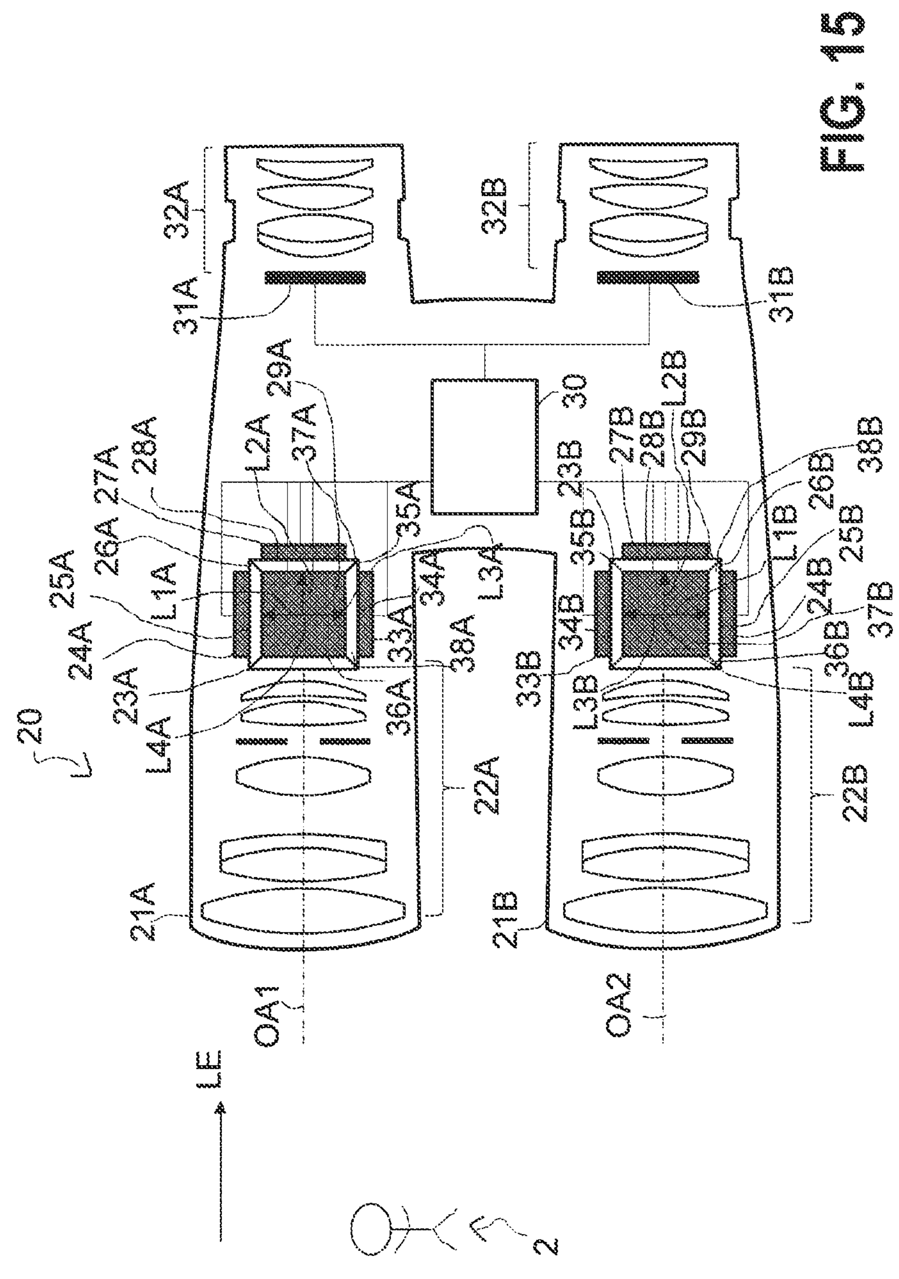
FIG. 15 shows a twelfth exemplary embodiment of a digital long-range optical apparatus.

FIG. 15 shows a further exemplary embodiment of a digital long-range optical apparatus 20 according to the disclosure for imaging an object 2. The further exemplary embodiment of FIG. 15 is based on the exemplary embodiment of FIG. 14. Therefore, reference is made to all the explanations provided hereinbefore, which also apply here. Identical components are provided with identical reference signs. In contrast to the exemplary embodiment of FIG. 14, the exemplary embodiment of FIG. 15 provides for the digital long-range optical apparatus 20 to additionally include a fourth detector 36A of the first observation channel 21A. The processor unit 30 is line-connected to the fourth detector 36A of the first observation channel 21A. Accordingly, signals are transmittable from the processor unit 30 to the fourth detector 36A of the first observation channel 21A and/or from the fourth detector 36A of the first observation channel 21A to the processor unit 30. The fourth detector 36A is configured to detect fourth light L4A generated by the first beam splitter unit 23A.

The fourth detector 36A of the first observation channel 21A is arranged at the first beam splitter unit 23A. The first beam splitter unit 23A includes a fourth beam splitter face 38A, at which the fourth detector 36A is arranged. The beam splitter face 38A and hence the fourth detector 36A of the first observation channel 21A are arranged in a plane extending parallel to the plane of the drawing (plane of the sheet). The fourth light L4A runs perpendicular to the plane of the drawing until it is incident on the fourth detector 36A of the first observation channel 21A. In a further exemplary embodiment of the digital long-range optical apparatus 20, provision is additionally or alternatively made for a fourth optical device (not illustrated) to be arranged between the first beam splitter unit 23A and the fourth detector 36A. The fourth optical device guides the fourth light L4A from the first beam splitter unit 23A to the fourth detector 36A.

For example, at least two of the faces or each of the faces of the first beam splitter face 26A of the first beam splitter unit 23A, the second beam splitter face 29A of the first beam splitter unit 23A, the third beam splitter face 35A of the first beam splitter unit 23A, and the fourth beam splitter face 38A of the first beam splitter unit 23A are arranged with respect to one another at an angle of between 0° and 180°, with the interval boundaries being included. Additionally or as an alternative thereto, at least two faces of the first beam splitter face 26A of the first beam splitter unit 23A, the second beam splitter face 29A of the first beam splitter unit 23A, the third beam splitter face 35A of the first beam splitter unit 23A, and the fourth beam splitter face 38A of the first beam splitter unit 23A are arranged at a distance from one another. In particular, provision is made for at least two of the aforementioned faces 26A, 29A, 35A, and 38A of the first beam splitter unit 23A to be arranged parallel to one another. For example, provision is made for the aforementioned beam splitter faces 26A, 29A, 35A, and 38A of the first beam splitter unit 23A to be arranged relative to one another in the style of a cube. Expressed in other words, respectively two of the aforementioned faces 26A, 29A, 35A, and 38A of the first beam splitter unit 23A are for example arranged with respect to one another at an angle of 90° or substantially 90°.

By way of example, the fourth detector 36A of the first observation channel 21A is also in the form of a CCD detector or CMOS detector. However, the disclosure is not restricted to the aforementioned exemplary embodiments. Rather, the fourth detector 36A of the first observation channel 21A can be any detector suitable for the disclosure. By way of example, at least one of the detectors 24A, 27A, 33A, and 36A is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The fourth light L4A includes one of the following features: (i) light at only a single seventh wavelength, (ii) light from a seventh wavelength range, or (iii) a specifiable seventh intensity. Reference is made to the explanations provided hereinbefore in respect of the definition of the terms of single wavelength and wavelength range. These also apply here. The single seventh wavelength may for example be a wavelength from the visible or invisible wavelength range. In particular, provision is made for the light at the seventh wavelength to be a red light, a green light, or a blue light. For example, the seventh wavelength range can be the wavelength range of the visible light, of the infrared range, of the near-infrared range, or of the short-wavelength infrared light. The exemplary embodiment of the seventh wavelength range in the form of the near-infrared range or the short-wavelength infrared light is advantageous, especially when observing the object 2 in twilight or low-light weather conditions. The seventh intensity of the fourth light L4A can be any selectable intensity, for example, depending on the percentage of the first intensity of the first light L1A and/or the second intensity of the second light L2A and/or the fifth intensity of the third light L3A, a percentage of the light incident in the first beam splitter unit 23A from the first lens 22A. For example, the seventh intensity of the fourth light L4A, and hence the percentage, is 10%, 20%, 30%, 40%, 50%, 60%, 70%, 80%, or 90% of the light incident in the first beam splitter unit 23A from the first lens 22A, depending on the percentage of the first intensity of the first light L1A and/or the second intensity of the second light L2A and/or the fifth intensity of the third light L3A. For example, the percentage of the first intensity of the first light L1A is 20%, the percentage of the second intensity of the second light L2A is 50%, the percentage of the fifth intensity of the third light L3A is 15%, and the percentage of the seventh intensity of the fourth light L4A is 15%.

By way of example, the first light L1A includes only a single wavelength of the red light. Further, the second light L2A includes only a single wavelength of the green light, for example. The third light L3A for example includes only a single wavelength of the blue light. In particular, the fourth light L4A includes only a single wavelength from the near-infrared range. As an alternative thereto, provision is for example made for the first light L1A to include one wavelength or a plurality of wavelengths from the wavelength range of the red light. Further, provision is for example made for the second light L2A to contain one wavelength or a plurality of wavelengths from the wavelength range of the green light. Moreover, provision is for example made for the third light L3A to contain one wavelength or a plurality of wavelengths from the wavelength range of the blue light. Further, provision is for example made for the fourth light L4A to contain one wavelength or a plurality of wavelengths from the near-infrared range.

The fourth detector 36A of the first observation channel 21A includes a sensitive fourth detector area 37A. The pixels of the fourth detector 36A of the first observation channel 21A which detect the fourth light L4A are arranged at the fourth detector area 37A. The fourth detector area 37A of the first observation channel 21A is not necessarily the entire detector area where pixels of the fourth detector 36A of the first observation channel 21A which detect the fourth light L4A are arranged. Rather, an exemplary embodiment of the digital long-range optical apparatus 20 provides for the fourth detector area 37A to be a partial area of the entire detector area of the fourth detector 36A of the first observation channel 21A. By way of example, provision is made for the processor unit 30 to be used to control the fourth detector 36A of the first observation channel 21A in such a way that a selectable fourth detector area 37A is switched to be sensitive for the detection of fourth light L4A.

In a further exemplary embodiment of the digital long-range optical apparatus 20 in accordance with FIG. 15, the first detector area 25A, the second detector area 28A, the third detector area 34A, and the fourth detector area 37A have a relative arrangement as described in relation to FIGS. 3 and 4. Reference is made to the explanations given hereinbefore. These also apply here. If the first detector area 25A, the second detector area 28A, the third detector area 34A, and the fourth detector area 37A were to be arranged relative to one another in one plane, then the aforementioned detector areas would be arranged offset from one another, with the result that the first detector area 25A, the second detector area 28A, the third detector area 34A, and the fourth detector area 37A do not record exactly the same image of the object 2 but record different image portions of the object 2. This exemplary embodiment consequently ensures that the first detector area 25A, the second detector area 28A, the third detector area 34A, and the fourth detector area 36A do not record exactly the same image of the object 2 but instead record different image portions of the object 2. As a result, it is possible to calculate and present a super-resolution image of the object 2 using known super-resolution algorithms (which are used for super-resolution imaging).

In a further embodiment of the digital long-range optical apparatus 20 according to the disclosure in accordance with FIG. 15, provision is made for the digital long-range optical apparatus 20 to additionally include a fifth detector (not illustrated) of the first observation channel 21A. The processor unit 30 is line-connected to the fifth detector of the first observation channel 21A. Accordingly, signals are transmittable from the processor unit 30 to the fifth detector of the first observation channel 21A and/or from the fifth detector of the first observation channel 21A to the processor unit 30. The fifth detector is configured to detect fifth light generated by the first beam splitter unit 23A. The fifth detector of the first observation channel 21A is arranged at the first beam splitter unit 23A. The first beam splitter unit 23A includes a fifth beam splitter face (not illustrated), at which the fifth detector is arranged. The fifth beam splitter face and hence the fifth detector of the first observation channel 21A are arranged in a plane extending parallel to the plane of the drawing (plane of the sheet). The fifth light runs perpendicular to the plane of the drawing until it is incident on the fifth detector of the first observation channel 21A. In a further exemplary embodiment of the digital long-range optical apparatus 20, provision is additionally or alternatively made for a fifth optical device (not illustrated) to be arranged between the first beam splitter unit 23A and the fifth detector. The fifth optical device guides the fifth light from the first beam splitter unit 23A to the fifth detector.

For example, at least two of the faces or each of the faces of the first beam splitter face 26A of the first beam splitter unit 23A, the second beam splitter face 29A of the first beam splitter unit 23A, the third beam splitter face 35A of the first beam splitter unit 23A, the fourth beam splitter face 38A of the first beam splitter unit 23A, and the fifth beam splitter face of the first beam splitter unit 23A are arranged with respect to one another at an angle of between 0° and 180°, with the interval boundaries being included. Additionally or as an alternative thereto, at least two faces of the first beam splitter face 26A of the first beam splitter unit 23A, the second beam splitter face 29A of the first beam splitter unit 23A, the third beam splitter face 35A of the first beam splitter unit 23A, the fourth beam splitter face 38A of the first beam splitter unit 23A, and the fifth beam splitter face of the first beam splitter unit 23A are arranged at a distance from one another. In particular, provision is made for at least two of the aforementioned faces of the first beam splitter unit 23A to be arranged parallel to one another. For example, provision is made for the aforementioned beam splitter faces of the first beam splitter unit 23A to be arranged relative to one another in the style of a cube. Expressed in other words, respectively two of the aforementioned faces of the first beam splitter unit 23A are for example arranged with respect to one another at an angle of 90° or substantially 90°.

The explanations given above in relation to the first detector 24A of the first observation channel 21A, the second detector 27A of the first observation channel 21A, the third detector 33A of the first observation channel 21A, and the fourth detector 36A of the first observation channel 21A apply accordingly to the fifth detector. Reference is made to these explanations.

In contrast to the exemplary embodiment of FIG. 14, the exemplary embodiment of FIG. 15 provides for the digital long-range optical apparatus 20 to additionally include a fourth detector 36B of the second observation channel 21B. The processor unit 30 is line-connected to the fourth detector 36B of the second observation channel 21B. Accordingly, signals are transmittable from the processor unit 30 to the fourth detector 36B of the second observation channel 21B and/or from the fourth detector 36B of the second observation channel 21B to the processor unit 30. The fourth detector 33B is configured to detect fourth light L4B generated by the second beam splitter unit 23B.

The fourth detector 36B of the second observation channel 21B is arranged at the second beam splitter unit 23B. The second beam splitter unit 23B includes a fourth beam splitter face 38B, at which the fourth detector 36B is arranged. The fourth beam splitter face 38B and hence the fourth detector 36B of the second observation channel 21B are arranged in a plane extending parallel to the plane of the drawing (plane of the sheet). The fourth light L4B runs perpendicular to the plane of the drawing until it is incident on the fourth detector 36B of the second observation channel 21B. In a further exemplary embodiment of the digital long-range optical apparatus 20, provision is additionally or alternatively made for a fourth optical device (not illustrated) to be arranged between the second beam splitter unit 23B and the fourth detector 36B. The fourth optical device guides the fourth light L4B from the second beam splitter unit 23B to the fourth detector 36B.

For example, at least two of the faces or each of the faces of the first beam splitter face 26B of the second beam splitter unit 23B, the second beam splitter face 29B of the second beam splitter unit 23B, the third beam splitter face 35B of the second beam splitter unit 23B, and the fourth beam splitter face 38B of the second beam splitter unit 23B are arranged with respect to one another at an angle of between 0° and 180°, with the interval boundaries being included. Additionally or as an alternative thereto, at least two faces of the first beam splitter face 26B of the second beam splitter unit 23B, the second beam splitter face 29B of the second beam splitter unit 23B, the third beam splitter face 35B of the second beam splitter unit 23B, and the fourth beam splitter face 38B of the second beam splitter unit 23B are arranged at a distance from one another. In particular, provision is made for at least two of the aforementioned faces 26B, 29B, 35B, and 38B of the second beam splitter unit 23B to be arranged parallel to one another. For example, provision is made for the aforementioned beam splitter faces 26B, 29B, 35B, and 38B of the second beam splitter unit 23B to be arranged relative to one another in the style of a cube. Expressed in other words, respectively two of the aforementioned faces 26B, 29B, 35B, and 38B of the second beam splitter unit 23B are for example arranged with respect to one another at an angle of 90° or substantially 90°.

By way of example, the fourth detector 36B of the second observation channel 21B is also in the form of a CCD detector or CMOS detector. However, the disclosure is not restricted to the aforementioned exemplary embodiments. Rather, the fourth detector 36B of the second observation channel 21B can be any detector suitable for the disclosure. By way of example, at least one of the detectors 24B, 27B, 33B, and 36B is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The fourth light L4B includes one of the following features: (i) light at only a single eighth wavelength, (ii) light from an eighth wavelength range, or (iii) a specifiable eighth intensity. Reference is made to the explanations provided hereinbefore in respect of the definition of the terms of single wavelength and wavelength range. These also apply here. The single eighth wavelength may for example be a wavelength from the visible or invisible wavelength range. In particular, provision is made for the light at the eighth wavelength to be a red light, a green light, or a blue light. For example, the eighth wavelength range can be the wavelength range of the visible light, of the infrared range, of the near-infrared range, or of the short-wavelength infrared light. The exemplary embodiment of the eighth wavelength range in the form of the near-infrared range or the short-wavelength infrared light is advantageous, especially when observing the object 2 in twilight or low-light weather conditions. The eighth intensity of the fourth light L4B can be any selectable intensity, for example, depending on the percentage of the third intensity of the first light L1B and/or the fourth intensity of the second light L2B and/or the sixth intensity of the third light L3B, a percentage of the light incident in the second beam splitter unit 23B from the second lens 22B. For example, the eighth intensity of the fourth light L4B, and hence the percentage, is 10%, 20%, 30%, 40%, 50%, 60%, 70%, 80%, or 90% of the light incident in the second beam splitter unit 23B from the second lens 22B, depending on the percentage of the third intensity of the first light L1B and/or the fourth intensity of the second light L2B and/or the sixth intensity of the third light L3B. For example, the percentage of the third intensity of the first light L1B is 20%, the percentage of the fourth intensity of the second light L2B is 50%, the percentage of the sixth intensity of the third light L3B is 15%, and the percentage of the eighth intensity of the fourth light L4B is 15%.

By way of example, the first light L1B includes only a single wavelength of the red light. Further, the second light L2B includes only a single wavelength of the green light, for example. The third light L3B for example includes only a single wavelength of the blue light. In particular, the fourth light L4B includes only a single wavelength from the near-infrared range. As an alternative thereto, provision is for example made for the first light L1B to include one wavelength or a plurality of wavelengths from the wavelength range of the red light. Further, provision is for example made for the second light L2B to contain one wavelength or a plurality of wavelengths from the wavelength range of the green light. Moreover, provision is for example made for the third light L3B to contain one wavelength or a plurality of wavelengths from the wavelength range of the blue light. Further, provision is for example made for the fourth light L4B to contain one wavelength or a plurality of wavelengths from the near-infrared range.

The fourth detector 36B of the second observation channel 21B includes a sensitive fourth detector area 37B. The pixels of the fourth detector 36B of the second observation channel 21B which detect the fourth light L4B are arranged at the fourth detector area 37B. The fourth detector area 37B is not necessarily the entire detector area where pixels of the fourth detector 36B of the second observation channel 21B which detect the fourth light L4B are arranged. Rather, an exemplary embodiment of the digital long-range optical apparatus 20 provides for the fourth detector area 37B to be a partial area of the entire detector area of the fourth detector 36B of the second observation channel 21B. By way of example, provision is made for the processor unit 30 to be used to control the fourth detector 36B of the second observation channel 21B in such a way that a selectable fourth detector area 37B is switched to be sensitive for the detection of fourth light L4B.

In a further exemplary embodiment of the digital long-range optical apparatus 20 in accordance with FIG. 15, the first detector area 25B, the second detector area 28B, the third detector area 34B, and the fourth detector area 37B have a relative arrangement as described in relation to FIGS. 3 and 4. Reference is made to the explanations given hereinbefore. These also apply here. If the first detector area 25B, the second detector area 28B, the third detector area 34B, and the fourth detector area 37B were to be arranged relative to one another in one plane, then the aforementioned detector areas would be arranged offset from one another, with the result that the first detector area 25B, the second detector area 28B, the third detector area 34B, and the fourth detector area 37B do not record exactly the same image of the object 2 but record different image portions of the object 2. This exemplary embodiment consequently ensures that the first detector area 25B, the second detector area 28B, the third detector area 34B, and the fourth detector area 37B do not record exactly the same image of the object 2 but instead record different image portions of the object 2. As a result, it is possible to calculate and present a super-resolution image of the object 2 using known super-resolution algorithms (which are used for super-resolution imaging).

In a further exemplary embodiment of the digital long-range optical apparatus 20 according to the disclosure in accordance with FIG. 15, provision is made for the digital long-range optical apparatus 20 to additionally include a fifth detector (not illustrated) of the second observation channel 21B. The processor unit 30 is line-connected to the fifth detector of the second observation channel 21B. Accordingly, signals are transmittable from the processor unit 30 to the fifth detector of the second observation channel 21B and/or from the fifth detector of the second observation channel 21B to the processor unit 30. The fifth detector is configured to detect fifth light generated by the second beam splitter unit 23B. The fifth detector of the second observation channel 21B is arranged at the second beam splitter unit 23B. The second beam splitter unit 23B includes a fifth beam splitter face (not illustrated), at which the fifth detector is arranged. The fifth beam splitter face and hence the fifth detector of the second observation channel 21B are arranged in a plane extending parallel to the plane of the drawing (plane of the sheet). The fifth light runs perpendicular to the plane of the drawing until it is incident on the fifth detector of the first observation channel 21B. In a further exemplary embodiment of the digital long-range optical apparatus 20, provision is additionally or alternatively made for a fifth optical device (not illustrated) to be arranged between the second beam splitter unit 23B and the fifth detector. The fifth optical device guides the fifth light from the first beam splitter unit 23B to the fifth detector.

For example, at least two of the faces or each of the faces of the first beam splitter face 26B of the second beam splitter unit 23B, the second beam splitter face 29B of the second beam splitter unit 23B, the third beam splitter face 35B of the second beam splitter unit 23B, the fourth beam splitter face 38B of the second beam splitter unit 23B, and the fifth beam splitter face of the second beam splitter unit 23B are arranged with respect to one another at an angle of between 0° and 180°, with the interval boundaries being included. Additionally or as an alternative thereto, at least two faces of the first beam splitter face 26B of the second beam splitter unit 23B, the second beam splitter face 29B of the second beam splitter unit 23B, the third beam splitter face 35B of the second beam splitter unit 23B, the fourth beam splitter face 38B of the second beam splitter unit 23B, and the fifth beam splitter face of the second beam splitter unit 23B are arranged at a distance from one another. In particular, provision is made for at least two of the aforementioned faces of the second beam splitter unit 23B to be arranged parallel to one another. For example, provision is made for the aforementioned beam splitter faces of the second beam splitter unit 23B to be arranged relative to one another in the style of a cube. Expressed in other words, respectively two of the aforementioned faces of the second beam splitter unit 23B are for example arranged with respect to one another at an angle of 90° or substantially 90°.

The explanations given above in relation to the first detector 24B of the second observation channel 21B, the second detector 27B of the second observation channel 21B, the third detector 33B of the second observation channel 21B, and the fourth detector 36B of the second observation channel 21B apply accordingly to the fifth detector. Reference is made to these explanations.

Figure 16:
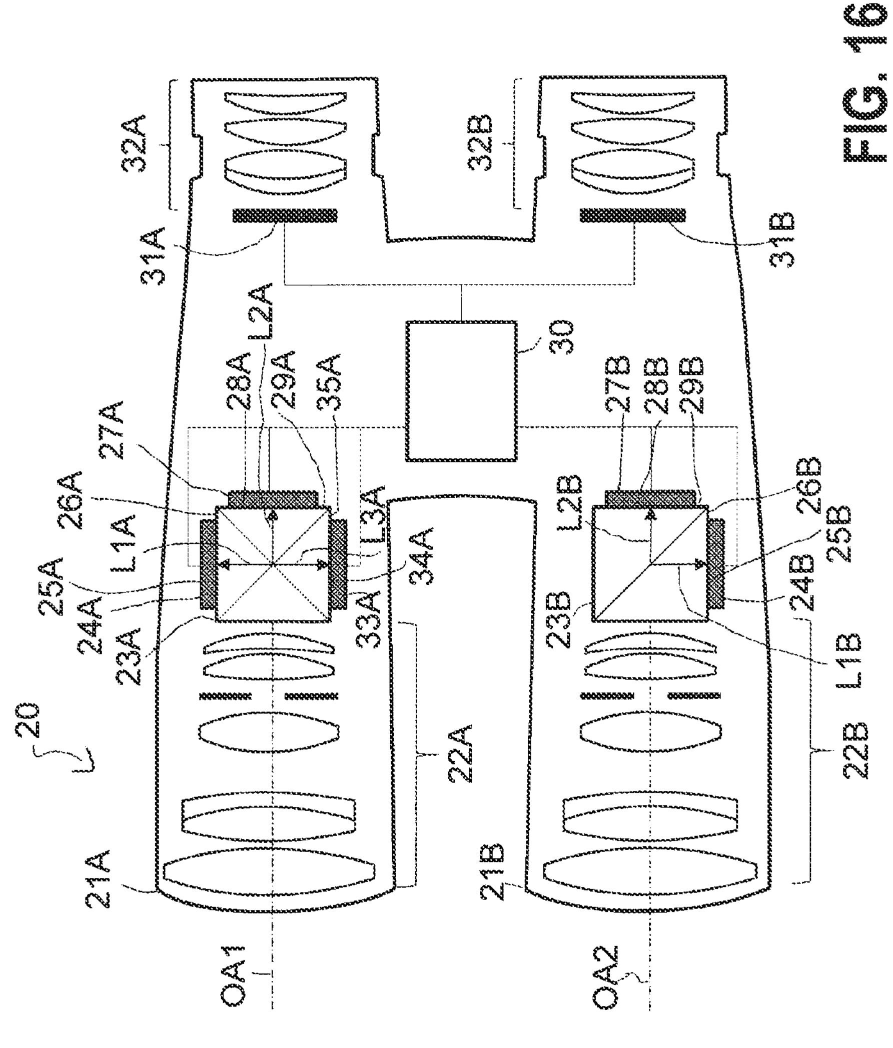
FIG. 16 shows a thirteenth exemplary embodiment of a digital long-range optical apparatus.

FIG. 16 shows a further exemplary embodiment of a digital long-range optical apparatus 20 according to the disclosure for imaging an object 2. The further exemplary embodiment of FIG. 16 is based firstly on the exemplary embodiment of FIG. 13 and secondly on the exemplary embodiment of FIG. 14. Identical components are provided with identical reference signs. The first observation channel 21A of the digital long-range optical apparatus 20 in accordance with FIG. 16 corresponds to the first observation channel 21A of the digital long-range optical apparatus 20 in accordance with FIG. 14. The second observation channel 21B of the digital long-range optical apparatus 20 in accordance with FIG. 16 corresponds to the second observation channel 21B of the digital long-range optical apparatus 20 in accordance with FIG. 13. Reference is made to the corresponding explanations in relation to FIGS. 13 and 14 given hereinbefore, which also apply here. Thus, the number of detectors in the first observation channel 21A and in the second observation channel 21B may differ. By way of example, the first detector 24A of the first observation channel 21A detects red light, the second detector 27A of the first observation channel 21A detects green light, and the third detector 33A of the first observation channel 21A detects blue light. The first detector 24B of the second observation channel 21B detects light from the near-infrared range, for example. By contrast, the second detector 27B of the second observation channel 21B for example detects visible light and is provided with a Bayer filter. The first observation channel 21A provides a high color efficiency, a good resolution, and a good color reproduction. The second observation channel 21B enables a good recording of an image of the object 2 in twilight and provides the option of generating a stereo image.

Figure 17:
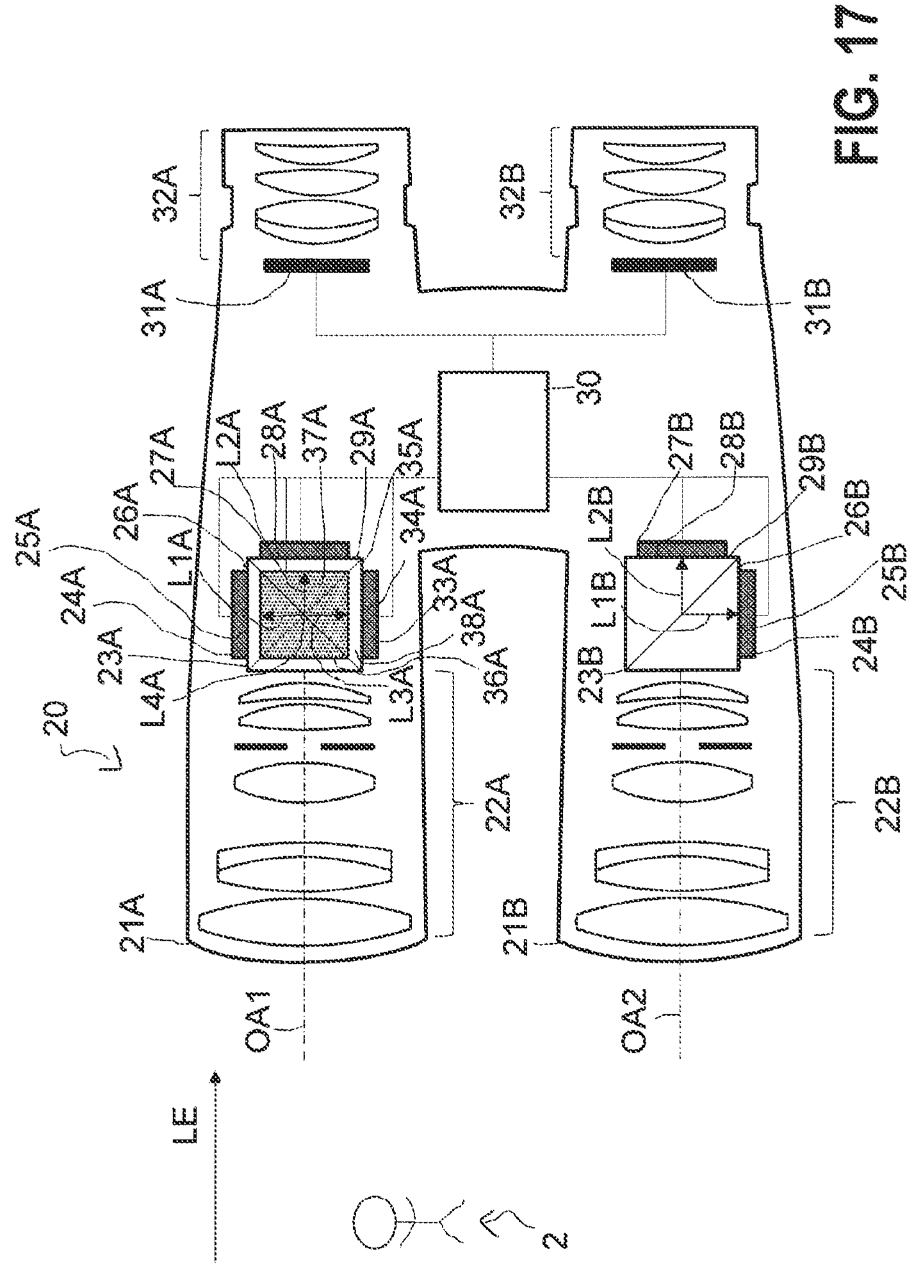
FIG. 17 shows a fourteenth exemplary embodiment of a digital long-range optical apparatus.

FIG. 17 shows a further exemplary embodiment of a digital long-range optical apparatus 20 according to the disclosure for imaging an object 2. The further exemplary embodiment of FIG. 17 is based firstly on the exemplary embodiment of FIG. 13 and secondly on the exemplary embodiment of FIG. 15. Identical components are provided with identical reference signs. The first observation channel 21A of the digital long-range optical apparatus 20 in accordance with FIG. 17 corresponds to the first observation channel 21A of the digital long-range optical apparatus 20 in accordance with FIG. 15. The second observation channel 21B of the digital long-range optical apparatus 20 in accordance with FIG. 17 corresponds to the second observation channel 21B of the digital long-range optical apparatus 20 in accordance with FIG. 13. Reference is made to the corresponding explanations in relation to FIGS. 13 and 15 given hereinbefore, which also apply here.

Figure 18:
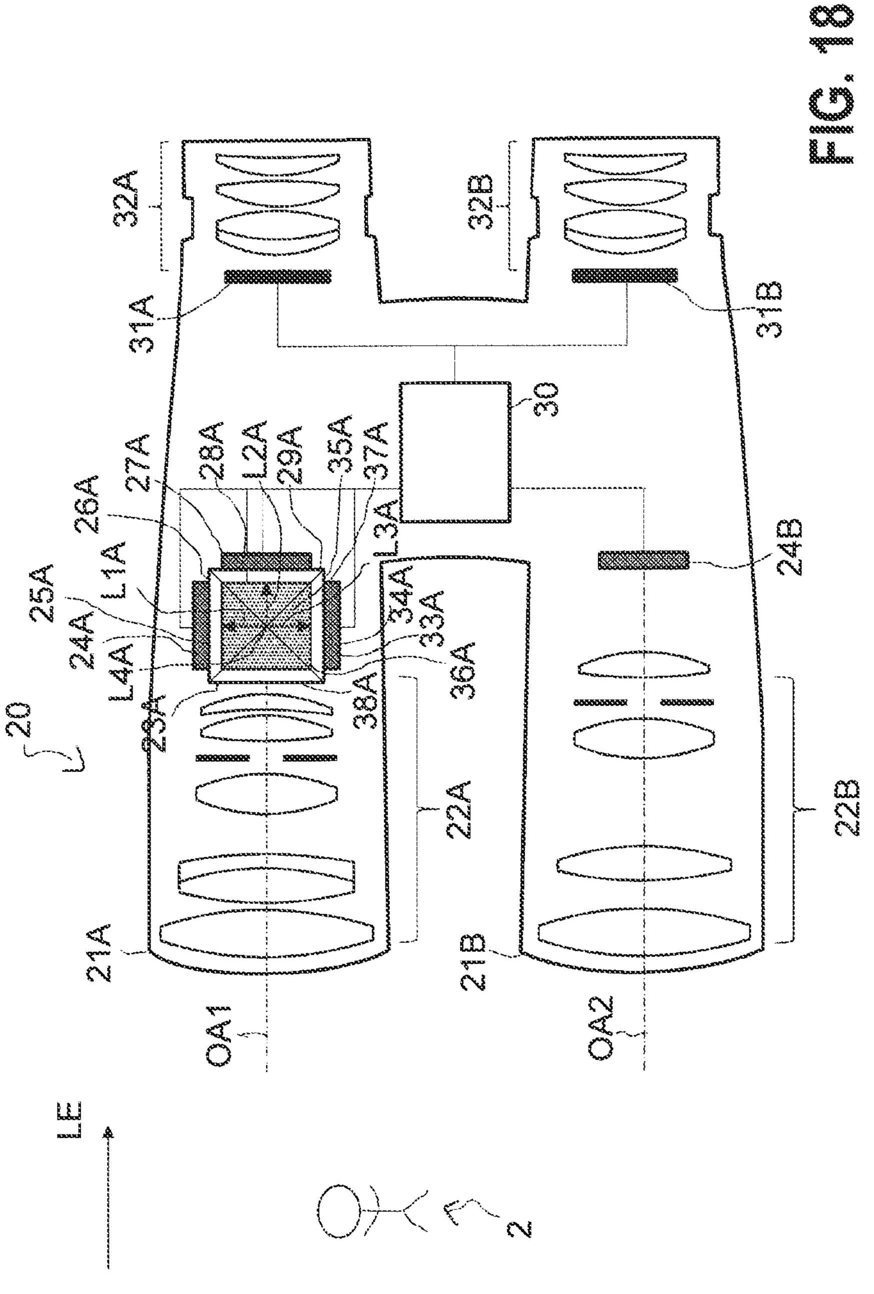
FIG. 18 shows a fifteenth exemplary embodiment of a digital long-range optical apparatus.

FIG. 18 shows a further exemplary embodiment of a digital long-range optical apparatus 20 according to the disclosure for imaging an object 2. The further exemplary embodiment of FIG. 18 is based on the exemplary embodiment of FIG. 15. Identical components are provided with identical reference signs. The first observation channel 21A of the digital long-range optical apparatus 20 in accordance with FIG. 18 corresponds to the first observation channel 21A of the digital long-range optical apparatus 20 in accordance with FIG. 15. Reference is made to the corresponding explanations in relation to FIG. 15 given hereinbefore, which also apply here. In contrast to the second observation channel 21B of the digital long-range optical apparatus 20 in accordance with FIG. 15, the second observation channel 21B of the exemplary embodiment in accordance with FIG. 18 includes the second lens 22B and a first detector 24B, with first the second lens 22B being arranged along the second optical axis OA2 as seen from the object 2 in the direction of light incidence LE, followed by the first detector 24B. The first detector 24B of the second observation channel 21B is line-connected to the processor unit 30. In the case of the exemplary embodiment of the digital long-range optical apparatus 20 illustrated in FIG. 18, the second observation channel 21B has a simpler exemplary embodiment than the first observation channel 21A in relation to the number of components and the arrangement of the components. The first observation channel 21A has the aforementioned advantages, especially in respect of color efficiency and resolution. The second observation channel 21B can be produced cost-effectively on account of the smaller number of components. Consequently, the first observation channel 21A serves to record a high-quality image of the object 2. The second observation channel 21B serves to provide information for a stereo image. By way of example, provision is made for the first image generated by the first observation channel 21A and the second image generated by the second observation channel 21B to be combined in such a way that it is possible to calculate a high-quality stereo image.

Figure 19:
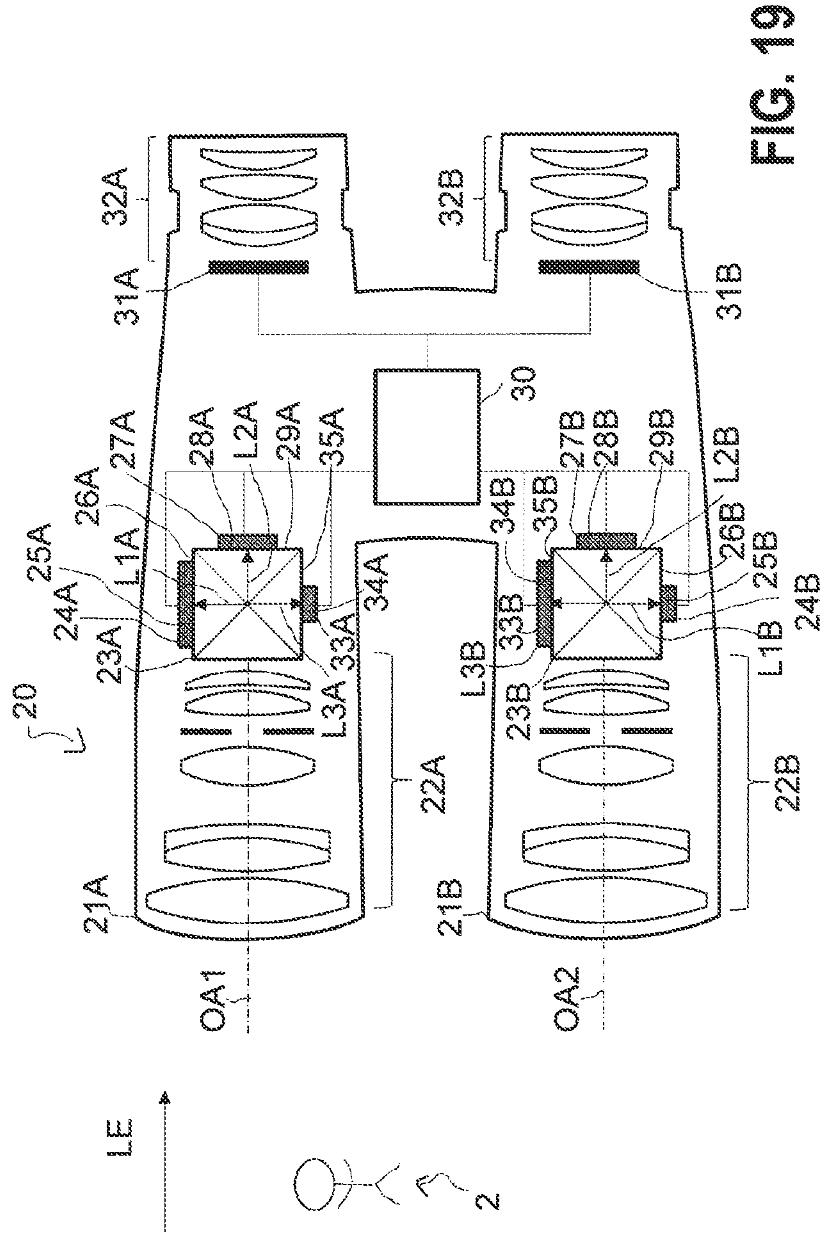
FIG. 19 shows a sixteenth exemplary embodiment of a digital long-range optical apparatus.

FIG. 19 shows a further exemplary embodiment of a digital long-range optical apparatus 20 according to the disclosure for imaging an object 2. The further exemplary embodiment of FIG. 19 is based on the embodiment of FIG. 14. Identical components are provided with identical reference signs. Reference is made to the corresponding explanations in relation to FIG. 14 given hereinbefore, which also apply here. In contrast to the exemplary embodiment of FIG. 14, the exemplary embodiment of FIG. 19 provides in the first observation channel 21A for the third detector area 34A to differ in size from the first detector area 25A and/or the second detector area 28A. In the exemplary embodiment illustrated in FIG. 19, the first detector area 25A is larger than the second detector area 28A. Further, the second detector area 28A is larger than the third detector area 34A. By way of example, the first detector area 24A is two times, three times, or four times larger than the second detector area 28A. Further, the second detector area 28A is for example two times, three times, or four times larger than the third detector area 34A. This exemplary embodiment of the digital long-range optical apparatus 20 is advantageous in that a first image of the first observation channel 21A generated by the first detector 24A, a second image of the first observation channel 21A generated by the second detector 27A, and a third image of the first observation channel 21A generated by the third detector 33A are based on differently sized fields of view. As a result, it is possible to provide digital zooming for the first observation channel 21A within the scope of the digital long-range optical apparatus 20, and generate different zoom images with different zoom levels. For example, the first image of the first observation channel 21A is based on a first field of view and shows a first image portion of the object 2, which corresponds to an image of the first observation channel 21A at a first zoom level. Further, for example, the second image of the first observation channel 21A is based on a second field of view and shows a second image portion of the object 2, which corresponds to an image at a second zoom level. Moreover, the third image of the first observation channel 21A is based on a third field of view and shows a third image portion of the object 2, which corresponds to an image at a third zoom level. It is advantageous that the resolution of the images remains the same for all zoom levels if the resolution of the aforementioned detectors of the first observation channel 21A is the same. By contrast, in the case of a digital zoom known from the prior art, the resolution reduces as the zooming increases.

In contrast to the exemplary embodiment of FIG. 14, the exemplary embodiment of FIG. 19 provides in the second observation channel 21B for the first detector area 25B to differ in size from the second detector area 28B and/or the third detector area 34B. In the exemplary embodiment illustrated in FIG. 19, the first detector area 25B is smaller than the second detector area 28B. Further, the second detector area 28B is smaller than the third detector area 34B. By way of example, the first detector area 25B is two times, three times, or four times smaller than the second detector area 28B. Further, the second detector area 28B is for example two times, three times, or four times smaller than the third detector area 34B. This exemplary embodiment of the digital long-range optical apparatus 20 is advantageous in that a first image of the second observation channel 21B generated by the first detector 24B, a second image of the second observation channel 21B generated by the second detector 27B, and a third image of the second observation channel 21B generated by the third detector 33B are based on differently sized fields of view. As a result of this, it is possible to provide digital zooming for the second observation channel 21B within the scope of the digital long-range optical apparatus 20, and generate different zoom images with different zoom levels. For example, the first image of the second observation channel 21B is based on a first field of view and shows a first image portion of the object 2, which corresponds to an image of the second observation channel 21B at a first zoom level. Further, for example, the second image of the second observation channel 21B is based on a second field of view and shows a second image portion of the object 2, which corresponds to an image at a second zoom level. Moreover, the third image of the second observation channel 21B is based on a third field of view and shows a third image portion of the object 2, which corresponds to an image at a third zoom level. It is advantageous that the resolution of the images remains the same for all zoom levels if the resolution of the aforementioned detectors of the second observation channel 21B is the same. By contrast, in the case of a digital zoom known from the prior art, the resolution reduces as the zooming increases.

In the exemplary embodiment illustrated in FIG. 19, the light incident in the first beam splitter unit 23A is for example split not according to wavelengths but according to intensities. Further, the light incident in the second beam splitter unit 23B is for example split not according to wavelengths but according to intensities.

The exemplary embodiment illustrated in FIG. 19 allows images with different zoom levels to be recorded simultaneously. When observing the object 2 at a high magnification, an overview image for recognizing objects or recording images is nevertheless available at all times. Moreover, the three images of each observation channel 21A and 21B can be combined by calculation in order to minimize noise and increase the resolution. In contrast to an optical zoom, there is no need for mechanical movement or complex optics in the exemplary embodiment illustrated in FIG. 19, and zooming takes place immediately. Digital zooming is possible between the discrete zoom levels in order to enable a continuous zooming. This may be accompanied by a slight loss of resolution.

Figure 20:
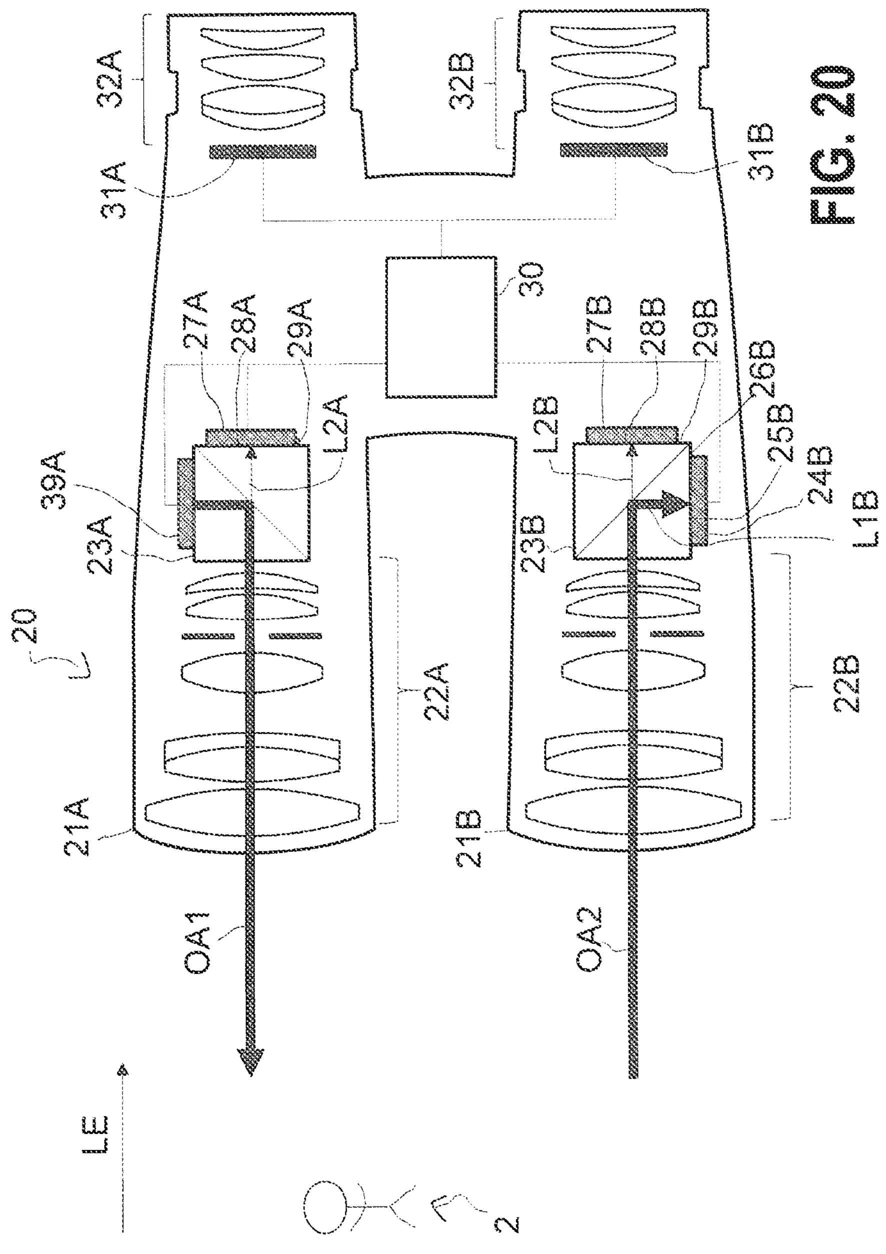
FIG. 20 shows a seventeenth exemplary embodiment of a digital long-range optical apparatus.

FIG. 20 shows a further exemplary embodiment of a digital long-range optical apparatus 20 according to the disclosure for imaging an object 2. The further exemplary embodiment of FIG. 20 is based on the exemplary embodiment of FIG. 13. Identical components are provided with identical reference signs. Reference is made to the corresponding explanations in relation to FIG. 13 given hereinbefore, which also apply here. In contrast to the exemplary embodiment of FIG. 13, the exemplary embodiment of FIG. 20 provides for a transmitter unit 39A to be arranged at the first beam splitter 23A in the first observation channel 21A, instead of the first detector 24A for the first observation channel 21A. With the transmitter unit 39A, light from a specific wavelength range, for example the near-infrared range, is radiated through the first beam splitter 23A and the first lens 22A to the object 2. For example, the transmitter unit 39A is in the form of a light source for illuminating the object 2, a laser beam of a rangefinder, and/or a laser beam of an illumination device.

In the exemplary embodiment of FIG. 20, light emanating from the object 2 enters the second lens 22B in the direction of the light incidence LE and is incident on the second beam splitter unit 23B. The second beam splitter unit 23B serves to split the light into the first light L1B and into the second light L2B. Expressed in other words, the second beam splitter unit 23B serves to split the light into two components. In the exemplary embodiment illustrated in FIG. 20, the first light L1B is the light from the transmitter unit 39A reflected by the object 2. Consequently, the first light 1B is from the aforementioned specific wavelength range. By way of example, the first detector 24B of the second observation channel 21B is in the form of a receiver unit of a rangefinder or in the form of a sensor of an exposure measuring unit. An advantage of the exemplary embodiment in FIG. 20 is that the first detector 24B of the second observation channel 21B, which detects the light from the specific wavelength range, has the same viewing angle as the further detectors 27A and 27B of the digital optical apparatus 20. The exemplary embodiment of FIG. 20 is not restricted to a binocular optical system. Instead, the exemplary embodiment of FIG. 20 can also be arranged in a monocular system.

Exemplary embodiments of the beam splitter unit 7 of the digital long-range optical apparatus 1, the first beam splitter unit 23A of the first observation channel 21A of the digital long-range optical apparatus 20, and the second beam splitter unit 23B of the second observation channel 21B of the digital long-range optical apparatus 20 are discussed hereinafter on the basis of FIGS. 21 to 29. This is explained in exemplary fashion on the basis of the beam splitter unit 7 of the digital long-range optical apparatus 1. The same applies to the first beam splitter unit 23A of the first observation channel 21A and to the second beam splitter unit 23B of the second observation channel 21B.

Figures 21, 22, 23:
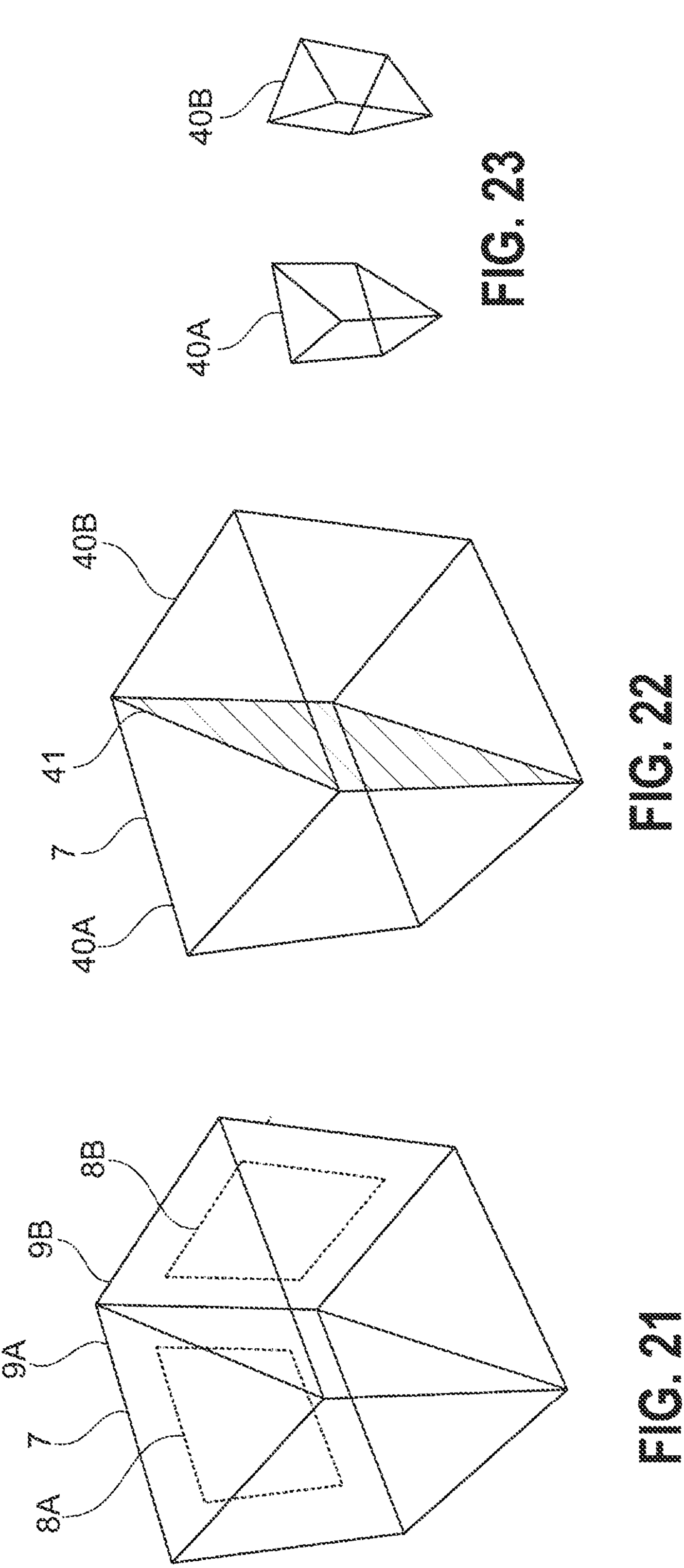
FIGS. 21 to 23 show a first exemplary embodiment of a beam splitter unit.

According to the exemplary embodiment of FIGS. 21 to 23, the first detector 8A is arranged at the first beam splitter face 9A of the beam splitter unit 7 and the second detector 8B is arranged at the second beam splitter face 9B of the beam splitter unit 7. The beam splitter unit 7 includes a first optical unit 40A in the form of a polyhedron and a second optical unit 40B in the form of a polyhedron. The first optical unit 40A and the second optical unit 40B are arranged next to one another. A dichroic interface 41 is arranged between the first optical unit 40A and the second optical unit 40B. The dichroic interface 41 is arranged as a coating at at least one of the two optical units 40A, 40B or is arranged as a coating at both of the two optical units 40A, 40B. A specific wavelength or a specific wavelength range of the light incident on the dichroic interface 41 is transmitted through the dichroic interface 41. All further wavelengths or wavelength ranges which do not correspond to the specific wavelength or which do not belong to the specific wavelength range are reflected.

Figures 24, 25, 26:
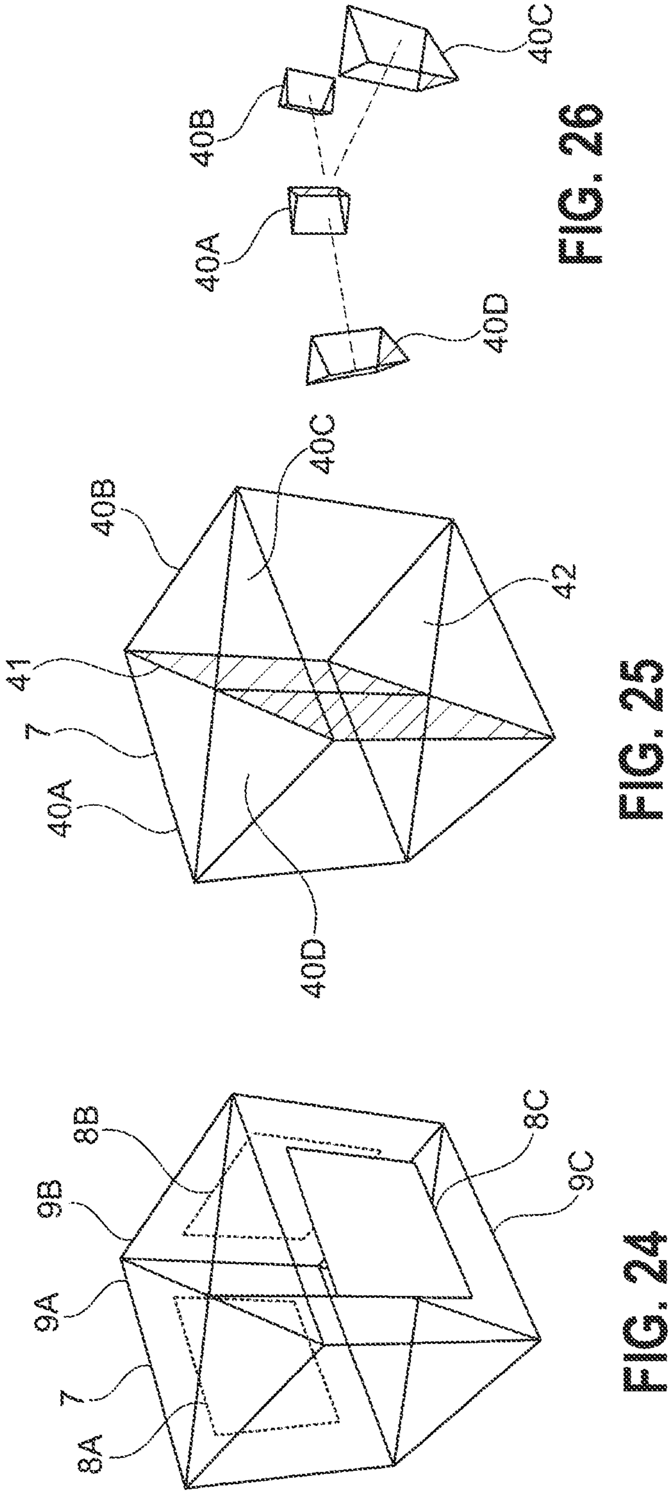
FIGS. 24 to 26 show a second exemplary embodiment of a beam splitter unit.

According to the exemplary embodiment of the FIGS. 24 to 26, the first detector 8A is arranged at the first beam splitter face 9A of the beam splitter unit 7, the second detector 8B is arranged at the second beam splitter face 9B of the beam splitter unit 7, and the third detector 8C is arranged at the third beam splitter face 9C of the beam splitter unit 7. The beam splitter unit 7 includes a first optical unit 40A in the form of a polyhedron, a second optical unit 40B in the form of a polyhedron, a third optical unit 40C in the form of a polyhedron, and a fourth optical unit 40D in the form of a polyhedron. The first optical unit 40A, the second optical unit 40B the third optical unit 40C, and the fourth optical unit 40D are arranged next to one another in such a way that the beam splitter unit 7 includes a first dichroic interface 41 and a second dichroic interface 42. The first dichroic interface 41 is arranged as a coating at the first optical unit 40A, the second optical unit 40B, the third optical unit 40C, and/or the fourth optical unit 40D. A specific wavelength or a specific wavelength range of the light incident on the first dichroic interface 41 is transmitted through the first dichroic interface 41. All further wavelengths or wavelength ranges which do not correspond to the specific wavelength or which do not belong to the specific wavelength range are reflected. The same applies to the second dichroic interface 42.

Figures 27, 28, 29:
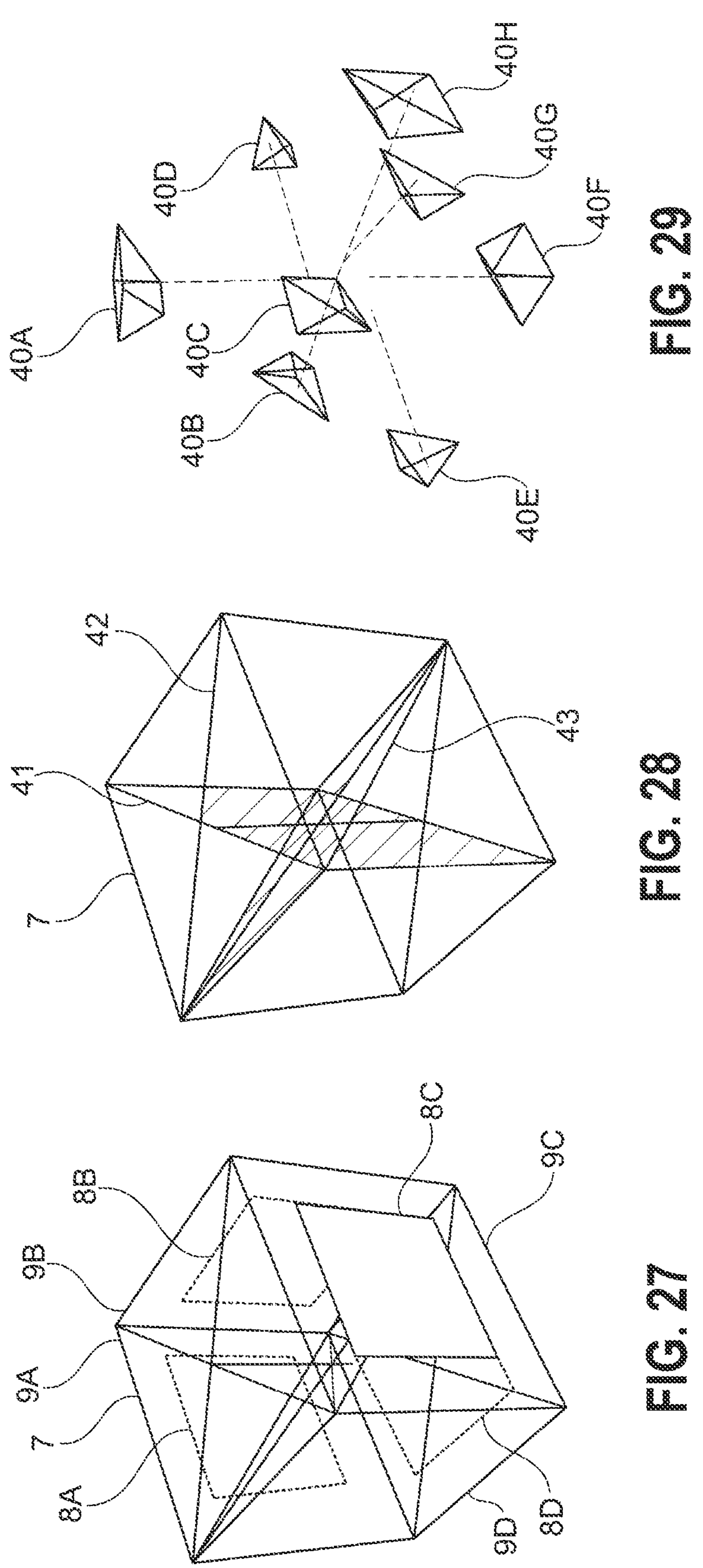
FIGS. 27 to 29 show a third exemplary embodiment of a beam splitter unit.

According to the exemplary embodiment of FIGS. 27 to 29, the first detector 8A is arranged at the first beam splitter face 9A of the beam splitter unit 7, the second detector 8B is arranged at the second beam splitter face 9B of the beam splitter unit 7, the third detector 8C is arranged at the third beam splitter face 9C of the beam splitter unit 7, and the fourth detector 8D is arranged at the fourth beam splitter face 9D of the beam splitter unit 7. The beam splitter unit 7 includes a first optical unit 40A in the form of a polyhedron, a second optical unit 40B in the form of a polyhedron, a third optical unit 40C in the form of a polyhedron, a fourth optical unit 40D in the form of a polyhedron, a fifth optical unit 40E in the form of a polyhedron, a sixth optical unit 40F in the form of a polyhedron, a seventh optical unit 40G in the form of a polyhedron, and an eighth optical unit 40H in the form of a polyhedron. The first optical unit 40A, the second optical unit 40B, the third optical unit 40C, the fourth optical unit 40D, the fifth optical unit 40E, the sixth optical unit 40F, the seventh optical unit 40G, and the eighth optical unit 40H are arranged next to one another in such a way that the beam splitter unit 7 includes a first dichroic interface 41, a second dichroic interface 42, and a third dichroic interface 43. The first dichroic interface 41 is arranged for example as a coating at the first optical unit 40A, the second optical unit 40B, the third optical unit 40C, and/or the fourth optical unit 40D. A specific wavelength or a specific wavelength range of the light incident on the first dichroic interface 41 is transmitted through the first dichroic interface 41. All further wavelengths or wavelength ranges which do not correspond to the specific wavelength or which do not belong to the specific wavelength range are reflected. The same applies to the second dichroic interface 42 and/or the third dichroic interface 43.

Explicit reference is made to the fact that light incident in the beam splitter unit 7 can be split between more than 4 detectors. For example, a fifth detector may also be arranged at the beam splitter unit 7, with the result that the light incident in the beam splitter unit 7 is split between the 5 detectors.

Figure 30:
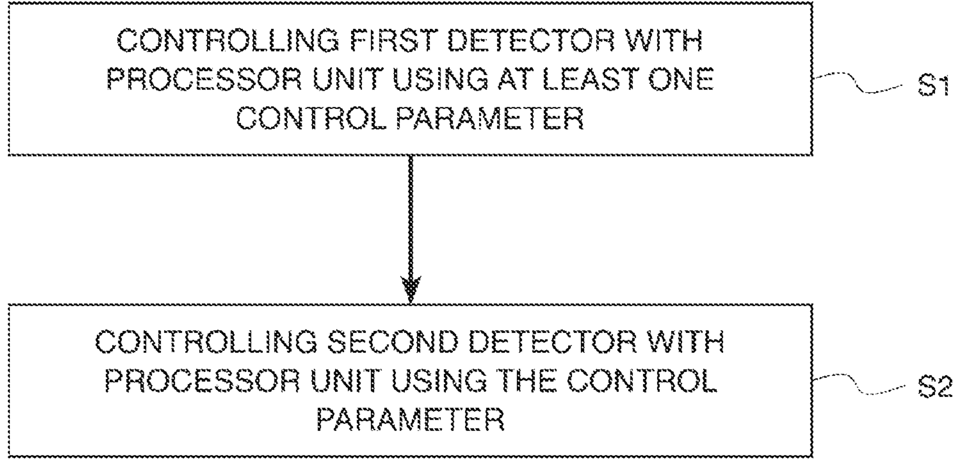
FIG. 30 shows an exemplary embodiment of a method for operating a digital long-range optical apparatus and/or a camera system.

FIG. 30 shows an exemplary embodiment of a method according to the disclosure for operating a digital long-range optical apparatus. The exemplary embodiment of the method according to the disclosure is explained in more detail in exemplary fashion on the basis of the operation of the digital long-range optical apparatus 1 in accordance with FIG. 2. The same applies to the operation of the further digital long-range optical apparatuses in accordance with the further exemplary embodiments.

In a method step S1, the first detector 8A is controlled with the processor unit 4 with at least one control parameter which has a first value. Further, in a method step S2, the second detector 8B is controlled with the processor unit 4 with the control parameter which has a second value, with the first value and the second value differing from one another.

The method according to the disclosure is based on the idea that the first detector 8A and the second detector 8B are each controlled using different values of the control parameter in order thus to generate a first image of the object 2 with the first detector 8A and a second image of the object 2 with the second detector 8B. The first detector 8A and the second detector 8B are each controlled in such a way that the light detected by the first detector 8A and the second detector 8B is detectable in optimal fashion or as desired. The first image and the second image are combined to form an overall image of the object 2, with the overall image having a good light efficiency and a good and/or desired color resolution.

In an exemplary embodiment of the method according to the disclosure, provision is additionally or alternatively made for a plurality of control parameters rather than only a single control parameter to be used to control the first detector 8A and the second detector 8B. Thus, in this exemplary embodiment of the method according to the disclosure, provision is made for the aforementioned control parameter to be a first control parameter, for the aforementioned first value to be a value of the first control parameter, and for the aforementioned second value to be a value of the first control parameter. The exemplary embodiment of the method according to the disclosure includes steps which are implemented analogously to method steps S1 and S2: (i) controlling the first detector 8A with the processor unit 4 using at least one second control parameter which has a first value; and (ii) controlling the second detector 8B with the processor unit 4 using the second control parameter which has a second value, with the first value of the second control parameter and the second value of the second control parameter differing from one another.

In a further exemplary embodiment of the method according to the disclosure, provision is additionally or alternatively made for one of the following parameters to be used as the first control parameter: (i) the detection time of the first detector 8A and/or of the second detector 8B, (ii) a detection duration of the first detector 8A and/or of the second detector 8B, (iii) a sensitivity of the first detector 8A and/or of the second detector 8B, (iv) a gain of the first detector 8A and/or of the second detector 8B, or (v) a number of images to be recorded within a specifiable unit of time using the first detector 8A and/or using the second detector 8B.

In yet a further exemplary embodiment of the method according to the disclosure, provision is additionally or alternatively made for one of the following parameters to be used as the second control parameter: (i) a detection time of the first detector 8A and/or of the second detector 8B, (ii) a detection duration of the first detector 8A and/or of the second detector 8B, (iii) a sensitivity of the first detector 8A and/or of the second detector 8B, (iv) a gain of the first detector 8A and/or of the second detector 8B, or (v) a number of images to be recorded within a specifiable unit of time using the first detector 8A and/or using the second detector 8B.

As already explained hereinbefore, the detection time of the first detector 8A and/or of the second detector 8B is the time at which a detection of the light split by the beam splitter unit 7 is started with the first detector 8A and/or the second detector 8B.

The detection duration of the first detector 8A and/or of the second detector 8B is the period of time during which the first detector 8A and/or the second detector 8B are/is switched so that they generate detection signals on the basis of light incident on the first detector 8A and/or the second detector 8B and transmit the said detection signals to the processor unit 4.

The option to choose the detection time and the detection duration is particularly advantageous since, firstly, for the first light L1 incident on the first detector 8A and, secondly, for the second light L2 incident on the second detector 8B, it is possible to select optimal values for, firstly, the detection time and/or detection duration of the first detector 8A and, secondly, the detection time and/or the detection duration of the second detector 8B. As a result, it is possible to obtain an optimal signal-to-noise ratio between the light L1, L2 incident on the individual detector 8A, 8B and the generated detection signals. In this way, it is possible to detect colors better in the case of a non-uniform illumination of the object 2 to be imaged. The first image generated thus using the first detector 8A and the second image generated using the second detector 8B are combined to form an overall image of the object 2, with the overall image having a good light efficiency and good and/or desired color resolution.

The choice of the detection time and an accompanying choice of the number of images to be recorded within a specifiable unit of time using the first detector 8A and/or using the second detector 8B can also be particularly advantageous. As mentioned hereinbefore, the detection time of the first detector 8A and/or of the second detector 8B is the time at which a detection of the light L1, L2 split by the beam splitter unit 7 is started with the first detector 8A and/or the second detector 8B. In an exemplary embodiment of the method according to the disclosure, provision is made for the detectors 8A, 8B to record images of the object 2 not simultaneously but at different times. Expressed in other words, the first detector 8A records a first image at a first time. The second detector 8B records a second image at a second time. The first time differs from the second time. Additionally, provision is for example made for the first detector 8A and the second detector 8B to record images alternately. Expressed in other words, the first detector 8A, for example, records a respective image, followed by the second detector 8B, then the first detector 8A again, and, following this, the second detector 8B again. In this way, the provision of a large number of images is possible. These images are combined in such a way that an overall image of the object 2 with a good light efficiency and color resolution is generated.

Figure 31:
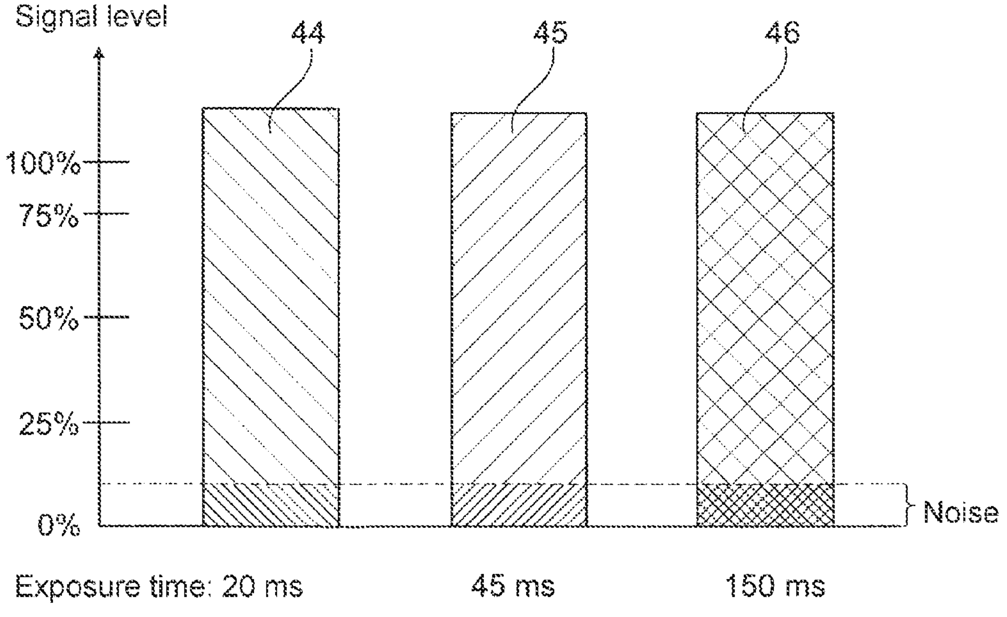
FIG. 31 shows a further exemplary embodiment of a method for operating a digital long-range optical apparatus and/or a camera system.

The method according to an aspect of the disclosure is not restricted to the use of two detectors, specifically the first detector 8A and the second detector 8B. Rather, a beam splitter unit 7 including three detectors, four detectors, or else more than four detectors can be used for the method according to an aspect of the disclosure. This is explained in exemplary fashion on the basis of FIG. 31 which shows an exemplary embodiment of a method according to the disclosure for operating a digital long-range optical apparatus. The exemplary embodiment of the method according to the disclosure in accordance with FIG. 31 is explained in more detail in exemplary fashion on the basis of the operation of the digital long-range optical apparatus 1 in accordance with FIG. 6. The same applies to the operation of the further digital long-range optical apparatuses 1 and 20 in accordance with the further exemplary embodiments. When the first detector 8A, the second detector 8B, and the third detector 8C are used, the first detector 8A for example can be used to detect red light 44. The second detector 8B is used to detect green light 45. The third detector 8C is used to detect blue light 46. In this exemplary embodiment of the method according to the disclosure, provision is made for the detection duration (in other words, the exposure time) of the detectors 8A, 8B, and 8C to be chosen suitably such that an optimal signal-to-noise ratio can be obtained. The detection duration of the detectors 8A, 8B, and 8C is chosen in such a way here that a signal level for the individual aforementioned colors 44, 45, 46 is nearly 100% or even 100%. Thus, all colors are detected with a very high signal level. The signal levels are so high here that they are not within the noise. In the exemplary embodiment illustrated in FIG. 31, the detection duration of the first detector 8A for obtaining a 100% signal level is 20 ms. By contrast, the detection duration of the second detector 8B for obtaining a 100% signal level is 45 ms. Further, the detection duration of the third detector 8C for obtaining a 100% signal level is 150 ms. The noise is also depicted in FIG. 31. It is evident that the signal levels of the aforementioned colors are far above the noise.

Figure 32:
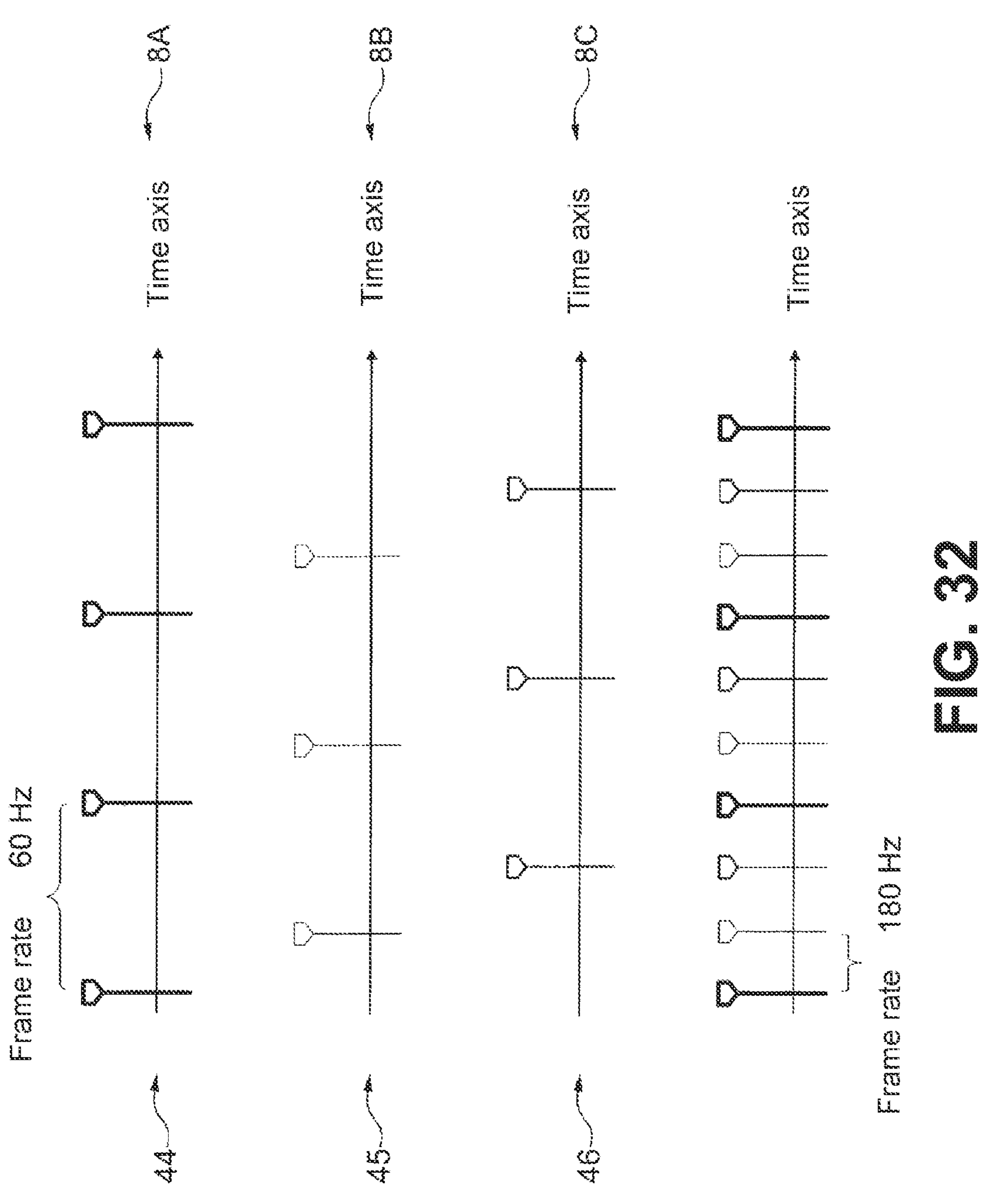
FIG. 32 shows a further exemplary embodiment of a method for operating a digital long-range optical apparatus and/or a camera system.

FIG. 32 shows an exemplary embodiment of the method according to the disclosure in which the first detector 8A, the second detector 8B, and the third detector 8C of the digital long-range optical apparatus 1 are used in accordance with FIG. 6. The same applies to the operation of the further digital long-range optical apparatuses 1 and 20 in accordance with the further exemplary embodiments. In the exemplary embodiment of the method according to the disclosure illustrated in FIG. 32, different detection times are chosen for the first detector 8A, the second detector 8B, and the third detector 8C. The first detector 8A detects red light 44. The second detector 8B detects green light 45. By contrast, the third detector 8C detects blue light 46. The aforementioned three detectors 8A, 8B, and 8C record images at different times, with the result that, in comparison with a single detector, three times the number of images are generated within a specified period of time. Each of the aforementioned detectors 8A, 8B and 8C has a frame rate, which defines the number of images the individual detectors 8A, 8B, and 8C record per second. For example, the frame rate is 60 Hz for each of the individual detectors 8A, 8B, and 8C. The aforementioned three detectors 8A, 8B, and 8C record images at different times, with the result that, in comparison with a single detector, three times the number of images are generated within a specified period of time. Accordingly, a frame rate of 180 Hz would be achieved when using a single detector. Since only the image of a single color is available at any one time in the embodiment of the method according to the disclosure illustrated in FIG. 32, the missing images for each individual detector of the detectors 8A, 8B, and 8C between the detection times are interpolated for an image which is intended to be based on all three colors (red, green, blue). Some or all of the generated images are used to generate an overall image of the object 2.

Figure 33:
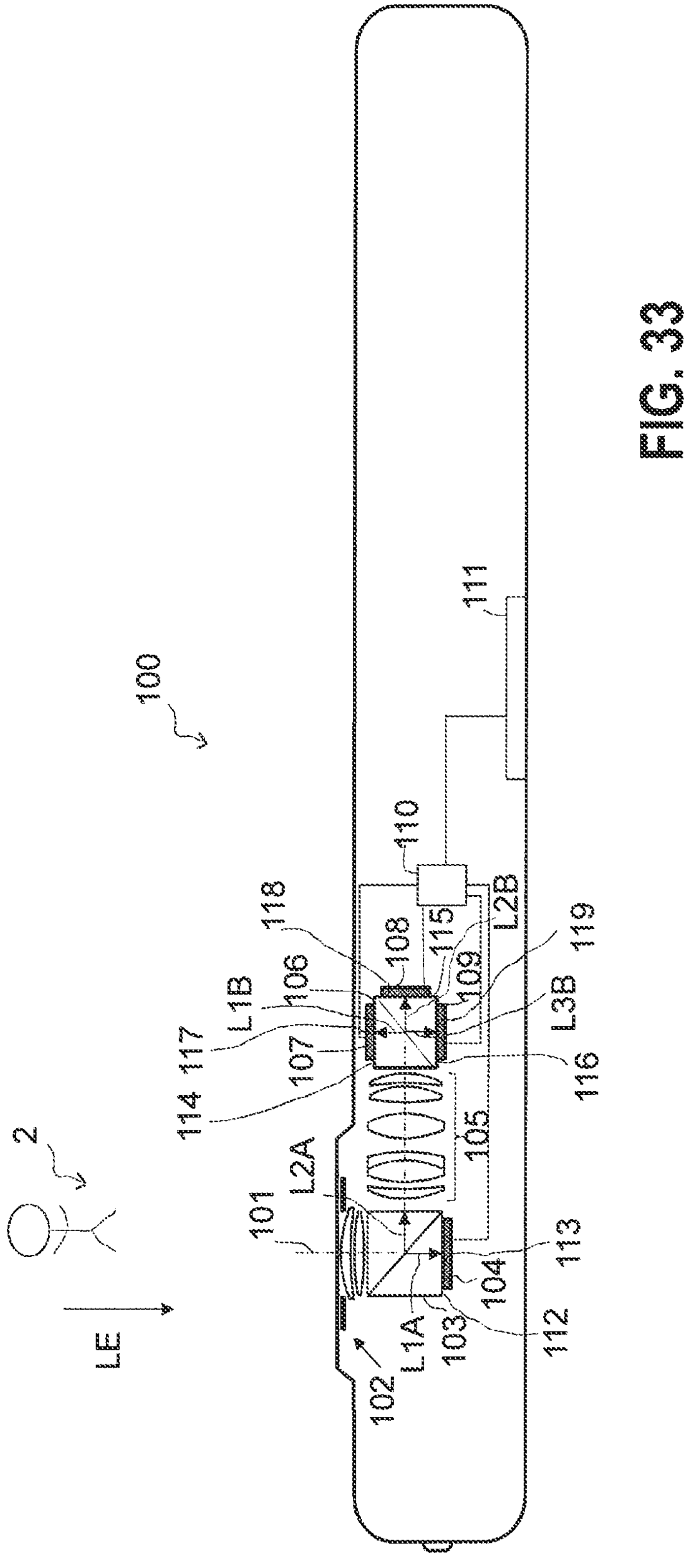
FIG. 33 shows a first exemplary embodiment of a camera system.

FIG. 33 shows an exemplary embodiment of a camera system 100 according to the disclosure for imaging an object 2. For example, the camera system 100 is arranged in or at a binocular apparatus, in or at a pair of field glasses, in or at a refractor, in particular a telescopic sight, in or at a telescope, in or at a spotting scope, in or at a night vision apparatus, in or at a cellular telephone and/or in or at a tablet computer.

The camera system 100 includes an optical axis 101 and a lens 102 for imaging the object 2, with the lens 102 being arranged along the optical axis 101. For example, the lens 102 includes at least one lens element. In particular, provision is made for the lens 102 to include a plurality of lens elements and/or a plurality of optical units, for example lens element groups. Moreover, the camera system 100 is provided with a processor unit 110 and with a display unit 111 for displaying an image of the object 2. The processor unit 110 is line-connected to the display unit 111. Accordingly, signals are transmittable from the processor unit 110 to the display unit 111 and/or from the display unit 111 to the processor unit 110.

The display unit 111 is in the form of a digital display unit. In particular, the display unit 111 can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

Further, the camera system 100 includes a second beam splitter unit 103. The lens 102 is arranged first along the optical axis 101 in a direction of light incidence LE, followed by the second beam splitter unit 103. A first detector 104 of the second beam splitter unit 103 is arranged at the second beam splitter unit 103. The processor unit 110 is line-connected to the first detector 104 of the second beam splitter unit 103. Accordingly, signals are transmittable from the processor unit 110 to the first detector 104 of the second beam splitter unit 103 and/or from the first detector 104 of the second beam splitter unit 103 to the processor unit 110.

The first detector 104 of the second beam splitter unit 103 is configured to detect first light L1A generated by the second beam splitter unit 103. Expressed in other words, the first detector 104 of the second beam splitter unit 103 detects first light L1A which is generated by the second beam splitter unit 103 by the incidence of light incident on the second beam splitter unit 103. Further, the second beam splitter unit 103 generates second light L2A, which is guided by a guiding optical unit 105 to a first beam splitter unit 106.

By way of example, the first detector 104 of the second beam splitter unit 103 is in the form of a CCD detector or CMOS detector. However, the disclosure is not restricted to the aforementioned exemplary embodiments. Rather, the first detector 104 of the second beam splitter unit 103 can be any detector suitable for the disclosure. By way of example, the first detector 104 of the second beam splitter unit 103 can be in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The processor unit 110 is additionally in the form of for example a control unit and/or supply unit, which controls the display unit 111 and/or the first detector 104 of the second beam splitter unit 103 and/or which supplies these/this with voltage.

In the case of the camera system 100 in accordance with FIG. 33, the first detector 104 is arranged at the second beam splitter unit 103. The second beam splitter unit 103 includes a first beam splitter face 112, at which the first detector 104 is arranged. In a further exemplary embodiment of the camera system 100, provision is additionally or alternatively made for an optical device (not illustrated) to be arranged between the second beam splitter unit 103 and the first detector 104 of the second beam splitter unit 103. The optical device guides the first light L1A from the second beam splitter unit 103 to the first detector 104 of the second beam splitter unit 103.

By way of example, the first detector 104 of the second beam splitter unit 103 includes a sensitive first detector area 113. The pixels of the first detector 104 of the second beam splitter unit 103 which detect the first light L1A are arranged at the first detector area 113. The first detector area 113 is not necessarily the entire detector area where pixels of the first detector 104 of the second beam splitter unit 103 which detect the first light L1A are arranged. Rather, an exemplary embodiment of the camera system 100 provides for the first detector area 113 to be a partial area of the entire detector area of the first detector 104 of the second beam splitter unit 103. By way of example, provision is made for the processor unit 110 to be used to control the first detector 104 of the second beam splitter unit 103 in such a way that a selectable first detector area 113 is switched to be sensitive for the detection of first light L1A.

Light emanating from the object 2 enters the lens 102 in the direction of the light incidence LE and is incident on the second beam splitter unit 103. The second beam splitter unit 103 serves to split the light into the first light L1A and into the second light L2A. Expressed in other words, the second beam splitter unit 103 serves to split the light into two components.

The first light L1A includes one of the following features: (i) light at only a single first wavelength, (ii) light from a first wavelength range, or (iii) a specifiable first intensity. Reference is made to the explanations provided hereinbefore in respect of the definition of the terms of single wavelength and wavelength range. These also apply here. The single first wavelength may for example be a wavelength from the visible or invisible wavelength range. In particular, provision is made for the light at the first wavelength to be a red light, a green light, or a blue light. For example, the first wavelength range can be the wavelength range of the visible light, of the infrared range, of the near-infrared range, or of the short-wavelength infrared light. The exemplary embodiment of the first wavelength range in the form of the near-infrared range or the short-wavelength infrared light is advantageous, especially when observing the object 2 in twilight or low-light weather conditions. The first intensity of the first light L1A can be any selectable intensity, for example a percentage of the light incident in the second beam splitter unit 103 from the lens 102. For example, the first intensity of the first light L1A, and hence the percentage, is 10%, 20%, 30%, 40%, 50%, 60%, 70%, 80%, or 90% of the light incident in the second beam splitter unit 103 from the lens 102.

In the camera system 100 in accordance with FIG. 33, the second light L2A includes one of the following features: (i) light at only a single second wavelength, (ii) light from a second wavelength range, or (iii) a specifiable second intensity. Reference is made to the explanations provided hereinbefore in respect of the definition of the terms of single wavelength and wavelength range. These also apply here. The single second wavelength may for example be a wavelength from the visible or invisible wavelength range. In particular, provision is made for the light at the second wavelength to be a red light, a green light, or a blue light. For example, the second wavelength range can be the wavelength range of the visible light, of the infrared range, of the near-infrared range, or of the short-wavelength infrared light. The exemplary embodiment of the second wavelength range in the form of the near-infrared range or the short-wavelength infrared light is advantageous, especially when observing the object 2 in twilight or low-light weather conditions. The second intensity of the second light L2A can be any selectable intensity, for example, depending on the percentage of the first intensity of the first light L1A, a percentage of the light incident in the second beam splitter unit 103 from the first lens 102. For example, the second intensity of the second light L2A, and hence the percentage, is 10%, 20%, 30%, 40%, 50%, 60%, 70%, 80%, or 90% of the light incident in the second beam splitter unit 103 from the first lens 102, depending on the percentage of the first intensity of the first light L1A. For example, the percentage of the first intensity of the first light L1A is 20% and the percentage of the second intensity of the second light L2A is 80%.

Further, the camera system 100 in accordance with FIG. 33 includes a first beam splitter unit 106. The lens 102 is arranged first along the optical axis 101 in the direction of light incidence LE, followed by the second beam splitter unit 103, then the guiding optical unit 105, and then the first beam splitter unit 106. A first detector 107, a second detector 108, and a third detector 109 are arranged at the first beam splitter unit 106. The processor unit 110 is line-connected to the first detector 107 of the first beam splitter unit 106, to the second detector 108 of the first beam splitter unit 106, and to the third detector 109 of the first beam splitter unit 106. Accordingly, signals are transmittable from the processor unit 110 to the first detector 107 of the first beam splitter unit 106 and/or from the first detector 107 of the first beam splitter unit 106 to the processor unit 110. Further, signals are transmittable from the processor unit 110 to the second detector 108 of the first beam splitter unit 106 and/or from the second detector 108 of the first beam splitter unit 106 to the processor unit 110. Moreover, signals are transmittable from the processor unit 110 to the third detector 109 of the first beam splitter unit 106 and/or from the third detector 109 of the first beam splitter unit 106 to the processor unit 110.

The first detector 107 of the first beam splitter unit 106 is configured to detect first light L1B generated by the first beam splitter unit 106. Expressed in other words, the first detector 107 of the first beam splitter unit 106 detects first light L1B which is generated by the first beam splitter unit 106 by the incidence of light incident on the first beam splitter unit 106 (thus the second light L2A of the second beam splitter unit 103). The second detector 108 of the first beam splitter unit 106 is configured to detect second light L2B generated by the first beam splitter unit 106. Expressed in other words, the second detector 108 of the first beam splitter unit 106 detects second light L2B which is generated by the first beam splitter unit 106 by the incidence of light incident on the first beam splitter unit 106 (thus the second light L2A of the second beam splitter unit 103). The third detector 109 of the first beam splitter unit 106 is configured to detect third light L3B generated by the first beam splitter unit 106. Expressed in other words, the third detector 109 of the first beam splitter unit 106 detects third light L3B which is generated by the first beam splitter unit 106 by the incidence of light incident on the first beam splitter unit 106 (thus the second light L2A of the second beam splitter unit 103).

For example, the first detector 107 of the first beam splitter unit 106 and/or the second detector 108 of the first beam splitter unit 106 and/or the third detector 109 of the first beam splitter unit 106 are/is in the form of a CCD detector or CMOS detector. However, the disclosure is not restricted to the aforementioned exemplary embodiments. Rather, the first detector 107 of the first beam splitter unit 106 and/or the second detector 108 of the first beam splitter unit 106 and/or the third detector 109 of the first beam splitter unit 106 can be any detector suitable for the disclosure. By way of example, at least one of the detectors 107, 108, and 109 of the first beam splitter unit 106 is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The processor unit 110 is additionally in the form of for example a control unit and/or supply unit, which controls the first detector 107 of the first beam splitter unit 106 and/or the second detector 108 of the first beam splitter unit 106 and/or the third detector 109 of the first beam splitter unit 106 and/or which supplies these/this with voltage.

In the case of the camera system 100 in accordance with FIG. 33, the first beam splitter unit 106 includes a first beam splitter face 114, at which the first detector 107 of the first beam splitter unit 106 is arranged. Further, the first beam splitter unit 106 includes a second beam splitter face 115, at which the second detector 108 of the first beam splitter unit 106 is arranged. Moreover, the first beam splitter unit 106 includes a third beam splitter face 116, at which the third detector 109 of the first beam splitter unit 106 is arranged. In a further exemplary embodiment of the camera system 100, provision is additionally or alternatively made for an optical device (not illustrated) to be arranged between the first beam splitter unit 106 and the first detector 107 of the first beam splitter unit 106. The first optical device guides the first light L1B from the first beam splitter unit 106 to the first detector 107 of the first beam splitter unit 106. Additionally or as an alternative thereto, provision is made in this embodiment for an optical device (not illustrated) to be arranged between the first beam splitter unit 106 and the second detector 108 of the first beam splitter unit 106. The first optical device guides the second light L2B from the first beam splitter unit 106 to the second detector 108 of the first beam splitter unit 106. Further additionally or in a further alternative thereto, provision is made in this exemplary embodiment for an optical device (not illustrated) to be arranged between the first beam splitter unit 106 and the third detector 109 of the first beam splitter unit 106. The optical device guides the third light L3B from the first beam splitter unit 106 to the third detector 109 of the first beam splitter unit 106.

For example, at least two of the faces or each of the faces of the first beam splitter face 114 of the first beam splitter unit 106, the second beam splitter face 115 of the first beam splitter unit 106, and the third beam splitter face 116 of the first beam splitter unit 106 are arranged with respect to one another at an angle of between 0° and 180°, with the interval boundaries being included. Additionally or as an alternative thereto, at least two faces of the first beam splitter face 114 of the first beam splitter unit 106, the second beam splitter face 115 of the first beam splitter unit 106, and the third beam splitter face 116 of the first beam splitter unit 106 are arranged at a distance from one another. In particular, provision is made for at least two of the aforementioned faces to be arranged parallel to one another. For example, provision is made for the aforementioned beam splitter faces of the first beam splitter unit 106 to be arranged relative to one another in the style of a cube. Expressed in other words, respectively two of the aforementioned faces of the first beam splitter unit 106 are for example arranged with respect to one another at an angle of 90° or substantially 90°.

By way of example, the first detector 107 of the first beam splitter unit 106 includes a sensitive first detector area 117. The pixels of the first detector 107 of the first beam splitter unit 106 which detect the first light L1B are arranged at the first detector area 117. The first detector area 117 is not necessarily the entire detector area where pixels of the first detector 107 of the first beam splitter unit 106 which detect the first light L1B are arranged. Rather, an exemplary embodiment of the camera system 100 provides for the first detector area 117 to be a partial area of the entire detector area of the first detector 107 of the first beam splitter unit 106. By way of example, provision is made for the processor unit 110 to be used to control the first detector 107 of the first beam splitter unit 106 in such a way that a selectable first detector area 117 is switched to be sensitive for the detection of first light L1B.

Further, additional provision is made for the second detector 108 of the first beam splitter unit 106 to include a sensitive second detector area 118. The pixels of the second detector 108 of the first beam splitter unit 106 which detect the second light L2B are arranged at the second detector area 118. The second detector area 118 is not necessarily the entire detector area where pixels of the second detector 108 of the first beam splitter unit 106 which detect the second light L2B are arranged. Rather, an exemplary embodiment of the camera system 100 provides for the second detector area 118 to be a partial area of the entire detector area of the second detector 108 of the first beam splitter unit 106. By way of example, provision is made for the processor unit 110 to be used to control the second detector 108 of the first beam splitter unit 106 in such a way that a selectable second detector area 118 is switched to be sensitive for the detection of second light L2B.

Moreover, additional provision is made for the third detector 109 of the first beam splitter unit 106 to include a sensitive third detector area 119. The pixels of the third detector 109 of the first beam splitter unit 106 which detect the third light L3B are arranged at the third detector area 119. The third detector area 119 is not necessarily the entire detector area where pixels of the third detector 109 of the first beam splitter unit 106 which detect the third light L3B are arranged. Rather, an exemplary embodiment of the camera system 100 provides for the third detector area 119 to be a partial area of the entire detector area of the third detector 109 of the first beam splitter unit 106. By way of example, provision is made for the processor unit 110 to be used to control the third detector 109 of the first beam splitter unit 106 in such a way that a selectable third detector area 119 is switched to be sensitive for the detection of third light L3B.

As mentioned hereinbefore, the first beam splitter unit 106 serves to split the second light L2A of the second beam splitter unit 103 into the first light L1B, into the second light L2B, and into the third light L3B. Expressed in other words, the first beam splitter unit 106 serves to split the light into three components.

The first light L1B includes one of the following features: (i) light at only a single third wavelength, (ii) light from a third wavelength range, or (iii) a specifiable third intensity. Reference is made to the explanations provided hereinbefore in respect of the definition of the terms of single wavelength and wavelength range. These also apply here. The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing the object 2 in twilight or low-light weather conditions. The third intensity of the first light L1B can be any selectable intensity, for example a percentage of the light incident in the first beam splitter unit 106. For example, the third intensity of the first light L1B, and hence the percentage, is 10%, 20%, 30%, 40%, 50%, 60%, 70%, 80%, or 90% of the light incident in the first beam splitter unit 106.

In the camera system 100 in accordance with FIG. 33, the second light L2B includes one of the following features: (i) light at only a single fourth wavelength, (ii) light from a fourth wavelength range, or (iii) a specifiable fourth intensity. Reference is made to the explanations provided hereinbefore in respect of the definition of the terms of single wavelength and wavelength range. These also apply here. The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing the object 2 in twilight or low-light weather conditions. The fourth intensity of the second light L2B can be any selectable intensity, for example, depending on the percentage of the third intensity of the first light L1B, a percentage of the light incident in the first beam splitter unit 106. For example, the fourth intensity of the second light L2B, and hence the percentage, is 10%, 20%, 30%, 40%, 50%, 60%, 70%, 80%, or 90% of the light incident in the first beam splitter unit 106, depending on the percentage of the third intensity of the first light L1B. For example, the percentage of the third intensity of the first light L1B is 20% and the percentage of the fourth intensity of the second light L2B is 80%.

The third light L3B includes one of the following features: (i) light at only a single sixth wavelength, (ii) light from a sixth wavelength range, or (iii) a specifiable sixth intensity. Reference is made to the explanations provided hereinbefore in respect of the definition of the terms of single wavelength and wavelength range. These also apply here. The single sixth wavelength may for example be a wavelength from the visible or invisible wavelength range. In particular, provision is made for the light at the sixth wavelength to be a red light, a green light, or a blue light. For example, the sixth wavelength range can be the wavelength range of the visible light, of the infrared range, of the near-infrared range, or of the short-wavelength infrared light. The exemplary embodiment of the sixth wavelength range in the form of the near-infrared range or the short-wavelength infrared light is advantageous, especially when observing the object 2 in twilight or low-light weather conditions. The sixth intensity of the third light L3B can be any selectable intensity, for example, depending on the percentage of the third intensity of the first light L1B and/or the fourth intensity of the second light L2B, a percentage of the light incident in the first beam splitter unit 106. For example, the sixth intensity of the third light L3B, and hence the percentage, is 10%, 20%, 30%, 40%, 50%, 60%, 70%, 80%, or 90% of the light incident in the first beam splitter unit 106, depending on the percentage of the third intensity of the first light L1B and/or the fourth intensity of the second light L2B. For example, the percentage of the third intensity of the first light L1B is 20%, the percentage of the fourth intensity of the second light L2B is 50%, and the percentage of the sixth intensity of the third light L3B is 30%.

In a further exemplary embodiment of the camera system 100 in accordance with FIG. 33, the first detector area 117, the second detector area 118, and the third detector area 119 have a relative arrangement as described in relation to FIGS. 3 and 4. Reference is made to the explanations given hereinbefore. These also apply here. A first detector area center of the first detector 107 has a first distance from a first face center of the first beam splitter face 114 of the first beam splitter unit 106. A second detector area center of the second detector 108 has a second distance from a second face center of the second beam splitter face 115 of the first beam splitter unit 106. Further, a third detector area center of the third detector 109 has a third distance from a third face center of the third beam splitter face 116 of the first beam splitter unit 106. The first distance differs from the second distance and/or from the third distance. In principle, the three detector areas 117, 118, and 119 are arranged offset to each other with regard to the beam splitter face 114, 115, and 116 assigned to them. If the first detector area 117 of the first detector 107, the second detector area 118 of the second detector 108, and the third detector area 119 of the third detector 109 were to be arranged relative to one another in one plane, then the aforementioned detector areas would be arranged offset from one another, with the result that the first detector area 117, the second detector area 118, and the third detector area 119 do not record exactly the same image of the object 2 but record different image portions of the object 2. This exemplary embodiment consequently ensures that the first detector area 117, the second detector area 118, and the third detector area 119 do not record exactly the same image of the object 2 but instead record different image portions of the object 2. As a result, it is possible to calculate and present a super-resolution image of the object 2 using known super-resolution algorithms (which are used for super-resolution imaging).

An exemplary embodiment of the camera system 100 in accordance with FIG. 33 provides for the third detector area 119 to differ in size from the first detector area 117 and/or the second detector area 118 (not illustrated in FIG. 33). For example, the first detector area 117 is larger than the second detector area 118. Further, for example, the second detector area 118 is larger than the third detector area 119. By way of example, the first detector area 117 is two times, three times, or four times larger than the second detector area 118. Further, the second detector area 118 is for example two times, three times, or four times larger than the third detector area 119. This exemplary embodiment of the camera system 100 is advantageous in that a first image generated by the first detector 107 of the first beam splitter unit 106, a second image generated by the second detector 108 of the first beam splitter unit 106, and a third image generated by the third detector 109 of the first beam splitter unit 106 are based on differently sized fields of view. As a result, it is possible to provide digital zooming within the scope of the camera system 100, and generate different zoom images with different zoom levels. For example, the first image is based on a first field of view and shows a first image portion of the object 2, which corresponds to an image at a first zoom level. Further, for example, the second image is based on a second field of view and shows a second image portion of the object 2, which corresponds to an image at a second zoom level. Moreover, the third image is based on a third field of view and shows a third image portion of the object 2, which corresponds to an image at a third zoom level. It is advantageous that the resolution of the images remains the same for all zoom levels if the resolution of the detectors is the same. By contrast, in the case of a digital zoom known from the prior art, the resolution reduces as the zooming increases.

Explicit reference is made to the fact that the number of detectors of the second beam splitter unit 103 and/or of the first beam splitter unit 106 can be chosen freely. Thus, for example, more than 2, more than 3, more than 4, or more than 5 detectors may be arranged at the second beam splitter unit 103. Further, for example, more than 2, more than 3, more than 4, or more than 5 detectors may be arranged at the first beam splitter unit 106. Each of the aforementioned detectors can include at least one of the features specified hereinabove or hereinbelow or a combination of at least two of the features specified hereinabove or hereinbelow.

The second beam splitter unit 103 and/or the first beam splitter unit 106 can be in the form of a polyhedron. Reference is made to the explanations in respect of FIGS. 21 to 29, which also apply to the second beam splitter unit 103 and/or the first beam splitter unit 106.

It was recognized that, on account of the two beam splitter units 103 and 106, the camera system 100 according to the disclosure has a good light efficiency and a good color resolution for the purpose of generating a good image of the object 2. With the two beam splitter units 103 and 106, it is possible to split light into different color components (wavelengths) and/or wavelength ranges, with the result that information with different color components and/or wavelength ranges is generated. The split color components and/or wavelength ranges are detected by different detectors. The different detection signals provided by the detectors are used for generating a single image and/or a plurality of images of the object 2. The single generated image or the plurality of generated images have a good light efficiency and a good color resolution. In comparison with the prior art, in which a single detector provided with a Bayer filter and having a single detector area is used, the disclosure first of all provides a plurality of detectors with a plurality of detector areas, with the result that, in comparison with the prior art, more information can be used for the generation of the image of the object 2. Secondly, the plurality of detectors can be controlled on an individual basis. Both effects lead to images with a good light efficiency and a good color resolution.

Further, it is advantageous if the first light L1A of the second beam splitter unit 103 is located in the near-infrared range, if the first light L1B of the first beam splitter unit 106 is blue light, if the second light L2B of the first beam splitter unit 106 is green light, and if the third light L3B of the first beam splitter unit 106 is red light. The image generated by the first light L1A of the second beam splitter unit 103 can be recorded with a wider angle than the images generated using the first beam splitter unit 106.

Figure 34:
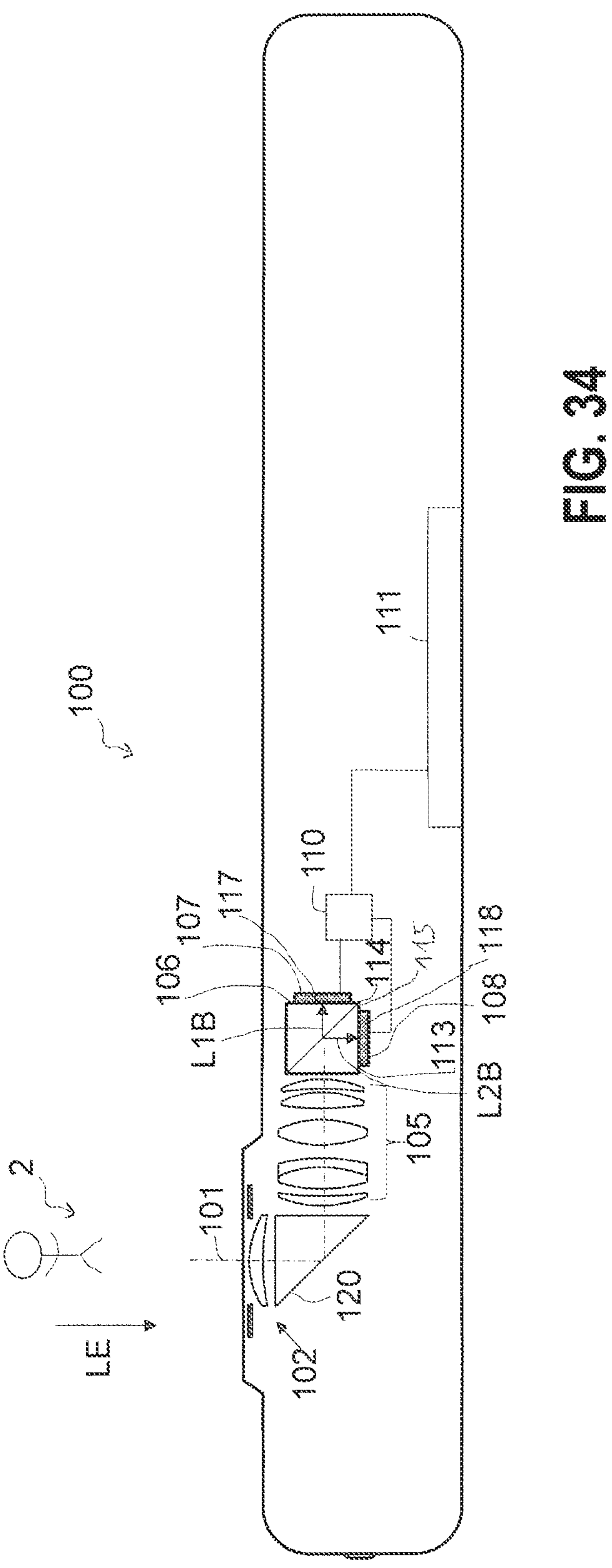
FIG. 34 shows a second exemplary embodiment of a camera system.

FIG. 34 shows an exemplary embodiment of a further camera system 100 according to the disclosure for imaging an object 2. For example, the further camera system 100 is arranged in or at a binocular apparatus, in or at a pair of field glasses, in or at a refractor, in particular a telescopic sight, in or at a telescope, in or at a spotting scope, in or at a night vision apparatus, in or at a cellular telephone and/or in or at a tablet computer.

The further camera system 100 includes an optical axis 101 and a lens 102 for imaging the object 2, with the lens 102 being arranged along the optical axis 101. For example, the lens 102 includes at least one lens element. In particular, provision is made for the lens 102 to include a plurality of lens elements and/or a plurality of optical units, for example lens element groups. Moreover, the further camera system 100 is provided with a processor unit 110 and with a display unit 111 for displaying an image of the object 2. The processor unit 110 is line-connected to the display unit 111. Accordingly, signals are transmittable from the processor unit 110 to the display unit 111 and/or from the display unit 111 to the processor unit 110.

The display unit 111 is in the form of a digital display unit. In particular, the display unit 111 can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

Instead of a second beam splitter unit, the further camera system 100 includes a deflection unit 120, which is for example in the form of a prism and/or a mirror unit. The lens 102 is arranged first along the optical axis 101 in a direction of light incidence LE, followed by the deflection unit 120.

Further, the camera system 100 in accordance with FIG. 34 includes a first beam splitter unit 106. The lens 102 is arranged first along the optical axis 101 in the direction of light incidence LE, followed by the deflection unit 120, then a guiding optical unit 105, and then the first beam splitter unit 106. A first detector 107 and a second detector 108 are arranged at the first beam splitter unit 106. The processor unit 110 is line-connected to the first detector 107 of the first beam splitter unit 106 and to the second detector 108 of the first beam splitter unit 106. Accordingly, signals are transmittable from the processor unit 110 to the first detector 107 of the first beam splitter unit 106 and/or from the first detector 107 of the first beam splitter unit 106 to the processor unit 110. Further, signals are transmittable from the processor unit 110 to the second detector 108 of the first beam splitter unit 106 and/or from the second detector 108 of the first beam splitter unit 106 to the processor unit 110.

The first detector 107 of the first beam splitter unit 106 is configured to detect first light L1B generated by the first beam splitter unit 106. Expressed in other words, the first detector 107 of the first beam splitter unit 106 detects first light L1B which is generated by the first beam splitter unit 106 by the incidence of light incident on the first beam splitter unit 106. The second detector 108 of the first beam splitter unit 106 is configured to detect second light L2B generated by the first beam splitter unit 106. Expressed in other words, the second detector 108 of the first beam splitter unit 106 detects second light L2B which is generated by the first beam splitter unit 106 by the incidence of light incident on the first beam splitter unit 106.

By way of example, the first detector 107 of the first beam splitter unit 106 and/or the second detector 108 of the first beam splitter unit 106 are/is in the form of a CCD detector or CMOS detector. However, the disclosure is not restricted to the aforementioned exemplary embodiments. Rather, the first detector 107 of the first beam splitter unit 106 and/or the second detector 108 of the first beam splitter unit 106 can be any detector suitable for the disclosure. By way of example, one of the detectors 107, 108 of the first beam splitter unit 106 is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The processor unit 110 is additionally in the form of for example a control unit and/or supply unit, which controls the first detector 107 of the first beam splitter unit 106 and/or the second detector 108 of the first beam splitter unit 106 and/or which supplies these/this with voltage.

In the case of the further camera system 100 in accordance with FIG. 34, the first beam splitter unit 106 includes a first beam splitter face 114, at which the first detector 107 of the first beam splitter unit 106 is arranged. Further, the first beam splitter unit 106 includes a second beam splitter face 115, at which the second detector 108 of the first beam splitter unit 106 is arranged. In a further exemplary embodiment of the further camera system 100, provision is additionally or alternatively made for an optical device (not illustrated) to be arranged between the first beam splitter unit 106 and the first detector 107 of the first beam splitter unit 106. The first optical device guides the first light L1B from the first beam splitter unit 106 to the first detector 107 of the first beam splitter unit 106. Additionally or as an alternative thereto, provision is made in this exemplary embodiment for an optical device (not illustrated) to be arranged between the first beam splitter unit 106 and the second detector 108 of the first beam splitter unit 106. The optical device guides the second light L2B from the first beam splitter unit 106 to the second detector 108 of the first beam splitter unit 106.

For example, the first beam splitter face 114 of the first beam splitter unit 106 and the second beam splitter face 115 of the first beam splitter unit 106 are arranged with respect to one another at an angle of between 0° and 180°, with the interval boundaries being included. Additionally or as an alternative thereto, the first beam splitter face 114 of the first beam splitter unit 106 and the second beam splitter face 115 of the first beam splitter unit 106 are arranged at a distance from one another. In particular, provision is made for the first beam splitter face 114 of the first beam splitter unit 106 and the second beam splitter face 115 of the first beam splitter unit 106 to be arranged parallel to one another. For example, provision is made for the aforementioned beam splitter faces of the first beam splitter unit 106 to be arranged relative to one another in the style of a cube. Expressed in other words, the aforementioned faces of the first beam splitter unit 106 are for example arranged with respect to one another at an angle of 90° or substantially 90°.

By way of example, the first detector 107 of the first beam splitter unit 106 includes a sensitive first detector area 117. The pixels of the first detector 107 of the first beam splitter unit 106 which detect the first light L1B are arranged at the first detector area 117. The first detector area 117 is not necessarily the entire detector area where pixels of the first detector 107 of the first beam splitter unit 106 which detect the first light L1B are arranged. Rather, an exemplary embodiment of the further camera system 100 provides for the first detector area 117 to be a partial area of the entire detector area of the first detector 107 of the first beam splitter unit 106. By way of example, provision is made for the processor unit 110 to be used to control the first detector 107 of the first beam splitter unit 106 in such a way that a selectable first detector area 117 is switched to be sensitive for the detection of first light L1B.

Further, additional provision is made for the second detector 108 of the first beam splitter unit 106 to include a sensitive second detector area 118. The pixels of the second detector 108 of the first beam splitter unit 106 which detect the second light L2B are arranged at the second detector area 118. The second detector area 118 is not necessarily the entire detector area where pixels of the second detector 108 of the first beam splitter unit 106 which detect the second light L2B are arranged. Rather, an exemplary embodiment of the further camera system 100 provides for the second detector area 118 to be a partial area of the entire detector area of the second detector 108 of the first beam splitter unit 106. By way of example, provision is made for the processor unit 110 to be used to control the second detector 108 of the first beam splitter unit 106 in such a way that a selectable second detector area 118 is switched to be sensitive for the detection of second light L2B.

As mentioned hereinbefore, the first beam splitter unit 106 serves to split the light incident in the first beam splitter unit 106 into the first light L1B and into the second light L2B. Expressed in other words, the first beam splitter unit 106 serves to split the light into two components.

The first light L1B includes one of the following features: (i) light at only a single third wavelength, (ii) light from a third wavelength range, or (iii) a specifiable third intensity. Reference is made to the explanations provided hereinbefore in respect of the definition of the terms of single wavelength and wavelength range. These also apply here. The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing the object 2 in twilight or low-light weather conditions. The third intensity of the first light L1B can be any selectable intensity, for example a percentage of the light incident in the first beam splitter unit 106. For example, the third intensity of the first light L1B, and hence the percentage, is 10%, 20%, 30%, 40%, 50%, 60%, 70%, 80%, or 90% of the light incident in the first beam splitter unit 106.

In the camera system 100 in accordance with FIG. 34, the second light L2B includes one of the following features: (i) light at only a single fourth wavelength, (ii) light from a fourth wavelength range, or (iii) a specifiable fourth intensity. Reference is made to the explanations provided hereinbefore in respect of the definition of the terms of single wavelength and wavelength range. These also apply here. The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing the object 2 in twilight or low-light weather conditions. The fourth intensity of the second light L2B can be any selectable intensity, for example, depending on the percentage of the third intensity of the first light L1B, a percentage of the light incident in the first beam splitter unit 106. For example, the fourth intensity of the second light L2B, and hence the percentage, is 10%, 20%, 30%, 40%, 50%, 60%, 70%, 80%, or 90% of the light incident in the first beam splitter unit 106, depending on the percentage of the third intensity of the first light L1B. For example, the percentage of the third intensity of the first light L1B is 20% and the percentage of the fourth intensity of the second light L2B is 80%.

In a further exemplary embodiment of the further camera system 100 in accordance with FIG. 34, the first detector area 117 and the second detector area 118 have a relative arrangement as described in relation to FIGS. 3 and 4. Reference is made to the explanations given hereinbefore. These also apply here. A first detector area center of the first detector 107 has a first distance from a first face center of the first beam splitter face 114 of the first beam splitter unit 106. A second detector area center of the second detector 108 has a second distance from a second face center of the second beam splitter face 115 of the first beam splitter unit 106. The first distance differs from the second distance. In principle, the two detector areas 117 and 118 are arranged offset to each other with regard to the beam splitter face 114, 115 assigned to them. If the first detector area 117 of the first detector 107 and the second detector area 118 of the second detector 108 were to be arranged relative to one another in one plane, then the aforementioned detector areas would be arranged offset from one another, with the result that the first detector area 117 and the second detector area 118 do not record exactly the same image of the object 2 but record different image portions of the object 2. This exemplary embodiment consequently ensures that the first detector area 117 and the second detector area 118 do not record exactly the same image of the object 2 but instead record different image portions of the object 2. As a result, it is possible to calculate and present a super-resolution image of the object 2 with known super-resolution algorithms (which are used for super-resolution imaging).

Explicit reference is made to the fact that the number of detectors of the first beam splitter unit 106 can be chosen freely. For example, more than 2, more than 3, more than 4, or more than 5 detectors may be arranged at the first beam splitter unit 106. Each of the aforementioned detectors can include at least one of the features specified hereinabove or hereinbelow or a combination of at least two of the features specified hereinabove or hereinbelow.

The first beam splitter unit 106 can be formed by polyhedra. Reference is made to the explanations in respect of FIGS. 21 to 29, which also apply to the first beam splitter unit 106.

Figure 35:
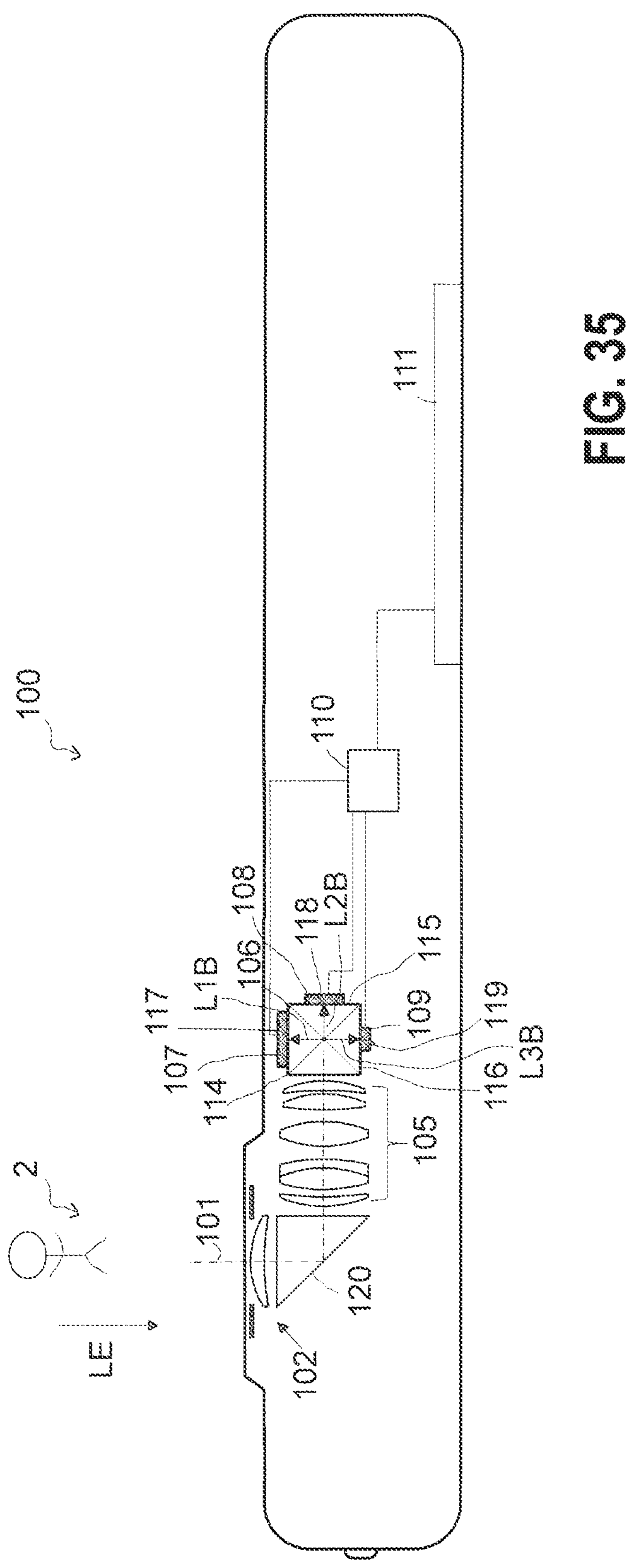
FIG. 35 shows a third exemplary embodiment of a camera system.

FIG. 35 shows an exemplary embodiment of an even further camera system 100 according to the disclosure for imaging an object 2. For example, the even further camera system 100 is arranged in or at a binocular apparatus, in or at a pair of field glasses, in or at a refractor, in particular a telescopic sight, in or at a telescope, in or at a spotting scope, in or at a night vision apparatus, in or at a cellular telephone and/or in or at a tablet computer.

The even further camera system 100 includes an optical axis 101 and a lens 102 for imaging the object 2, with the lens 102 being arranged along the optical axis 101. For example, the lens 102 includes at least one lens element. In particular, provision is made for the lens 102 to include a plurality of lens elements and/or a plurality of optical units, for example lens element groups. Moreover, the even further camera system 100 is provided with a processor unit 110 and with a display unit 111 for displaying an image of the object 2. The processor unit 110 is line-connected to the display unit 111. Accordingly, signals are transmittable from the processor unit 110 to the display unit 111 and/or from the display unit 111 to the processor unit 110.

The display unit 111 is in the form of a digital display unit. In particular, the display unit 111 can be in the form of a field emission visual display unit, a liquid crystal visual display unit, a thin film transistor visual display unit, a plasma visual display unit, an SED (surface conduction electron emitter display), or a visual display unit containing organic light-emitting diodes. The above enumeration is not exhaustive. Rather, any display unit suitable for the disclosure can be used.

Further, the even further camera system 100 includes a deflection unit 120, for example a prism and/or a mirror unit. The lens 102 is arranged first along the optical axis 101 in a direction of light incidence LE, followed by the deflection unit 120.

The processor unit 110 is additionally in the form of for example a control unit and/or supply unit, which controls the display unit 111 and/or which supplies this with voltage.

Further, the even further camera system 100 in accordance with FIG. 35 includes a first beam splitter unit 106. The lens 102 is arranged first along the optical axis 101 in the direction of light incidence LE, followed by the deflection unit 120, then a guiding optical unit 105, and then the first beam splitter unit 106. A first detector 107, a second detector 108, and a third detector 109 are arranged at the first beam splitter unit 106. The processor unit 110 is line-connected to the first detector 107 of the first beam splitter unit 106, to the second detector 108 of the first beam splitter unit 106, and to the third detector 109 of the first beam splitter unit 106. Accordingly, signals are transmittable from the processor unit 110 to the first detector 107 of the first beam splitter unit 106 and/or from the first detector 107 of the first beam splitter unit 106 to the processor unit 110. Further, signals are transmittable from the processor unit 110 to the second detector 108 of the first beam splitter unit 106 and/or from the second detector 108 of the first beam splitter unit 106 to the processor unit 110. Moreover, signals are transmittable from the processor unit 110 to the third detector 109 of the first beam splitter unit 106 and/or from the third detector 109 of the first beam splitter unit 106 to the processor unit 110.

The first detector 107 of the first beam splitter unit 106 is configured to detect first light L1B generated by the first beam splitter unit 106. Expressed in other words, the first detector 107 of the first beam splitter unit 106 detects first light L1B which is generated by the first beam splitter unit 106 by the incidence of light incident on the first beam splitter unit 106. The second detector 108 of the first beam splitter unit 106 is configured to detect second light L2B generated by the first beam splitter unit 106. Expressed in other words, the second detector 108 of the first beam splitter unit 106 detects second light L2B which is generated by the first beam splitter unit 106 by the incidence of light incident on the first beam splitter unit 106. The third detector 109 of the first beam splitter unit 106 is configured to detect third light L3B generated by the first beam splitter unit 106. Expressed in other words, the third detector 109 of the first beam splitter unit 106 detects third light L3B which is generated by the first beam splitter unit 106 by the incidence of light incident on the first beam splitter unit 106.

For example, the first detector 107 of the first beam splitter unit 106 and/or the second detector 108 of the first beam splitter unit 106 and/or the third detector 109 of the first beam splitter unit 106 are/is in the form of a CCD detector or CMOS detector. However, the disclosure is not restricted to the aforementioned exemplary embodiments. Rather, the first detector 107 of the first beam splitter unit 106 and/or the second detector 108 of the first beam splitter unit 106 and/or the third detector 109 of the first beam splitter unit 106 can be any detector suitable for the disclosure. By way of example, at least one of the detectors 107, 108, and 109 of the first beam splitter unit 106 is in the form of a detector provided with a Bayer filter. The Bayer filter includes color filters for the colors of red, green, and blue. A respective color filter is assigned to an individual pixel of the corresponding detector. Expressed in other words, a respective color filter is arranged at a respective pixel of the corresponding detector. A color filter serves to transmit a single color of the light incident on the color filter. Light of this individual color reaches the pixel assigned to the color filter of the corresponding detector. By contrast, further colors of the light are filtered out with the color filter. Light of these further colors consequently does not reach the pixel.

The processor unit 110 is additionally in the form of for example a control unit and/or supply unit, which controls the first detector 107 of the first beam splitter unit 106 and/or the second detector 108 of the first beam splitter unit 106 and/or the third detector 109 of the first beam splitter unit 106 and/or which supplies these/this with voltage.

In the case of the even further camera system 100 in accordance with FIG. 35, the first beam splitter unit 106 includes a first beam splitter face 114, at which the first detector 107 of the first beam splitter unit 106 is arranged. Further, the first beam splitter unit 106 includes a second beam splitter face 115, at which the second detector 108 of the first beam splitter unit 106 is arranged. Moreover, the first beam splitter unit 106 includes a third beam splitter face 116, at which the third detector 109 of the first beam splitter unit 106 is arranged. In a further exemplary embodiment of the even further camera system 100, provision is additionally or alternatively made for an optical device (not illustrated) to be arranged between the first beam splitter unit 106 and the first detector 107 of the first beam splitter unit 106. The first optical device guides the first light L1B from the first beam splitter unit 106 to the first detector 107 of the second beam splitter unit 106. Additionally or as an alternative thereto, provision is made in this exemplary embodiment for an optical device (not illustrated) to be arranged between the first beam splitter unit 106 and the second detector 108 of the first beam splitter unit 106. The optical device guides the second light L2B from the first beam splitter unit 106 to the second detector 108 of the first beam splitter unit 106. Further additionally or in a further alternative thereto, provision is made in this exemplary embodiment for an optical device (not illustrated) to be arranged between the first beam splitter unit 106 and the third detector 109 of the first beam splitter unit 106. The optical device guides the third light L3B from the first beam splitter unit 106 to the third detector 109 of the first beam splitter unit 106.

For example, at least two of the faces or each of the faces of the first beam splitter face 114 of the first beam splitter unit 106, the second beam splitter face 115 of the first beam splitter unit 106, and the third beam splitter face 116 of the first beam splitter unit 106 are arranged with respect to one another at an angle of between 0° and 180°, with the interval boundaries being included. Additionally or as an alternative thereto, at least two faces of the first beam splitter face 114 of the first beam splitter unit 106, the second beam splitter face 115 of the first beam splitter unit 106, and the third beam splitter face 116 of the first beam splitter unit 106 are arranged at a distance from one another. In particular, provision is made for at least two of the aforementioned faces to be arranged parallel to one another. For example, provision is made for the aforementioned beam splitter faces of the first beam splitter unit 106 to be arranged relative to one another in the style of a cube. Expressed in other words, respectively two of the aforementioned faces of the first beam splitter unit 106 are for example arranged with respect to one another at an angle of 90° or substantially 90°.

By way of example, the first detector 107 of the first beam splitter unit 106 includes a sensitive first detector area 117. The pixels of the first detector 107 of the first beam splitter unit 106 which detect the first light L1B are arranged at the first detector area 117. The first detector area 117 is not necessarily the entire detector area where pixels of the first detector 107 of the first beam splitter unit 106 which detect the first light L1B are arranged. Rather, an exemplary embodiment of the even further camera system 100 provides for the first detector area 117 to be a partial area of the entire detector area of the first detector 107 of the first beam splitter unit 106. By way of example, provision is made for the processor unit 110 to be used to control the first detector 107 of the first beam splitter unit 106 in such a way that a selectable first detector area 117 is switched to be sensitive for the detection of first light L1B.

Further, additional provision is made for the second detector 108 of the first beam splitter unit 106 to include a sensitive second detector area 118. The pixels of the second detector 108 of the first beam splitter unit 106 which detect the second light L2B are arranged at the second detector area 118. The second detector area 118 is not necessarily the entire detector area where pixels of the second detector 108 of the first beam splitter unit 106 which detect the second light L2B are arranged. Rather, an exemplary embodiment of the even further camera system 100 provides for the second detector area 118 to be a partial area of the entire detector area of the second detector 108 of the first beam splitter unit 106. By way of example, provision is made for the processor unit 110 to be used to control the second detector 108 of the first beam splitter unit 106 in such a way that a selectable second detector area 118 is switched to be sensitive for the detection of second light L2B.

Moreover, additional provision is made for the third detector 109 of the first beam splitter unit 106 to include a sensitive third detector area 119. The pixels of the third detector 109 of the first beam splitter unit 106 which detect the third light L3B are arranged at the third detector area 119. The third detector area 119 is not necessarily the entire detector area where pixels of the third detector 109 of the first beam splitter unit 106 which detect the third light L3B are arranged. Rather, an exemplary embodiment of the even further camera system 100 provides for the third detector area 119 to be a partial area of the entire detector area of the third detector 109 of the first beam splitter unit 106. By way of example, provision is made for the processor unit 110 to be used to control the third detector 109 of the first beam splitter unit 106 in such a way that a selectable third detector area 119 is switched to be sensitive for the detection of third light L3B.

As mentioned hereinbefore, the first beam splitter unit 106 serves to split the light incident in the first beam splitter unit 106 into the first light L1B, into the second light L2B, and into the third light L3B. Expressed in other words, the first beam splitter unit 106 serves to split the light into three components.

The first light L1B includes one of the following features: (i) light at only a single third wavelength, (ii) light from a third wavelength range, or (iii) a specifiable third intensity. Reference is made to the explanations provided hereinbefore in respect of the definition of the terms of single wavelength and wavelength range. These also apply here. The single third wavelength may for example be a wavelength from the visible or invisible wavelength range. In particular, provision is made for the light at the third wavelength to be a red light, a green light, or a blue light. For example, the third wavelength range can be the wavelength range of the visible light, of the infrared range, of the near-infrared range, or of the short-wavelength infrared light. The exemplary embodiment of the third wavelength range in the form of the near-infrared range or the short-wavelength infrared light is advantageous, especially when observing the object 2 in twilight or low-light weather conditions. The third intensity of the first light L1B can be any selectable intensity, for example a percentage of the light incident in the first beam splitter unit 106. For example, the third intensity of the first light L1B, and hence the percentage, is 10%, 20%, 30%, 40%, 50%, 60%, 70%, 80%, or 90% of the light incident in the first beam splitter unit 106.

In the even further camera system 100 in accordance with FIG. 35, the second light L2B includes one of the following features: (i) light at only a single fourth wavelength, (ii) light from a fourth wavelength range, or (iii) a specifiable fourth intensity. Reference is made to the explanations provided hereinbefore in respect of the definition of the terms of single wavelength and wavelength range. These also apply here. The single fourth wavelength may for example be a wavelength from the visible or invisible wavelength range. In particular, provision is made for the light at the fourth wavelength to be a red light, a green light, or a blue light. For example, the fourth wavelength range can be the wavelength range of the visible light, of the infrared range, of the near-infrared range, or of the short-wavelength infrared light. The exemplary embodiment of the fourth wavelength range in the form of the near-infrared range or the short-wavelength infrared light is advantageous, especially when observing the object 2 in twilight or low-light weather conditions. The fourth intensity of the second light L2B can be any selectable intensity, for example, depending on the percentage of the third intensity of the first light L1B, a percentage of the light incident in the first beam splitter unit 106. For example, the fourth intensity of the second light L2B, and hence the percentage, is 10%, 20%, 30%, 40%, 50%, 60%, 70%, 80%, or 90% of the light incident in the first beam splitter unit 106, depending on the percentage of the third intensity of the first light L1B. For example, the percentage of the third intensity of the first light L1B is 20% and the percentage of the fourth intensity of the second light L2B is 80%.

The third light L3B includes one of the following features: (i) light at only a single sixth wavelength, (ii) light from a sixth wavelength range, or (iii) a specifiable sixth intensity. Reference is made to the explanations provided hereinbefore in respect of the definition of the terms of single wavelength and wavelength range. These also apply here. The single sixth wavelength may for example be a wavelength from the visible or invisible wavelength range. In particular, provision is made for the light at the sixth wavelength to be a red light, a green light, or a blue light. For example, the sixth wavelength range can be the wavelength range of the visible light, of the infrared range, of the near-infrared range, or of the short-wavelength infrared light. The exemplary embodiment of the sixth wavelength range in the form of the near-infrared range or the short-wavelength infrared light is advantageous, especially when observing the object 2 in twilight or low-light weather conditions. The sixth intensity of the third light L3B can be any selectable intensity, for example, depending on the percentage of the third intensity of the first light L1B and/or the fourth intensity of the second light L2B, a percentage of the light incident in the first beam splitter unit 106. For example, the sixth intensity of the third light L3B, and hence the percentage, is 10%, 20%, 30%, 40%, 50%, 60%, 70%, 80%, or 90% of the light incident in the first beam splitter unit 106, depending on the percentage of the third intensity of the first light L1B and/or the fourth intensity of the second light L2B. For example, the percentage of the third intensity of the first light L1B is 20%, the percentage of the fourth intensity of the second light L2B is 50%, and the percentage of the sixth intensity of the third light L3B is 30%.

In a further exemplary embodiment of the even further camera system 100 in accordance with FIG. 35, the first detector area 117, the second detector area 118, and the third detector area 119 have a relative arrangement as described in relation to FIGS. 3 and 4. Reference is made to the explanations given hereinbefore. These also apply here. A first detector area center of the first detector 107 has a first distance from a first face center of the first beam splitter face 114 of the first beam splitter unit 106. A second detector area center of the second detector 108 has a second distance from a second face center of the second beam splitter face 115 of the first beam splitter unit 106. Further, a third detector area center of the third detector 109 has a third distance from a third face center of the third beam splitter face 116 of the first beam splitter unit 106. The first distance differs from the second distance and/or from the third distance. In principle, the three detector areas 117, 118, and 119 are arranged offset to each other with regard to the beam splitter face 114, 115, and 116 assigned to them. If the first detector area 117 of the first detector 107, the second detector area 118 of the second detector 108, and the third detector area 119 of the third detector 119 were to be arranged relative to one another in one plane, then the detector areas would be arranged offset from one another, with the result that the first detector area 117, the second detector area 118, and the third detector area 119 do not record exactly the same image of the object 2 but record different image portions of the object 2. This exemplary embodiment consequently ensures that the first detector area 117, the second detector area 118, and the third detector area 119 do not record exactly the same image of the object 2 but instead record different image portions of the object 2. As a result, it is possible to calculate and present a super-resolution image of the object 2 using known super-resolution algorithms (which are used for super-resolution imaging).

In the even further camera system 100 in accordance with FIG. 35, the third detector area 119 differs in size from the first detector area 117 and/or the second detector area 118. For example, the first detector area 117 is larger than the second detector area 118. Further, the second detector area 118 is larger than the third detector area 119. By way of example, the first detector area 117 is two times, three times, or four times larger than the second detector area 118. Further, the second detector area 118 is for example two times, three times, or four times larger than the third detector area 119. This exemplary embodiment of the even further camera system 100 is advantageous in that a first image generated by the first detector 107 of the first beam splitter unit 106, a second image generated by the second detector 108 of the first beam splitter unit 106, and a third image generated by the third detector 109 of the first beam splitter unit 106 are based on differently sized fields of view. As a result, it is possible to provide digital zooming within the scope of the even further camera system 100, and generate different zoom images with different zoom levels. For example, the first image is based on a first field of view and shows a first image portion of the object 2, which corresponds to an image at a first zoom level. Further, for example, the second image is based on a second field of view and shows a second image portion of the object 2, which corresponds to an image at a second zoom level. Moreover, the third image is based on a third field of view and shows a third image portion of the object 2, which corresponds to an image at a third zoom level. It is advantageous that the resolution of the images remains the same for all zoom levels if the resolution of the detectors is the same. By contrast, in the case of a digital zoom known from the prior art, the resolution reduces as the zooming increases.

Explicit reference is made to the fact that the number of detectors of the first beam splitter unit 106 can be chosen freely. Thus, for example, more than 2, more than 3, more than 4, or more than 5 detectors may be arranged at the first beam splitter unit 106. Each of the aforementioned detectors can include at least one of the features specified hereinabove or hereinbelow or a combination of at least two of the features specified hereinabove or hereinbelow.

The first beam splitter unit 106 can be formed by polyhedra. Reference is made to the explanations in respect of FIGS. 21 to 29, which also apply to the first beam splitter unit 106.

The exemplary embodiments of the methods according to the disclosure described in relation to FIGS. 30 to 32 can also be used to operate at least one of the described camera systems 100. Reference is made here to the explanations given hereinbefore. These also apply accordingly here.

When a camera system as described hereinbefore is integrated into a mobile apparatus, for example a telephone or a tablet computer, the light yield obtained on account of the large accumulated detector areas, in particular, is advantageous. Further, the restricted installation space in a mobile apparatus means that it is not readily possible to install a detector with a large detector area for the purpose of obtaining a high light yield, since further optical components should also be adapted in that case. By contrast, the disclosure requires no adaptation of the optical components even though the detector area is multiplied as a result of using a plurality of detectors. In principle, all that is required is installation space for at least one beam splitter.

When a camera system as described hereinbefore is integrated into a mobile apparatus, for example a telephone or a tablet computer, the use of a deflection unit, for example the deflection unit 120, may be advantageous to allow longer lenses to be realized.

As already explained hereinbefore, at least one of the detectors may be provided for the detection of light at wavelengths from the near-infrared range. Additionally, in a further exemplary embodiment provision is made to arrange at this detector or in the vicinity of this detector at least one further detector, for example an autofocus detector, an exposure detector, a TOF detector, and/or a lidar detector. Compact housing of all detectors in one module is advantageous in this case. Further, the viewing angle of individual detectors is more or less identical.

As already explained hereinbefore, a plurality of beam splitter units may be used. By way of example, one of the camera systems 100 includes the second beam splitter unit 103 and the first beam splitter unit 106. For example, the second beam splitter unit 103 splits the light in such a way that a detector arranged at the second beam splitter unit 103, for example the first detector 104, detects light at wavelengths from the near-infrared range. Further, the first beam splitter unit 106 for example splits the light into three visible components, for example into red light, into green light, and into blue light. An advantage of this exemplary embodiment is that the detection and the image generated with the light from the near-infrared range may have a different field of view. For example, this field of view has a wider angle than the field of view of the images of the visible light. However, the perspective center of all images remains identical.

As already described hereinabove, the detectors of the various embodiments may have different exemplary embodiments and designs. For example, the detectors have different detection areas. In addition or as an alternative thereto, provision is made for the detectors to include different Bayer filters. Expressed in other words, the detectors have different Bayer patterns. What this can achieve is that each of the three-color information items (red, green, blue) is available in each physical pixel. It is then no longer necessary to carry out what is known as "Bayer demosaicing". A higher resolution is also obtained overall. The use of an anti-aliasing filter at the detectors is then no longer necessary either. Moreover, an exemplary embodiment of the disclosure provides for the color filter characteristic of the Bayer filters of the detectors to differ. For example, it is thus possible to record different red wavelength ranges. A higher color resolution can be obtained as a result.

At least one of the detectors may have a monochromatic design in an exemplary embodiment of the disclosure. As a result, a high resolution and luminous grayscale image is additionally available.

All exemplary embodiments of the camera system 100 according to the disclosure are also advantageous for recording images underwater. The absorption rate of light in water depends on the wavelength of the light. While blue light can penetrate up to a depth of 60 m in clear water, the penetration depth of for example red light is usually only up to 8 m or less. For this reason, underwater recordings have a blue or green tinge in many cases. A white balance is difficult since too little yellow and red light is present in the images. In general, the light conditions underwater are difficult, especially at relatively large depths. A beam splitter unit as is used in the camera systems 100 according to the disclosure for example includes detectors for different colors. A detector for recording the red wavelength range can carry out a longer exposure or operate using a different ISO value than, for example, a detector detecting the blue wavelength range. The record of wavelength ranges outside of the visible range may for example assist in identifying and classifying living beings. Further, the disclosure provides images with less noise on account of the high light yield. Additionally, the structure of the camera systems according to the disclosure is very compact. All these advantages are particularly desirable for an underwater camera.

For the sake of good order, reference is made to the fact that the numerals used above (for example first beam splitter unit) are used on the one hand as numerals and on the other hand as names (designation of components). Consequently, the use of the designation "first beam splitter unit" does not necessarily imply the presence of a second beam splitter unit. Rather, the second beam splitter unit may optionally be present if there is a first beam splitter unit.

The features of the disclosure disclosed in the present description, in the drawings and in the claims may be essential for the realization of the disclosure in its various exemplary embodiments thereof both individually and in arbitrary combinations. The disclosure is not restricted to the described exemplary embodiments. It can be varied within the scope of the claims and taking into account the knowledge of the relevant person skilled in the art.

LIST OF REFERENCE NUMERALS

1 Digital long-range optical apparatus
2 Object
3 Lens
4 Processor unit
5 Display unit
6 Eyepiece
7 Beam splitter unit
8A First detector
8B Second detector
8C Third detector
8D Fourth detector
9A First beam splitter face
9B Second beam splitter face
9C Third beam splitter face
9D Fourth beam splitter face
10A First face center of the first beam splitter face
10B Second face center of the second beam splitter face
11A First detector area center

11B Second detector area center
12A First detector area of the first detector
12B Second detector area of the second detector
12C Third detector area of the third detector
12D Fourth detector area of the fourth detector
13 Analog observation apparatus
14 Eyepiece of the analog observation apparatus
20 Digital long-range optical apparatus (field glasses)
21A First observation channel
21B Second observation channel
22A First lens of the first observation channel
22B Second lens of the second observation channel
23A First beam splitter unit of the first observation channel
23B Second beam splitter unit of the second observation channel
24A First detector of the first observation channel
24B First detector of the second observation channel
25A First detector area of the first detector of the first observation channel
25B First detector area of the first detector of the second observation channel
26A First beam splitter face in the first observation channel
26B First beam splitter face in the second observation channel
27A Second detector of the first observation channel
27B Second detector of the second observation channel
28A Second detector area of the second detector of the first observation channel
28B Second detector area of the second detector of the second observation channel
29A Second beam splitter face in the first observation channel
29B Second beam splitter face in the second observation channel
30 Processor unit
31A First display unit of the first observation channel
31B Second display unit of the second observation channel
32A First eyepiece of the first observation channel
32B Second eyepiece of the second observation channel
33A Third detector of the first observation channel
33B Third detector of the second observation channel
34A Third detector area of the third detector of the first observation channel
34B Third detector area of the third detector of the second observation channel
35A Third beam splitter face in the first observation channel
35B Third beam splitter face in the second observation channel
36A Fourth detector of the first observation channel
36B Fourth detector of the second observation channel
37A Fourth detector area of the fourth detector of the first observation channel
37B Fourth detector area of the fourth detector of the second observation channel
38A Fourth beam splitter face of the first observation channel
38B Fourth beam splitter face of the second observation channel
39A Transmitter unit
40A First optical unit
40B Second optical unit
40C Third optical unit
40D Fourth optical unit
40E Fifth optical unit
40F Sixth optical unit
40G Seventh optical unit
40H Eighth optical unit
41 (First) dichroic interface
42 Second dichroic interface
43 Third dichroic interface
44 Red light
45 Green light
46 Blue light
100 Camera system
101 Optical axis
102 Lens
103 Second beam splitter unit
104 First detector of the second beam splitter unit
105 Guiding optical unit
106 First beam splitter unit
107 First detector of the first beam splitter unit
108 Second detector of the first beam splitter unit
109 Third detector of the first beam splitter unit
110 Processor unit
111 Display unit
112 First beam splitter face of the second beam splitter unit
113 First detector area of the first detector of the second beam splitter unit
114 First beam splitter face of the first beam splitter unit
115 Second beam splitter face of the first beam splitter unit
116 Third beam splitter face of the first beam splitter unit
117 First detector area of the first detector of the first beam splitter unit
118 Second detector area of the second detector of the first beam splitter unit
119 Third detector area of the third detector of the first beam splitter unit
120 Deflection unit
1000 Profile of a curve
2000 Profile of a curve
3000 Profile of a curve
I Intersection region
II Intersection region
III Intersection region
L Incident light
LE Direction of the light incidence
L1 First light
L2 Second light
L3 Third light
L4 Fourth light
L1A First light
L2A Second light
L1B First light
L2B Second light
L3A Third light
L3B Third light
L4A Fourth light
L4B Fourth light
OA Optical axis
OA1 First optical axis of the first observation channel
OA2 Second optical axis of the second observation channel

The invention claimed is:

1. A digital long-range optical apparatus for imaging an object, the digital long-range optical apparatus defining an optical axis, the digital long-range optical apparatus comprising:

at least one lens configured to image the object, the at least one lens being arranged along the optical axis;

at least one processor;

at least one display configured to display an image of the object, the processor being line-connected to the display;

at least one beam splitter, wherein the at least one lens is arranged first along the optical axis in a direction of light incidence, followed by the beam splitter;

at least one first detector; and at least one second detector, wherein the processor is line-connected to both the at least one first detector and the at least one second detector, wherein the at least one first detector is configured to detect first light generated by the beam splitter, wherein the at least one second detector is configured to detect second light generated by the beam splitter, wherein the beam splitter comprises a first beam splitter face, at which the at least one first detector is arranged and which comprises a first face center, wherein the beam splitter comprises a second beam splitter face, at which the at least one second detector is arranged and which comprises a second face center, wherein the at least one first detector comprises a first sensitive detector area with a first detector area center, wherein the at least one second detector comprises a second sensitive detector area with a second detector area center, wherein the first detector area center of the at least one first detector is arranged at a first distance from the first face center of the first beam splitter face, wherein the second detector area center of the at least one second detector is arranged at a second distance from the second face center of the second beam splitter face, wherein the first distance differs from the second distance, wherein the first sensitive detector area is arranged offset to the first beam splitter face, wherein the second sensitive detector area is arranged offset to the second beam splitter face, wherein the first sensitive detector area records a first portion of the object, wherein the second sensitive detector area records a second portion of the object, and wherein the first portion of the object is different from the second portion of the object.

2. The digital long-range optical apparatus as claimed in claim 1, wherein the at least one first detector and the at least one second detector are arranged at the beam splitter.

3. The digital long-range optical apparatus as claimed in claim 1, wherein the digital long-range optical apparatus comprises at least one of the following features:

(a) the first light comprises one of the following features: (i) light at only a single first wavelength, (ii) light from a first wavelength range, or (iii) a specifiable first intensity; and (b) the second light comprises one of the following features: (i) light at only a single second wavelength, (ii) light from a second wavelength range, or (iii) a specifiable second intensity.

4. The digital long-range optical apparatus as claimed in claim 1, wherein the first sensitive detector area differs in size from the second sensitive detector area.

5. The digital long-range optical apparatus as claimed in claim 1, further comprising at least one third detector, wherein the processor is line-connected to the at least one third detector, wherein the at least one third detector is configured to detect third light generated by the beam splitter, and wherein the third light comprises one of the following features: (i) light at only a single third wavelength, (ii) light from a third wavelength range, or (iii) a specifiable third intensity.

6. The digital long-range optical apparatus as claimed in claim 5, wherein the digital long-range optical apparatus comprises at least one of the following features:

(a) the at least one third detector comprises a sensitive third detector area, the first detector area and/or the second detector area differing in size from the third detector area; and (b) the beam splitter comprises a third beam splitter face, at which the at least one third detector is arranged and which comprises a third face center, wherein the at least one third detector comprises a third detector area center, wherein the third detector area center of the at least one third detector is arranged at a third distance from the third face center of the third beam splitter face, and wherein the third distance differs from the first distance and/or from the second distance.

7. The digital long-range optical apparatus as claimed in claim 1, further comprising at least one fourth detector, wherein the processor is line-connected to the at least one fourth detector, wherein the at least one fourth detector is configured to detect fourth light generated by the beam splitter, and wherein the fourth light comprises one of the following features: (i) light at only a single fourth wavelength, (ii) light from a fourth wavelength range, or (iii) a specifiable fourth intensity.

8. The digital long-range optical apparatus as claimed in claim 7, wherein the digital long-range optical apparatus comprises at least one of the following features:

(a) the at least one fourth detector comprises a sensitive fourth detector area, the first detector area and/or the second detector area and/or the third detector area differing in size from the fourth detector area; and (b) the beam splitter comprises a fourth beam splitter face, at which the at least one fourth detector is arranged and which comprises a fourth face center, wherein the at least one fourth detector comprises a fourth detector area center, wherein the fourth detector area center of the at least one fourth detector is arranged at a fourth distance from the fourth face center of the fourth beam splitter face, and wherein the fourth distance differs from the first distance and/or from the second distance and/or from the third distance.

9. The digital long-range optical apparatus as claimed in claim 1, wherein the beam splitter comprises one of the following features:

(a) at least one first optical unit in the form of a polyhedron and at least one second optical unit in the form of the polyhedron;

(b) the at least one first optical unit in the form of the polyhedron, the at least one second optical unit in the form of the polyhedron, at least one third optical unit in the form of the polyhedron, and at least one fourth optical unit in the form of the polyhedron; and (c) the at least one first optical unit in the form of the polyhedron, at least one second optical unit in the form of the polyhedron, at least one third optical unit in the form of the polyhedron, at least one fourth optical unit in the form of the polyhedron, at least one fifth optical unit in the form of the polyhedron, at least one sixth optical unit in the form of the polyhedron, at least one seventh optical unit in the form of the polyhedron, and at least one eighth optical unit in the form of the polyhedron.

10. The digital long-range optical apparatus as claimed in claim 9, wherein the beam splitter comprises one of the following features:

(a) a dichroic interface arranged between at least two of the first to eighth optical units; and (b) the dichroic interface arranged between at least two of the first to eighth optical units, wherein the dichroic interface is arranged at at least one of the at least two of the first to eighth optical units as a coating.

11. The digital long-range optical apparatus as claimed in claim 1, wherein the digital long-range optical apparatus is in the form of one of the following apparatuses: a binocular apparatus, a pair of field glasses, a refractor, a telescopic sight, a telescope, a spotting scope, or a night vision apparatus.

12. The digital long-range optical apparatus as claimed in claim 1, wherein the digital long-range optical apparatus comprises one of the following features:

(i) at least one transmitter configured to illuminate the object with light; and (ii) the at least one transmitter configured to illuminate the object with light, the transmitter being arranged at the beam splitter.

13. A method for operating a digital long-range optical apparatus as claimed in claim 1, the method comprising:

controlling the at least one first detector with the processor based on at least one control parameter which has a first value; and controlling the at least one second detector with the processor based on the control parameter which has a second value, wherein the first value and the second value differ from one another.

14. The method as claimed in claim 13, wherein the control parameter is a first control parameter, wherein the first value is a value of the first control parameter, wherein the second value is a value of the first control parameter, and wherein the method further comprises:

controlling the at least one first detector with the processor based on at least one second control parameter which has the first value; and controlling the at least one second detector with the processor based on the second control parameter which has the second value, wherein the first value of the second control parameter and the second value of the second control parameter differ from one another.

15. The method as claimed in claim 14, wherein one of the following parameters is used as the second control parameter:

(i) a detection time of the at least one first detector and/or of the at least one second detector, (ii) a detection duration of the at least one first detector and/or of the at least one second detector, (iii) a sensitivity of the at least one first detector and/or of the at least one second detector, (iv) a gain of the at least one first detector and/or of the at least one second detector, or (v) a number of images to be recorded within a specifiable unit of time with the at least one first detector and/or with the at least one second detector.

16. The method as claimed in claim 13, wherein one of the following parameters is used as the first control parameter:

(i) the detection time of the at least one first detector and/or of the at least one second detector, (ii) a detection duration of the at least one first detector and/or of the at least one second detector, (iii) a sensitivity of the at least one first detector and/or of the at least one second detector, (iv) a gain of the at least one first detector and/or of the at least one second detector, or (v) a number of images to be recorded within a specifiable unit of time with the at least one first detector and/or with the at least one second detector.

* * * * *